United States Patent [19]

Dwyer, III

[11] Patent Number: 5,016,040
[45] Date of Patent: May 14, 1991

[54] METHOD AND APPARATUS FOR FORMING A RECORDING ON A RECORDING MEDIUM

[75] Inventor: Eugene J. Dwyer, III, New York, N.Y.

[73] Assignee: Silhouette Technology, Inc., Morristown, N.J.

[21] Appl. No.: 348,551

[22] Filed: May 8, 1989

Related U.S. Application Data

[63] Continuation-in-part of Ser. No. 54,294, May 26, 1987, Pat. No. 4,829,339, and a continuation-in-part of Ser. No. 347,247, May 4, 1989, Pat. No. 4,924,254.

[51] Int. Cl.$^5$ .................. G03B 27/72; G03B 27/80
[52] U.S. Cl. .................................. 355/20; 355/71; 355/81
[58] Field of Search .......................... 355/20, 81, 71

[56] References Cited

U.S. PATENT DOCUMENTS

| | | | |
|---|---|---|---|
| 2,960,019 | 11/1960 | Craig | 355/81 |
| 4,025,189 | 5/1977 | Pugsley | 355/71 |
| 4,093,964 | 6/1978 | Aughton | 355/71 |
| 4,701,045 | 10/1987 | Plummer | 355/81 |

*Primary Examiner*—Monroe H. Hayes
*Attorney, Agent, or Firm*—Antonelli, Terry, Stout & Kraus

[57] ABSTRACT

The present invention relates to a method and apparatus for reducing the effect of recording errors on images and information which are recorded in sections onto a recording medium. Recording errors can detract from the quality of a recording particularly at the boundaries of recorded sections. The present invention introduces a number of methods which reduce the effect of recording errors by distributing the errors smoothly over areas of the recording, by modifying the recording level near the section boundaries, by modifying the recording process near the section boundaries, by modifying the shape, size and orientation of the recorded sections, by varying the position of the transition point from one section to an adjacent section and by introducing an overlap region which allows the section boundary to be modified.

43 Claims, 32 Drawing Sheets

WHERE:     $r = \text{sqrt}(x*x + y*y)$ $(x', y')$ = CRT COORDINATES OR CRT DEFLECTION COMMANDS $(x, y)$ = FILM COORDINATES

IMAGE
DENSITY
(LEFT)

IMAGE
DENSITY
(RIGHT)

IMAGE
DENSITY
(TOTAL)

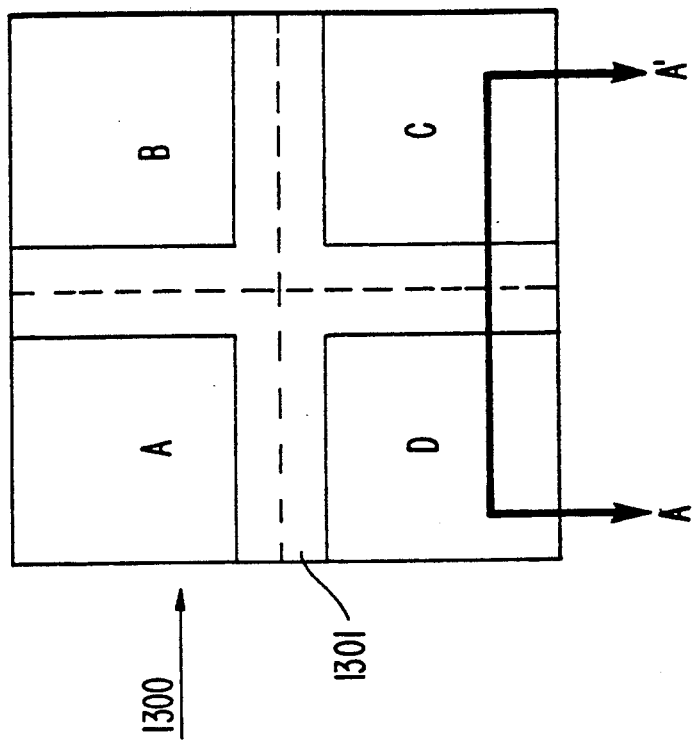
FIG. 25
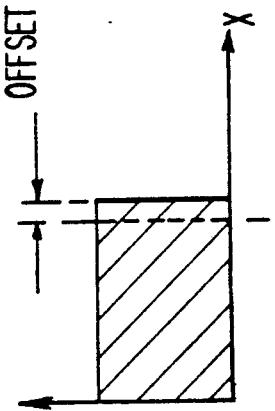
FIG. 24A
FIG. 24B
FIG. 24C
FIG. 24D

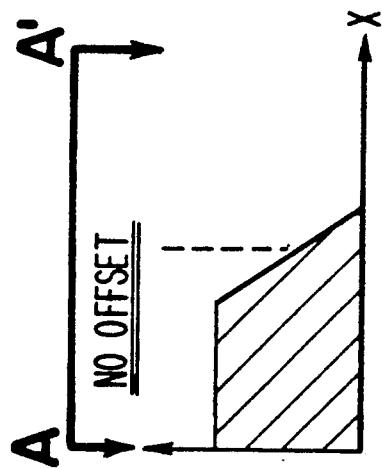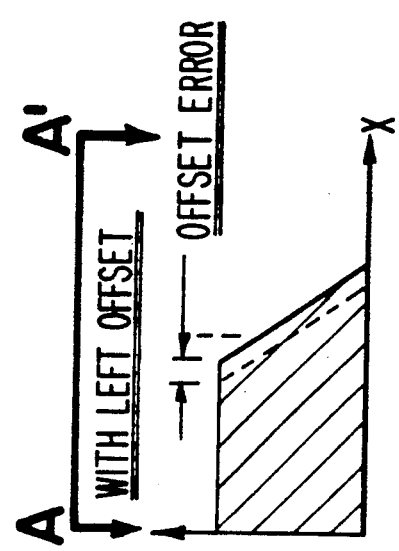
FIG.26A  FIG.26D
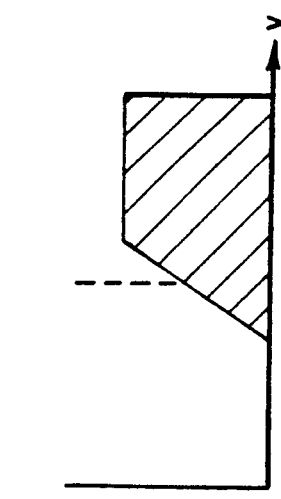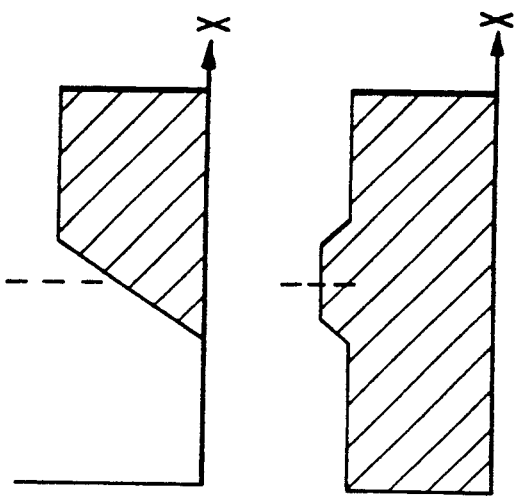
FIG.26B  FIG.26E
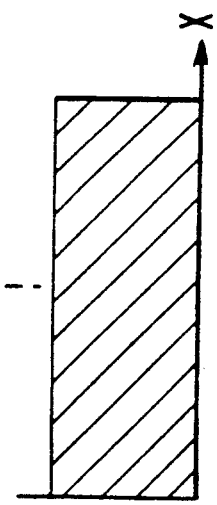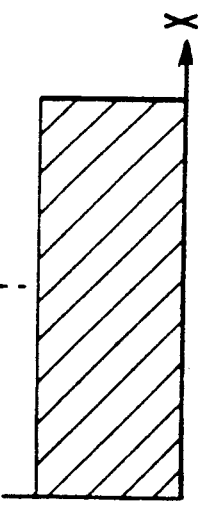
FIG.26C  FIG.26F

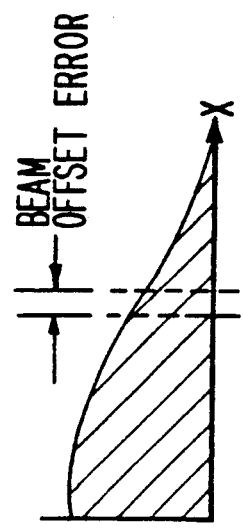
FIG. 27D DENSITY
BEAM OFFSET ERROR
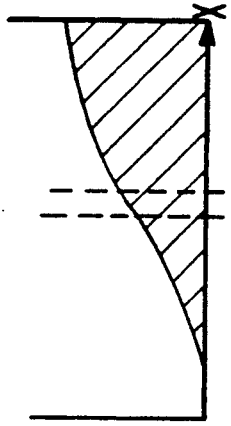
FIG. 27E DENSITY
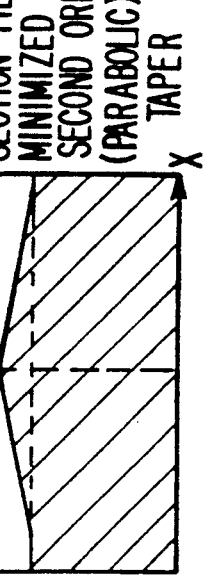
FIG. 27F DENSITY
OFFSET OF SECTION TILING MINIMIZED BY SECOND ORDER (PARABOLIC) TAPER
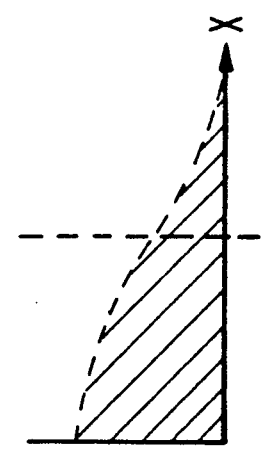
FIG. 27A DENSITY
OVERLAP AREA
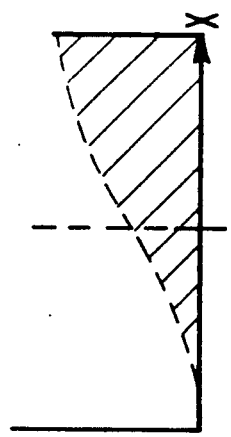
FIG. 27B DENSITY
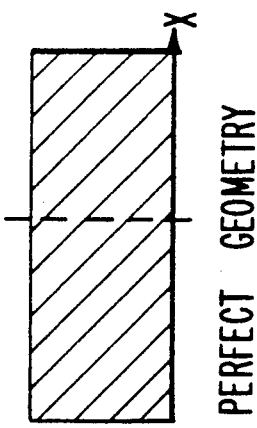
FIG. 27C DENSITY
PERFECT GEOMETRY

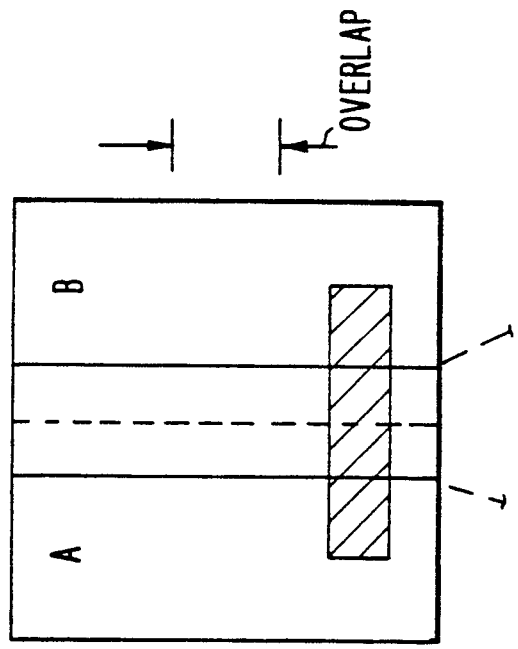
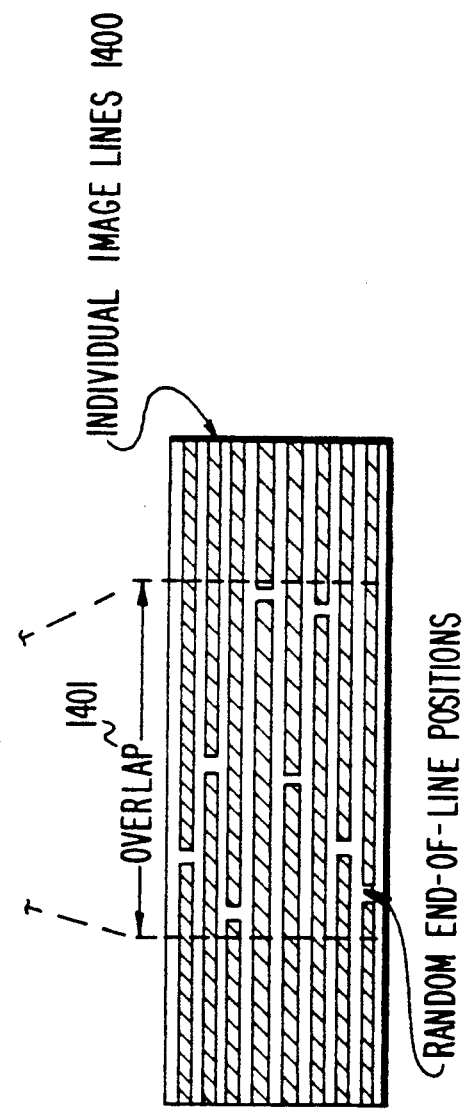
FIG. 28A
FIG. 28B

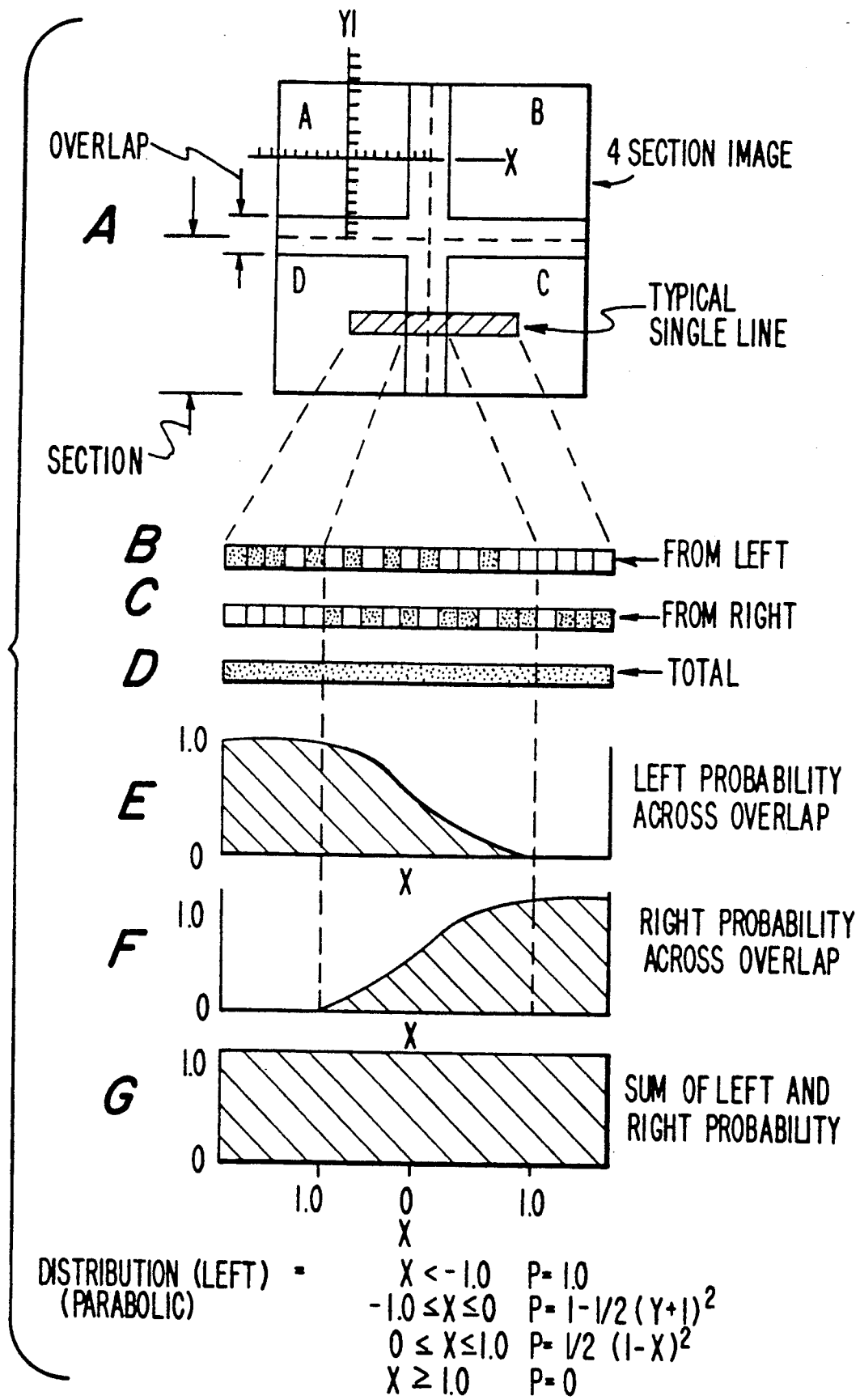

BIT PATTERN APPLIED TO EACH SECTION SIDE

FIG. 34A(1)
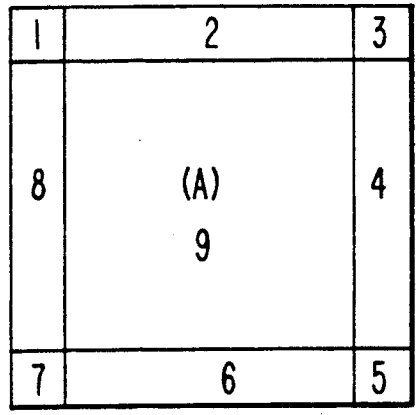
FIG. 34A(2)
FIG. 34A(3)
FIG. 34B(1)
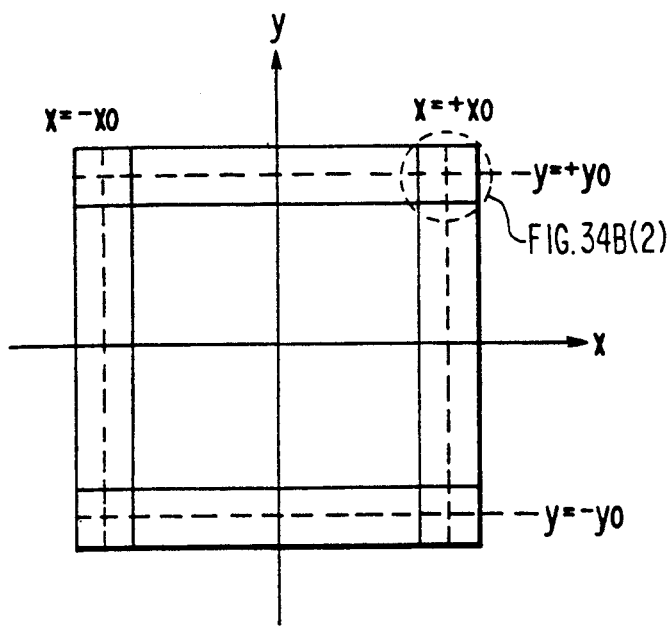
FIG. 34B(2)
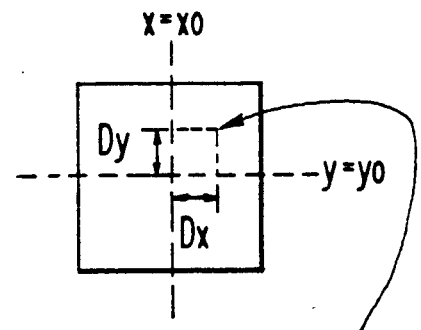
TYPICAL CORNER REGION POINT AT LOCATION
$$\begin{bmatrix} x = x_0 + \delta x \\ y = y_0 + \delta y \end{bmatrix}$$

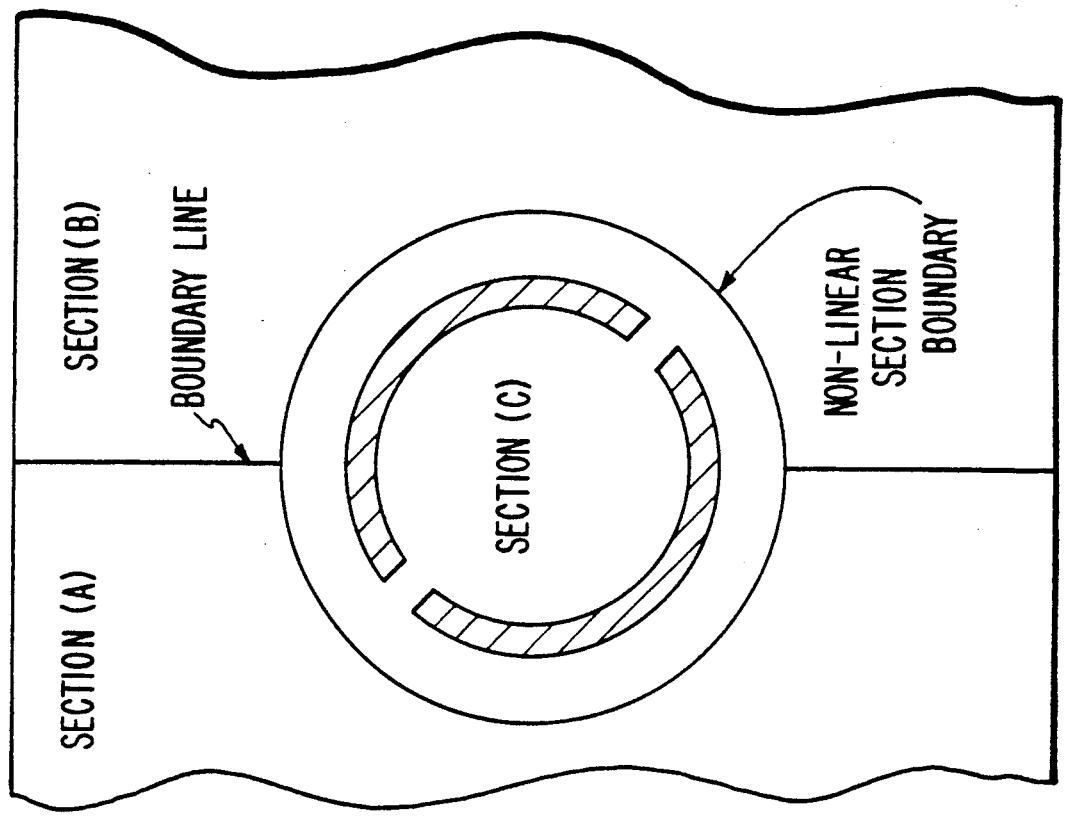
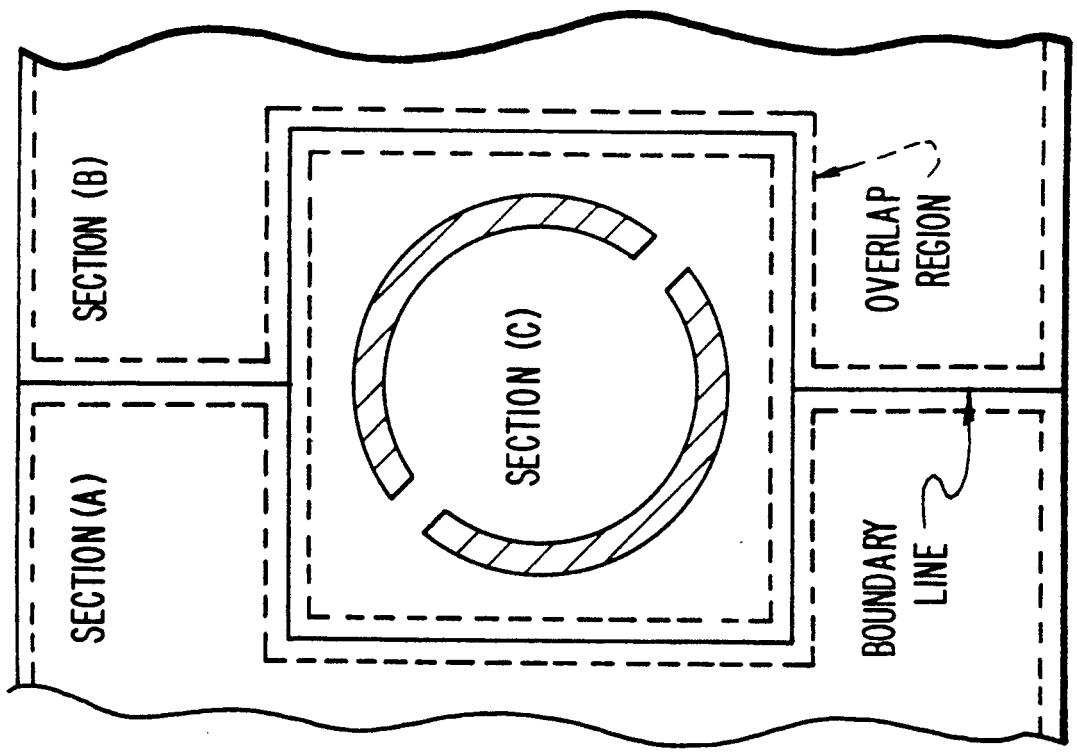

METHOD AND APPARATUS FOR FORMING A RECORDING ON A RECORDING MEDIUM

CROSS REFERENCE TO RELATED APPLICATIONS

This application is a continuation-in-part of U.S. patent application Ser. No. 054,294 entitled Film Printing/Reading filed on May 26, 1987, now U.S. Pat. No. 4,829,339, and a continuation-in-part of U.S. patent application Ser. No. 347,247, now U.S. Pat. No. 4,924,254, entitled "Film Printing/Reading System", filed on May 4, 1989, which applications are incorporated herein by reference in their entirety.

TECHNICAL FIELD

The present invention relates to a method and apparatus for reducing the effect of recording errors on images and information which are recorded in sections onto a recording medium.

BACKGROUND ART

In general, most commercial film printers consist of a cathode ray tube (CRT), a lens, a film holder, and related drive/control electronics An image displayed or drawn on the CRT faceplate is projected by the lens onto the film surface, and is thereby printed. Color images are frequently printed by decomposing the original image into three primary color frames and sequentially printed each frame through an appropriate color filter onto a single piece of recording media.

Other image characteristics, such as shading information, may be incorporated into the final printed image. U.S. Pat. No. 3,852,782, issued Dec. 3, 1974 to Gundlach et al., describes an imaging system wherein the light in contiguous sections of an image is differentially attenuated and focused through a selected one of adjacent lenticules onto contiguous segments of a photoreceptor. This provides for the recording of highlights, medium tones, or shadows in the image produced on the photoreceptor.

It has been another object in the art to provide for the recordation of multiple images. U.S. Pat. No. 4,115,002, issued Sept. 19, 1978 to Clark, discloses a device whereby separate total images are selectively overlapped for integrating these individual images into a resulting final copy having a high information ratio. The images are projected onto the film plane through various lenses positioned in a predetermined manner. Provision is also made for color and density correction filters for altering the color balance and density, respectively, of the original images.

U.S. Pat. No. 3,703,135, issued Nov. 21, 1972 to Lang, also describes a multiple image film exposure and projection system. This system successively exposes small areas of a film frame through a shuttered lens array, thereby providing a plurality of individual images on the frame without the need to move either the camera or the frame.

A method of obtaining a double image of a single object is disclosed in U.S. Pat. No. 4,088,401, issued May 9, 1978 to Rees et al. In this method, multiple projection lenses with shutters are also used to achieve the double imaging.

The image on a CRT faceplate is created by deflecting and modulating an electron beam within the CRT vacuum envelope. As the electron beam strikes the inner wall of the CRT faceplate, a layer of phosphor converts the electron beam energy to light. The resolution of the CRT image depends on the electron beam spot size and shape, the grain size of the CRT phosphor, and the degree to which the beam deflection system can accurately and reproducibly address an absolute position on the CRT face. The geometric accuracy of the CRT image, while not specifically dependent on the CRT resolution, can equally affect the resolution and accuracy of the printed image, as can distortions introduced by the projection lens. The higher the resolution and geometric accuracy of the CRT image source, the more detailed and accurate will be the final printed image.

A major drawback to obtaining high resolution and accuracy in prior art film printers has been cost. In general, there is rarely an exactly known and fixed relationship between deflection system commands and resulting CRT beam position. Although this relationship may at some point in time be measured or calibrated, the varying of environmental factors such as temperature and magnetic field strength tend to reduce the long term accuracy and reliability of such information. Components and systems resistant to such changes are costly and imperfect. Consequently, the CRT image and resulting film print is usually only an approximation to the initial image data since the individual points of the image are never perfectly located.

Such considerations apply in the case of printing a color image. In order to insure correct registration of the three separate primary color frames, the film printer must maintain a high precision over the entire time required to print all three frames. Thermal drift of the beam deflection electronic parameters make such registration difficult.

One way to achieve a higher CRT display resolution is feedback, whereby inaccuracies are continually corrected. One such system, which utilizes a feedback arrangement to correct CRT display image displacement due to vibrations is disclosed in U.S. Pat. No. 4,630,115 issued Dec. 16, 1986 to Hilsum. In particular, this device directs light from a spot on the CRT screen onto a photocell which detects the position of the light spot. Feedback is then utilized to process the output of the photocell detector to provide a correction signal which is, in turn, utilized by the deflection system of the CRT to adjust the position of the electron beam and, hence, the light spot. This correction is applied to the image as a whole in order to reduce the net motion of the image. Individual points or pels within the image are not adjusted relative to one another, and the method does not enhance the accuracy or precision of the displayed image.

As discussed above, prior devices involve the use of single element photo-sensors. Moreover, where a photo-sensor is used to feed back CRT beam position information, the CRT beam must be moved to the periphery of the CRT surface in order to excite the sensor. Deflection system calibration information derived from such beam position measurements becomes progressively less accurate in regions away from the point of calibration. Deflection corrections which apply to beam positioning in the interior of the image must be extrapolated from these peripheral data and are consequently less accurate. The effective measuring range of a photosensitive element can be extended by enlarging the sensor area of the element. With this technique, however, it is increasingly difficult to ensure homogeneity over the entire enlarged sensor area. In addition, it becomes prohibitively expensive to provide further system components of sufficient precision.

U.S. Pat. No. 4,457,626 issued Jul. 3, 1984 to Idesawa et al., describes an alternative type of device for more accurately determining positioning information. More specifically, this device includes a single lens in operative association with a mirrored cavity for reflecting a beam of light from a designated mark on an object onto a photosensitive element. The particular system used thereby, effectively enlarges the area of the photosensitive element. Idesawa et al.'s device uses a feedback algorithm which calculates positioning information based on the beam's detected position on the photosensitive element, the location of the object or spot source, and the number of reflections of the light beam within the mirrored cavity.

One disadvantage of this prior art device is the loss of intensity of the light beam incurred during reflection of the beam from the walls of the mirrored cavity. In addition, the walls of the mirrored cavity must be precisely parallel and flat to eliminate distortions which would otherwise occur. Also the size of the collection lens is limited to the physical size of the photosensitive element, because the mirrored walls must begin just at the edge of the photosensitive element and must encompass the collection lens.

A further disadvantage with prior art devices is that they can only correctly image surfaces of uniform curvature. Moreover, absolute position calibration, absent some knowledge of the history of a spot's motion, has heretofore not been easily achieved.

Thus, there exists in the art a genuine need for a film printing system which achieves a high precision and accuracy over the entire image area by the effective use of feedback for correct beam placement.

Furthermore, there exists a need for an inexpensive method of enhancing the effective area of existing photo-sensors without introducing distortions or limiting the available light.

Lastly, a need exists for the ability to precisely locate the CRT beam to provide for the accurate positioning and joining of adjacent image sections projected onto the recording film medium, thereby producing a single, high quality image that has a significantly higher resolution than the single CRT image source. Prior art does not disclose success in this process of merging image sections to reproduce a larger, original, single image. The prior art does reproduce multiple copies of a single image on a recording medium for applications such as semiconductor device fabrication or reproduction of an original image. The prior art also produces a plurality of related and separate images on the same recording medium.

DISCLOSURE OF THE INVENTION

The present invention provides a method and apparatus for reducing the effect of recording errors on images and information which are recorded in sections onto a recording medium such as, but not limited to, film. As used herein, recording errors include, but are not limited to, pel placement errors or recording level errors in recording pels.

Images or information in accordance with the invention are recorded from a source onto a recording medium in sections in order to artificially increase the effective resolution or apparent size of the recording source. By repeatedly using a single image source to record sections of an image, the recording can effect a higher resolution or level of information content than the source. For example, a standard typewriter prints large documents using recording sections which are one character in size.

Errors in the position or recording level of the recorded sections introduced during the recording process can have a noticeable effect on the recording primarily at the boundaries between sections. In the recording of continuous images the effect can take the form of a series of light or dark lines which appear at the section boundaries. Since the recorded sections are nominally tile-like adjacent squares, the boundary effect is known as "tiling".

The tiling effect is noticeable in part because it occurs along easily recognized continuous boundary lines. The present invention reduces the effect of tiling in a number of ways primarily by spreading the effect over a boundary region of the recording medium, or by varying the shape of the section boundary.

In step-and-repeat method of film printing in accordance with the embodiments of FIGS. 1, 17, 19-22 and 29A-B of the present invention, the film recording or image is constructed as a sequence of individual recording or image sections recorded while an image source, for example, a CRT, pauses at each step-and-repeat section location. A normal 4 by 5 inch film print might require between 20 and 80 sections to form the complete image.

As the image is so constructed, there is a danger that errors in image pel (or pixel) placement or pel recording level will create a noticeable "tiling" effect between the various sections. The film image in this case would appear largely as expected, but the "tiling" could appear visually as an overlayed grid pattern.

FIG. 23A is a diagram of a film image constructed from four step-and-repeat sections, labeled A, B, C and D. The image represents a photograph of a "white wall", or some other uniformly illuminated surface. The four sections are identified by dotted lines which are not actually part of the picture. The density of the film image along cross-section line A—A', which passes through the border between the two sections C and D, is shown in FIGS. 23B-23D. This "density" or color represents the lightness (or darkness) of the film print as seen by eye. In step-and-repeat printing according to the invention, where no attempt is made to eliminate tiling, the image sections would be printed with no overlap between the different sections. FIG. 23B is a graph of the film density for that part of the image which was printed from the left, e.g., section D. FIG. 23C is the density of the right hand side or section C, and FIG. 23D is the final image density, which is a result of the addition of the contributions both sections C and D as shown in FIGS. 23B and 23C. If the printing process were perfectly controlled, as in FIGS. 23B-23D, there would be no blemish or mark to reveal that the film image was constructed as a composite of four image sections.

FIGS. 24A-24D are almost the same as FIGS. 23A-23D except that the left-side density graph, FIG. 24A has been shifted slightly to the right. This corresponds physically to an error in CRT beam position while printing the left section of the film image. The sum of the left and right densities, shown in FIG. 24C, features a density "bump" at the center point. This is due to the misplacement of the left section, and demonstrates the effect called "tiling". The "tiled" print appears as shown in FIG. 24D. If a position error had served to separate the two image sections, rather than drawing them closer, the tiling would have appeared as a decrease in the image density at the border between the sections at least at this edge. The effect could also appear as a color shift in color recording.

The ability of lenses to transmit light can depend on the angle at which light enters the lens. When a lens is used to image a uniform light source onto some medium, the intensity of the projected image normally decreases with movement away from the central axis of the lens. The rate of decrease depends on the details of the lens. This decrease is usually gradual and continuous and consequently does not result in an effect that is obvious to the eye in most cases.

In multiple lens or step-and-repeat recording such as in accordance with the systems of FIGS. 1, 17, 19-22 and 29A-B, where the recorded image is printed as a series of image sections, however, the effect can be noticeable as a systematic change in print intensity in regions where the image sections join. At these joints or borders the transmission efficiency of the lens system may be discontinuous due to the change in image source location which occurs at each border. The discontinuity in optical system characteristics can result in a discontinuity in recording level at these boundaries. This effect constitutes a recording error, and is one source of the effect called "tiling". In multiple lens recording, such as the embodiment of FIG. 1, it is the change in the lens element of a lens array that varies across the border region.

To counteract this effect, a correction is utilized, where the intensity of light used in the recording process is determined so as to eliminate the effect. Since the loss of light depends on the relative positions of the image point and lens system, and also on the design of the optical system, each image pel should be corrected for this effect as a function of position. In multiple lens printing, the correction must also be evaluated for each member of the printing lens array. Although the actual correction could be calculated from theory, it is easier in practice to measure the effect at the factory for each system, and store a number of parameters which describe the effect in memory, or some other form that is accessible to the recording instrument during recording. The correction parameters could be the coefficients of a correction equation, or they could represent a sampling of the correction factor at a number of representative points, in which case the calculation of the exact correction for a particular image point would involve an interpolation.

Errors including systematic errors in image section position as small as 0.1 pel diameter can produce very noticeable tiling. It is practically impossible to eliminate tiling through increased pel position accuracy as a consequence of the human eye being extremely sensitive to line-like or correlated features. Thus, there is a need for an improved method and apparatus for forming a recording on a recording medium which reduces the effect of recording errors on the recording.

As explained above with reference to FIGS. 24A-D, the recording of information on a recording medium in accordance with embodiments of the invention in a plurality of sections by using an array of lenses as illustrated in FIG. 1 or by using relative movement of the film plane assembly with respect to the light source by moving either or both the recording medium assembly or the light source as illustrated in FIGS. 17, 19-22 and 29A-B, the light source, or both of the recording medium assembly and light source to a plurality of addressable positions to record each section produces pel placement errors which occur between adjacent sections. While pel placement error is present during the printing of individual pels within a section, these errors are not readily perceptible because they are common to all pels within the section or because the errors vary smoothly over the section. Pel placement error in adjacent sections are not common to all pels in the adjacent sections. The difference between pel placement errors in adjacent sections creates perceptible pel placement errors at least at the boundary between adjacent sections which can produce unaesthetic artifacts. The methods a apparatus of the present invention eliminate or reduce the effect of systematic errors in pel placement which are perceptible at least at the boundaries between sections.

The methods of the present invention preferably use digital processing to provide corrections for removing or reducing the effect of pel placement errors or recording level errors at least at boundaries between adjacent sections by controlling the recording of pels within an overlap region between adjacent sections. The methods of the present invention rely upon intensity modulation of the energy source recording the pels on the recording medium in the overlap region; printing of a subset of pels along at least one axis in the overlap region during recording of pels in a current section and recording of a remainder of the pels not recorded during the recording of the current section during recording of another section; and varying for lines within the overlap region at least one address of a pair of end points where continuous recording of pels is disposed along an axis addressed relative to an origin within the current section and recording a remainder of addressable pels within the at least overlap region along the axis which were not recorded during recording of the current section during recording of another section. The aforementioned methods encompass adjusting recording in overlap regions as a function of the recorded information or adjusting the shape, size, or orientation of the recorded sections as a function of the recorded information.

More specifically, the tiling effect caused by recording errors can be reduced or eliminated according to a method for forming a recording on a recording medium according to the invention. The method comprises providing a recording medium and recording a plurality of individual sections of a recording on the recording medium joined at boundary regions to form the recording while varying a characteristic of at least one of the recorded sections at least at the boundary region adjacent at least one other recorded section to reduce the effect of recording errors on the recording. According to the disclosed embodiments of the method, the individual recorded sections of the recording are recorded sequentially on a recording medium but it is envisioned that the recorded sections could be recorded simultaneously.

In the disclosed embodiments the recording medium is film and the individual recorded sections are recorded by exposing the film to light from a light source such as a cathode ray tube. Other photosensitive devices and other types of recording mediums could be used according to the method and other light energy sources could be used to form the recording on the recording medium besides the CRT. The individual recorded sections are recorded on respective predetermined locations of the recording medium with adjacent ones of the locations overlapping one another in an overlap region.

The boundary regions of adjacent recording sections overlap one another within the overlap region in one embodiment of the invention wherein the characteristic of the recording which is varied is the density of the recording at least at the boundary region of one and preferably each of at least one adjacent recording section. Specifically, the recording density is reduced at the boundary regions of adjacent recorded sections where the sections overlap one another. The rate of reduction can be linear, second order such as parabolic or according to another function to reduce the visual impact of systematic placement errors which cause tiling by spreading the effect over a large area, namely the overlap region.

The density of the recording is varied at least at the boundary regions of adjacent recorded sections according to the method by reducing the intensity of light from the light source when recording the boundary region of adjacent recorded sections to provide the recording with reduced intensity at the boundary regions thereof. In addition, or alternatively, the time of exposure of the film to light from the light source is reduced when recording the boundary regions of adjacent recording sections to provide the recorded sections with reduced intensity at the boundary regions thereof.

In another embodiment of the method of the invention, where the individual recorded sections are formed by at least one recording line, the characteristic of the recording, which is varied at least at the boundary regions of adjacent recorded sections is the point of transition between adjacent recording lines of adjacent recorded sections to reduce the effect of recording errors on the recording. The point of transition can be varied by varying an address of at least one of a pair of end points of where continuous recording of pels is disposed along an axis. The point of transition is preferably varied in a random fashion within boundary regions of adjacent recorded sections which are located within the aforementioned overlap region of the predetermined locations. The width of the boundary region constitutes about ten percent of the width of the recorded section in the preferred form of the invention although other proportions could be employed.

The recorded sections can be formed of a plurality of recording lines using a CRT according to the invention, or as a further feature of the invention the recording lines can be formed by exposing the recording medium to light from a plurality of linear arrays of light emitting elements which overlap one another along the length of the arrays to permit the variation in the point of transition.

Irrespective of the manner of forming the recording lines, according to this embodiment of the invention, the effect of pel placement error in the recording lines occurring at boundary regions between adjacent sections of a recording medium on which information is recorded in pels, can be reduced according to a method of the invention by dividing information to be recorded into a plurality of sections, each section containing at least one line with a current section being stored as a plurality of addressable pels disposed in an addressable matrix having an origin within a center region and at least one overlap region which is common to another section with each overlap region of a current section forming a boundary with another section; recording pels of lines within at least one overlap region of the current section by varying at least one address of a pair of end points of where continuous recording of pels is disposed along an axis addressed relative to the origin; and recording a remainder of addressable pels within the at least one overlap region along the axis which were not recorded during recording of the current section during recording of another section. The at least one address of the end points varies between groups of at least one line and the at least one address of the pair of end points is an arbitrary distribution.

A method for forming a recording on a recording medium to reduce the effect of recording errors on the recording according to a still further embodiment of the invention comprises varying a characteristic of the recording at least at the boundaries of adjacent recording sections by recording a selected subset of pels at least at the boundary region of each of adjacent recording sections. Particularly, the selected subset of pels for adjacent recording sections are preferably selected such that all pels of the recording will be recorded. The distribution of the selected subset of pels at the boundaries of the recording sections can be reduced in the direction of the boundary of a section according to a linear function, a second order function such as a parabolic function or another function for spreading the effect of systematic placement errors over a large area, e.g. the overlap region.

In a specific method according to this embodiment of the invention the effect of pel recording error occurring between adjacent sections of a recording medium on which information is recorded in pels, is reduced by dividing information to be recorded into a plurality of sections with a current section being composed of a plurality of pels disposed in an addressable matrix having an origin within a center region and at least one overlap region which is common to another section with each overlap region of a current section forming a boundary with another section; recording pels within at least one overlap region of the current section by recording a subset of pels addressable along a first axis addressed relative to the origin; and recording a remainder of addressable pels within the at least one overlap region along the first axis which were not recorded during recording of the current section during recording of another section.

An apparatus of the invention for forming a recording on a recording medium by the aforementioned method of the invention comprises means for recording a plurality of individual sections of a recording on a recording medium to form the recording, and means for varying a characteristic of the recording at least at the boundary regions of adjacent recorded sections to reduce the effect of recording errors on the recording.

These and other objects, features and advantages of the present invention will become more apparent from the following description when taken in connection with the accompanying drawing which show for purposes of illustration only, several preferred embodiments in accordance with the invention.

BRIEF DESCRIPTION OF DRAWINGS

FIG. 4 illustrates a power series for expressing a transfer function;

FIG. 24A is a view similar to FIG. 23B except that the left-side density graph has been shifted slightly to the right so as to correspond physically to a systematic offset error in section position while recording the left section of the recording;

FIG. 24B is a view similar to FIG. 23C;

FIG. 24C is a view similar to FIG. 23D showing the sum of the left and right densities of FIGS. 24A and 24B and illustrating a density "bump" at the center due to the misplacement of the left-hand density;

FIG. 24D is a view of a "tiled" print having the image density illustrated in FIG. 24C;

FIG. 25 illustrates a film image composed of four step-and-repeat image sections formed according to a first embodiment of a method for forming a recording on a recording medium according to the invention, solid lines not normally seen illustrating the cross-shaped overlap region between the four sections which is that area of the film which can be recorded while the image source is recording either of two adjacent sections or, in a corner region, as in the center of the cross in FIG. 25, an overlap can be recorded from any of four sections;

FIG. 26A is a graph of the density of the image recorded while a light source was at the left-hand step-and-repeat section D of the image in FIG. 25 as seen along section line A—A' where the density is reduced linearly;

FIG. 26B is a graph of the density of the right-hand step-and-repeat section C as seen along line A—A' in FIG. 25 where the density is reduced linearly;

FIG. 26C shows the sum of the image density of sections C and D of FIG. 25 which add up to a proper density, e.g., a uniform print density;

FIG. 26D is like FIG. 26A except that the graph is shifted slightly to the right to demonstrate the tiling effect due to a recording error;

FIG. 26E is like FIG. 26B, showing the density of the recorded image of section C;

FIG. 26F shows the sum of the image density of the sections C and D printed with image densities as shown in FIGS. 26D and E and showing the change in image density due to tiling at the border;

FIGS. 27A-27C are similar to FIGS. 26A-26C in that they are graphs of the density of the left-hand step-and-repeat section, the right-hand step-and-repeat section and the sum thereof, respectively, for the overlap area of the cross section A—A' of FIG. 25 where the density is reduced according to a parabolic (second order) function, rather than linearly as illustrated in FIGS. 26A-26C;

FIGS. 27D-27F are similar to FIGS. 27A-27C, respectively, except that a light offset error in recording and the tiling resulting therefrom are illustrated;

FIG. 28A shows a recorded image composed of two step-and-repeat image sections A and B, and the overlap region between them, produced by another embodiment of the method for forming a recording on a recording medium according to the invention;

FIG. 28B is an enlarged view of the shaded area of FIG. 28A illustrating the random varying of the point of recording pels in image lines of the respective sections A and B for reducing the effect of position recording errors on the recording;

FIG. 31A illustrates a film image composed of four step-and-repeat image sections and the overlap region between them formed according to another embodiment of the method of the invention employing a random pel pattern in the overlap region of adjacent sections;

FIG. 31B is an enlarged view of that portion of the shaded area of the image of FIG. 31A which is recorded within section D;

FIG. 31C is an enlarged view of that portion of the shaded area of the image of FIG. 31A which is recorded within section C;

FIG. 31D is an enlarged view of the entire shaded area of FIG. 31A showing uniform density resulting from the sum of the image densities of sections C and D as shown in FIGS. 31B and 31C;

FIG. 31E is a graph illustrating the probability distribution of the pels of the recording pattern across the overlap region when recording the section D shown in FIG. 31A;

FIG. 31F is a graph of the probability distribution of the pels of the recording pattern across the overlap region when recording the section C, in FIG. 31A;

FIG. 31G is the sum of the left and right probability distributions of FIGS. 31E and 31F;

FIG. 34A identifies the segments of a recording section and the possible symmetry lines in the side segments;

FIG. 34B defines the geometry used to calculate characteristics of the mask array in corner regions;

FIG. 36D illustrates, similar to FIG. 36C, where dotted lines indicating the overlap region have been added; and FIG. 36E illustrates a new recording section where non-linear boundary lines have been added to the recording.

DETAILED DESCRIPTION

Figure 1:
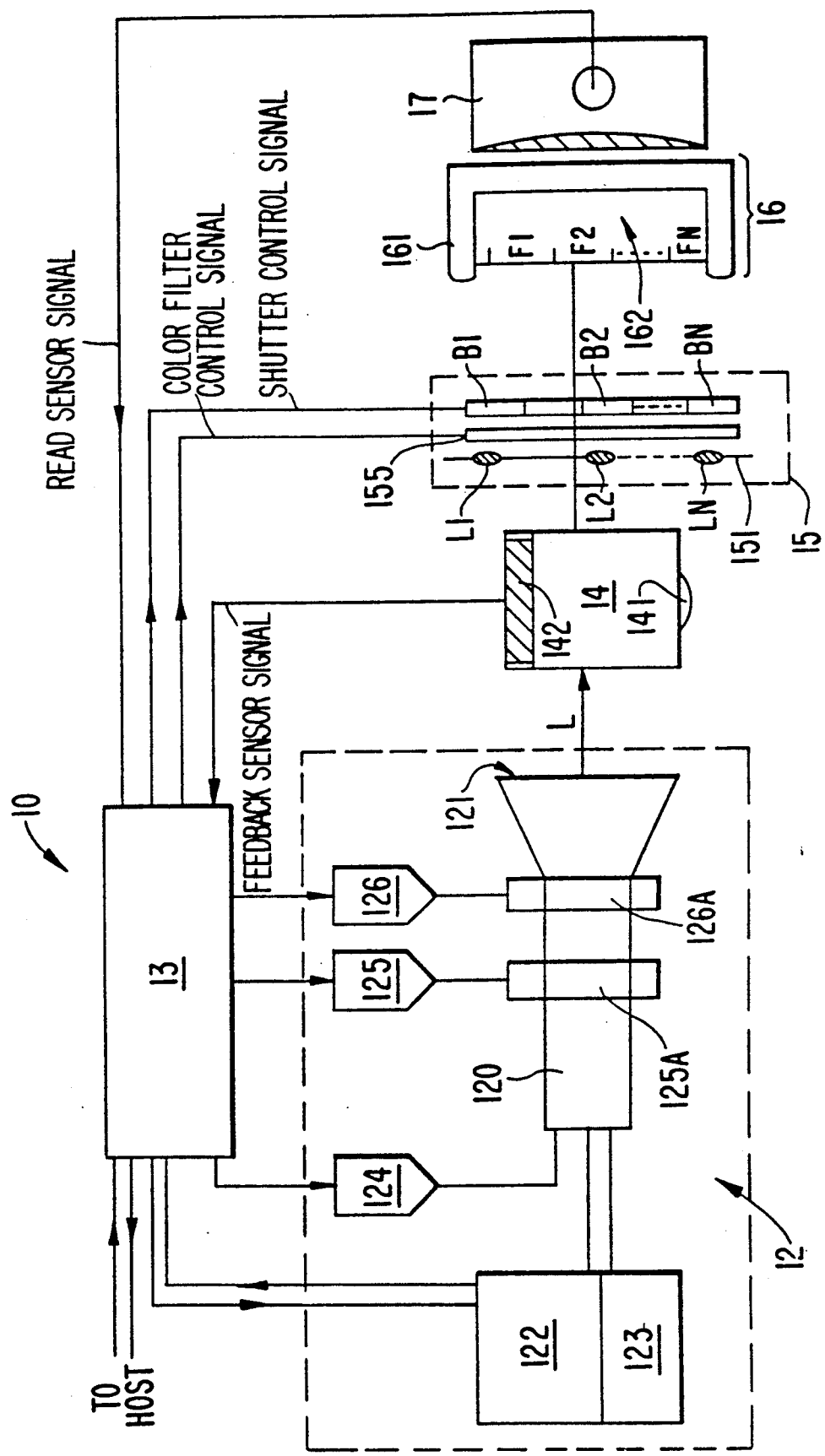
FIG. 1 is a block diagram of a first embodiment of a recording/reading system which may be used in practicing the present invention.

Referring now to the drawings and, more particularly, to FIG. 1, a film printing/reading system 10 which may be used in practicing the present invention is illustrated. The system 10 generally comprises an image/light source 12, controller 13, feedback sensor 14, lens assembly 15, film plane assembly 16, and reading sensor 17.

In a preferred embodiment, image/light source 12 generally consists of a cathode ray tube (CRT) 120. CRT 120 provides for the illumination of encoded information such as an image on the CRT faceplate 121. Image light source 12 also contains power supplies, e.g., anode and focus power supplies 122 and heater and control grid (G1, G2) power supplies 123, as well as a video amplifier 124, all of which serve to produce an image on the CRT faceplate. More specifically, the image on the CRT faceplate is created in a way similar to that used in displaying commercial television images, viz., by deflecting and modulating an electron beam within the CRT vacuum envelope. Accordingly, X deflection amplifier 125 and Y deflection amplifier 126 are controllable deflection assemblies such as digital to analog converters followed by power amplifiers which are used in conjunction with X deflection yoke 125A and Y deflection yoke 126A, respectively, to deflect the electron beam.

In reproducing an image, points on the CRT faceplate 121 are mapped onto film plane assembly 16 through lens assembly 15. In order to increase the number of pels or lines which may be printed by a CRT 120 of fixed resolution, an image is divided into sections and printed by section onto film plane assembly 16 with the sections being addressable with X,Y coordinates or other coordinate systems. Film plane assembly 16 consists of a film holder 161 which contains a recording medium 162, such as film, upon which an image is projected.

Lens assembly 15 consists of a printing lens array 151 containing a matrix of lens elements L1 through LN. Printing lens array 151 can be wide area (NXM) or one dimensional (1XN) depending upon the particular application desired. Each lens element L1-LN has an associated shutter B1-BN which is utilized when transmitting an image. For example, each shutter B1-BN is opened for the time needed to print one image section, which is displayed on the CRT as the time under the control of controller 13. The full image is then printed by sequentially displaying each image section on the CRT, opening the appropriate shutter B1-BN, thus exposing the correct lens element L1-LN and projecting that section of the image onto the correct region of the recording medium 162.

It should be recognized that applications involving both monochromatic (black and white) and polychromatic (multiple individual colors) images are encompassed within the scope of the present invention. In the case of the latter embodiment, a color filter 155 is positioned proximate to the printing lens array 151 such that light passing through lens elements L1-LN also passes through filter 155 and, thus, assumes the appropriate color value before being projected onto the film plane assembly 16. Generally, such color filters are mounted on a wheel or ring referred to as a "filter wheel". The controller 13 controls the positioning of a filter having an appropriate color value in the optical path of the light for purposes of recording on the film with the color of light transmitted by the filter.

The film plane assembly 16, and more particularly, the recording medium 162, is separated by the geometry of lens array 151 into its own theoretical matrix of tangential square regions F1-FN. Lens elements L1-LN are constructed and positioned such that each lens-shutter element (LN/BN) can project an image section of the CRT faceplate that more than covers the associated element FN of the theoretical matrix of recording medium 162.

In order to accurately reproduce an image, therefore, each section of the final image must be printed without the effects of errors introduced by the recording process. To accomplish this result, the system 10 utilizes feedback sensor 14 and controller 13.

Figure 2:
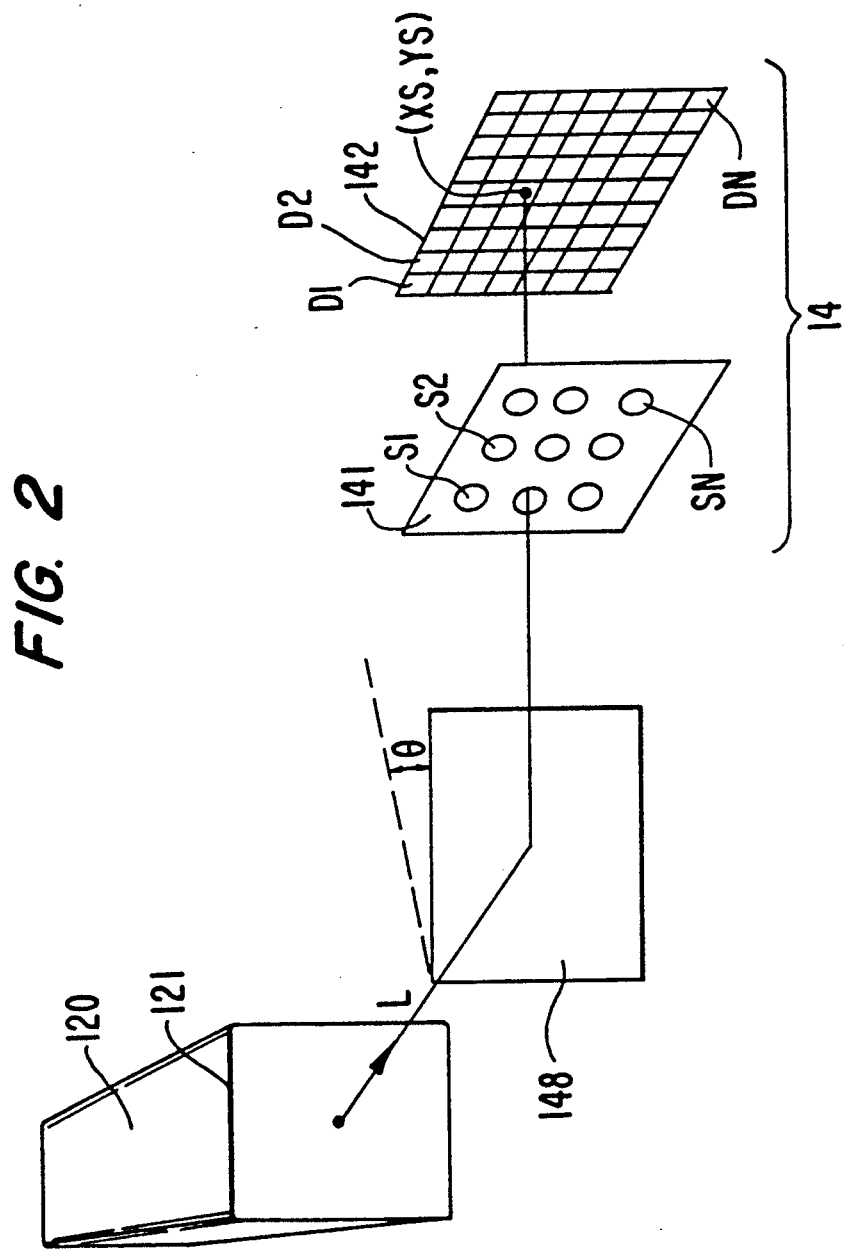
FIG. 2 illustrates a feedback sensor used with a recording/reading system used for practicing the present invention.

As shown in FIG. 2, feedback sensor 14 includes sensor lens array 141 containing a matrix of lens elements S1-SN and a photosensitive element 142. A light beam L which is projected from an image on the CRT faceplate 121 is directed by beam splitter 148 through sensor lens array 141. The beam splitter 148 is placed at a forty-five degree angle with respect to the plane of the CRT faceplate 121, and serves to direct light from the CRT onto sensor lens array 141. Of course, it would also be possible to position CRT 120 such that light would reach feedback sensor 14 directly.

Light beam L passes through sensor lens array 141 and falls onto photosensitive element 142. Element 142 consists of a wide area array of adjacent photosensitive elements such as a charge coupled device (CCD) array, a photo-diode array, a charge injection device (CID), or some similar array of closely packed elements. As shown in FIG. 2, photosensitive element 142 consists of an array of photo-diodes D1-DN. As light beam L is projected onto the sensor area of element 142, one or more of the photo-diodes D1-DN is activated. Light beam L falls onto photosensitive element 142 at a particular sensed position having coordinates (XS, YS).

As shown in FIG. 1, the sensed position (XS, YS) is then fed back to controller 13. The (XS, YS) coordinates are then converted by reference to a preestablished algorithm or mapping, to film coordinates (XF, YF) and compared to a desired print position (X, Y). Controller 13 adjusts light/image source 12 accordingly, and the appropriate image point is then accurately printed onto recording medium 162, and the process is repeated until the entire image section is constructed on the recording medium.

In an alternative embodiment of the present invention, feedback sensor 14 is placed in between lens assembly 15 and film plane assembly 16. The sensor would then receive light reflected from the surface of the film plane. This particular arrangement is useful in situations where it would be advantageous to gather light from the film plane rather than the CRT for feedback purposes.

Figure 3:
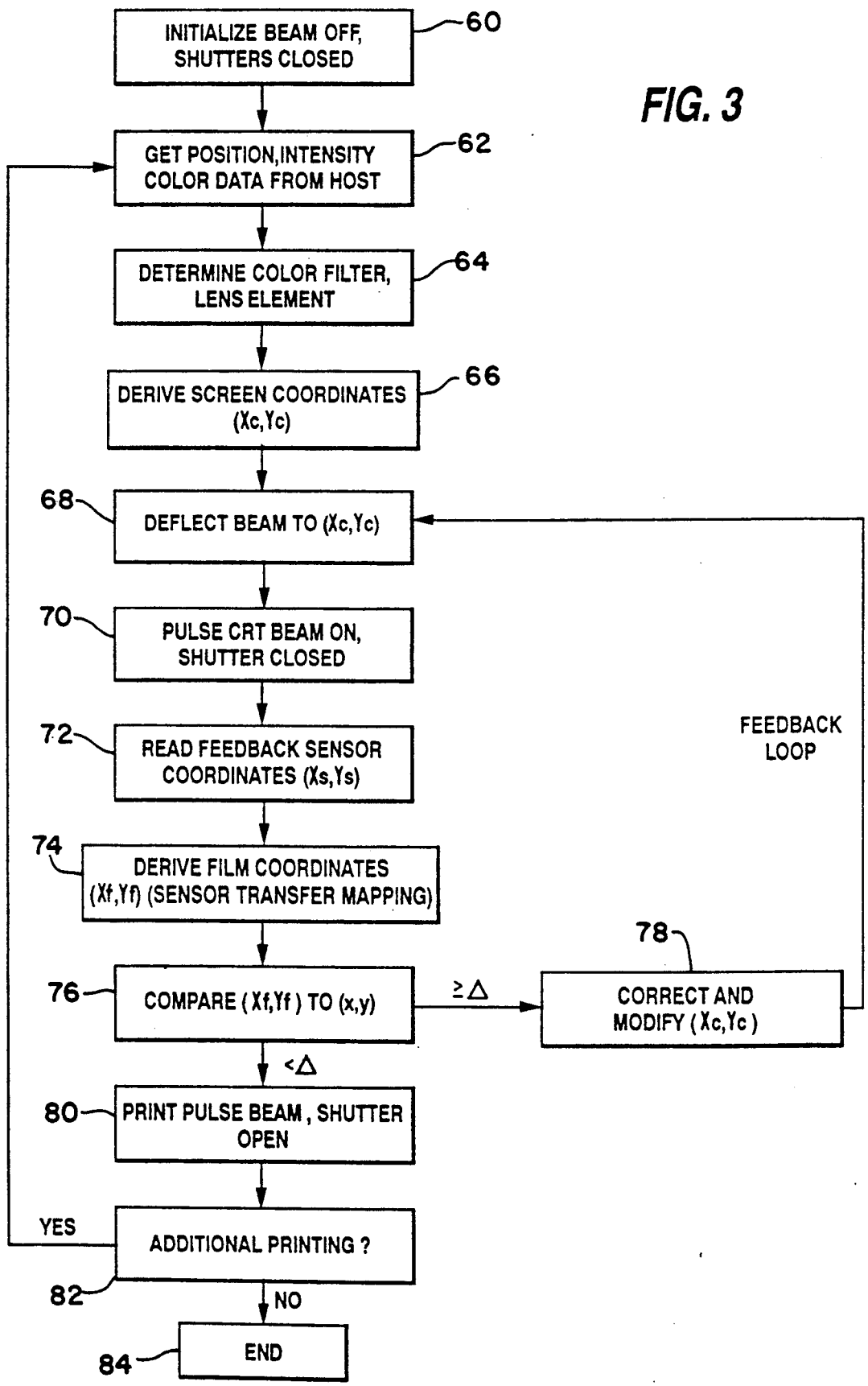
FIG. 3 is a flow chart of the steps involved in the printing process performed by the system of FIG. 1.

The flow chart of FIG. 3 delineates the steps involved in a printing process and more specifically, the printing of a single pel or point onto film. Generally by printing a sequence of pels, a number of steps involved in the printing sequence could be eliminated since a single deflection calibration may be used for an area smaller than or larger than an image section F1-FN, thereby increasing the efficiency of the system. This reduction of steps is possible in areas where there is no need to resort to feedback at each image point. Such areas are identified as collections of closely lying image points which suffer substantially the same aberrations or displacements. A single measurement of these aberrations or displacements using the feedback sensor system will therefore yield correction parameters which apply to all points within the area.

At point 60 in the operation, the CRT beam is turned off and the shutters of the printing lens array are closed. Any necessary initialization procedures are performed, including the obtaining from the host computer parameter specifications such as film sensitivity, speed data, image and picture sizes, and color correction codes. The controller then obtains data on the position (X, Y), color C, and intensity Z of the next point to be printed as indicated at point 62. The (X, Y) coordinates represent points on a hypothetical Cartesian coordinate system on the film.

Using the (X, Y) value, the controller determines in which segment of the film plane the point lies, and accordingly sets an internal status bit to indicate which lens element LN of the printing lens array should be unshuttered when actual printing is done. The controller further positions the appropriate color filter in front of the selected lens element based upon the prior obtained color data C as indicated at point 64.

The printer system next derives the CRT screen point coordinates as indicated at point 66. More specifically, using a CRT mapping algorithm, the system estimates the point (Xc, Yc) on the CRT faceplate which corresponds to the desired point (X, Y) on the film plane. The CRT mapping algorithm relates coordinates on the film plane to positions on the CRT faceplate such that a light beam emitted from a point (Xc, Yc) on the CRT faceplate is projected onto the film plane at point (X, Y). This relation is then translated into command information for the deflection assembly. This algorithm may rely either on mathematical calculations or on a look-up table, using pre-determined, pre-calibrated parameters. The derivation of the algorithm is described below in conjunction with FIGS. 5-9.

The command information is sent to digital to analog converters which drive the CRT beam deflection electronics. Controller 13 instructs the deflection electronics to move the CRT beam to a point on the CRT faceplate which would roughly place the projected point at the desired location on the recording medium as indicated at point 68. The controller 13 relies on the inherent linearity of standard deflection systems to perform this task accurately. In general, within a particular image section, beam deflection instructions or data will be proportional to the (X,Y) coordinates of the image element position, but include an offset which depends on which section is being printed (or read). This correspondence constitutes an unstated calibrated algorithm or mapping. The point of the CRT face to which the beam is deflected (although it might then be turned off) is indicated by the coordinates (Xc, Yc).

The deflection amplifiers may be either electromagnetic or electrostatic type deflection units. With the shutters remaining closed, the CRT light beam is pulsed on for a predetermined period of time as indicated at point 70. During this time, the light beam is directed to the feedback sensor such that the beam falls upon the photo-sensitive element at a point (Xs, Ys).

Next the controller interrogates the feedback sensor to obtain the coordinates (Xs, Ys) as indicated at point 72. The sensor position values (Xs, Ys) are then converted into film coordinates (Xf, Yf) using a sensor transfer mapping algorithm as indicated at point 74. This algorithm may also depend upon mathematical calculations, table look-up, or both. The mapping data utilized in the algorithm are based upon the geometrical relationships among the plane of the sensor, the CRT faceplate, the printing lens array, and the film plane. These geometrical relationships are quantified and encoded during manufacture, and accompany the film printing system throughout its use. The mapping may also be obtained by using the unit's film reading capability. In this case, a special film image, accompanied by descriptive information, is read or digitized by the film printer system. Comparing the digitized information to the description associated with the calibrated image yields a transfer map or algorithm.

Using the value (Xs, Ys) and the particular lens element LN of the printing lens array, the system calculates a position (Xf, Yf) which corresponds to the point on the film where the light spot from the CRT would be projected if the shutter BN of the N'th element LN of the printing lens array were opened.

The desired film printing position (X, Y) is then compared to the point (Xf, Yf) as indicated at point 76. If the difference between these two positions is less than a predetermined criterion or threshold, D, the light beam is considered to be correctly aimed, and the printing of the point by opening the appropriate shutter/lens elements (BN/LN) and pulsing the light beam therethrough onto the film is achieved as indicated at point 80. The beam is pulsed on for a time T at a beam current I. The resulting film exposure as determined by the product T*I*V, where V is the CRT beam or anode voltage and is often a constant value, is proportional to the desired intensity Z originally stored in the host.

Printing the correct intensity on the recording medium involves using controller 13 to command the CRT to emit a certain intensity of light at the appropriate location for an appropriate time T. The intensity of light emitted from the CRT in response to specific commands from controller 13 is calibrated periodically. The feedback sensor, used to measure the CRT beam position, can also be used to sample the CRT beam spot intensity. Since an image of the spot normally appears somewhere on the sensor element, and since most photosensors respond proportionally to light intensity, such a measurement is possible. These data will be used to insure correct film printing intensity.

If, however, the difference in position values is greater than the threshold, the position of the CRT light beam must be adjusted accordingly as indicated at point 78. Once the appropriate adjustments to the position of the beam have been made via the controller and the deflection electronics, the point is then printed as described above. The printing process is then repeated as indicated at point 82 until all desired pels have been printed as indicated at point 84.

The film may also be printed in a "burst" mode whereby the appropriate correction parameters are evaluated over small regions of the CRT rather than on a pel by pel basis. In this case, it is assumed that the image pels recorded during a burst lie sufficiently close to each other, or are so uniformly affected by aberrations in the deflection and lens systems, that one set of correction data applies to all pels within the region. It is assumed that the aberrations change slowly enough with time that all pels within the region can be printed before the correction data becomes inaccurate. This correction data, when applied to the beam deflection system, serves to properly and accurately locate each of the image elements on the recording medium. An advantage of printing in a burst mode would be a reduction in printing time by eliminating time for calibration of the CRT for each point to be printed.

If there is some uniform way in which the deflection system is deficient or inaccurate, this inaccuracy can be measured to derive at least one correction parameter which is applied to all points within the limited area of the image. This would allow a precise location of the CRT beam without resorting to the feedback system at each point. The particular way in which the deflection command data would be corrected or modified would be found by comparing (X, Y) values to (Xf, Yf) values for a number of separate image points within the area of interest. This comparison would lead to at least one simple correction parameter which would be used to modify the deflection system command data. This is essentially a higher level use of the feedback loop data, in that several feedback measurements are integrated into a location correction table/algorithm for the deflection system.

The term "CRT coordinates" also means "CRT deflection commands", or whatever information is used to move the CRT 120 light spot to a given position. The calibration that relates CRT coordinates to film coordinates automatically takes into account all aberrations, non-linearities, and distortions, etc. that affect the position of the light spot on the film plane. Calibration of the deflection system corrects for optical aberrations of the light transport system such as occur in the projection lens. The term "deflection calibration" is used for the calibration procedure because only the deflection system parameters are subject to change under normal circumstances. So "calibration" means the derivation using optical feedback of a relationship between CRT (image source) coordinates and film plane (recording medium) coordinates which can be used to calculate appropriate CRT (image source) coordinates given desired print position (recording medium) coordinates.

In the following embodiments, the term CRT is used to describe the image source, and CRT coordinates are used to describe locations on the CRT screen or faceplate. Furthermore, the recording medium is frequently identified as film. It should be understood that the invention includes, but is not limited to these particular embodiments with other light sources having a controllable light emitting spot and any light sensitive recording medium being within the scope of the invention.

One embodiment of the calibration data is a power series, as shown in FIG. 4. In FIG. 4, the CRT coordinates are calculated as a function of desired film position (Xfilm, Yfilm), which are labeled (X,Y) in FIG. 4, and parameters A(N) and B(N), which are one embodiment of the calibration parameters or correction parameters. If these parameters are properly evaluated, this equation provides a means to calculate the CRT coordinates required to accurately locate the CRT light beam at a particular point on the film. These parameters can be evaluated if a representative set of data relating CRT coordinates and film coordinates are available. These data are normally supplied by the optical feedback system as pairs of corresponding CRT and film coordinated points. Specifically, in the case where the calibration data take the form of a power series, the parameters can be evaluated by a "least squared" mathematical fitting procedure. This procedure calculates the values of the parameters A(N), B(N) such that the (Xcrt, Ycrt) can be predicted given the input values for (Xfilm, Yfilm). The accuracy of the result depends on the correct choice of included terms in the power series representation, on the number and distribution of the representative data pairs, and on the accuracy of the input data. The choice of power series terms depends on the details of the optical system and the deflection system. Consequently, the specific form of the equation may vary with different embodiments of the invention. The parameters A(N) and B(N) may vary with time, due to changes in the electrical parameters which characterize the deflection system. These changes are caused, for example, by temperature variations, and require that the calibration procedure be repeated, or at least checked for accuracy, periodically. The parameters may be different for physically separated locations within the image, in which case recalibration would be required as different areas of the recording medium are printed.

One use of the optical feedback system is to provide the representative data pairs, relating CRT coordinates to film coordinates, from which the calibration parameters A(N) and B(N) are evaluated.

The calibration process begins as a point is displayed on the CRT area at position (Xcrt, Ycrt). As the point is displayed, an image of the light spot is projected onto the surface of the feedback sensor at position (Xsensor, Ysensor). The feedback sensor is interrogated by the controller to determine these position coordinates. The controller stores the display coordinates (Xcrt, Ycrt) along with the sensor coordinates (Xsensor, Ysensor). This process is repeated for a number of points distributed over the display area.

For each sensor point (Xsensor, Ysensor) the controller calculates a film plane location (Xfilm, Yfilm), which is the point at which the light from the CRT would have intersected the film plane were the appropriate shutters open. The film coordinates are calculated from the sensor coordinates by reference to a factory calibrated mapping or calculational algorithm which relates sensor coordinates to film coordinates in the above sense. The mapping or algorithm can be embodied as a power series, in which the film coordinates (Xfilm, Yfilm) are calculated as a function of the sensor coordinates (Xsensor, Ysensor) and a number of calibration parameters AS(N) and BS(N). The parameters AS(N) and BS(N) are determined by the details of the optical system which transmits light from the image source to the sensor and to the film, and are evaluated at the factory, as described below. Since the optical system does not vary with time like the deflection system, these parameters are constant, and do not normally require re-evaluation.

In this way, the controller produces pairs of points which relate CRT coordinates to film coordinates. These data are used as input to the fitting procedure which calculates the coefficients of the power series of FIG. 4. This completes the calibration of the deflection system.

Figure 5:
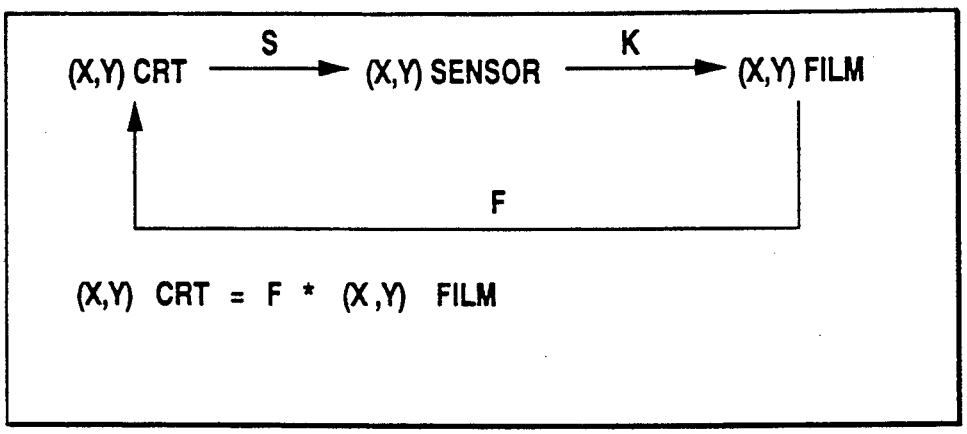
FIG. 5 illustrates a first method of calibrating the deflection system of a recording/reading system which may be used in practicing the present invention.

The calibration process can be symbolized as shown in FIG. 5. In FIG. 5, CRT coordinates (X,Y)crt are transformed to sensor coordinates (X,Y)sensor by the transform labeled (S). This transform symbolizes the transmission of light from the image source to the feedback sensor. The calculation of film coordinates from sensor coordinates is symbolized by the transform labeled (K). This transform requires the factory calibrated mapping which relates sensor coordinates to film coordinates The transform (F) symbolizes the calculational form of the calibration data, which may appear as a power series expansion as in FIG. 4. Film coordinates are converted to CRT coordinates using the calibration data embodied in the transfer function F. This relation can be symbolically written as:

$$(Xcrt, Ycrt) = F * (Xfilm, Yfilm)$$

where "F *" symbolizes the application of the (F) transform to whatever follows, in this case the film coordinates.

Factory calibration data is used to derive a closed form analytic expression which relates film plane coordinates to feedback sensor coordinates. The analytic expression can take the mathematical form shown below:

$$Xfilm = AS(0) + AS(1)*X + AS(2)*Y + AS(3)*X*Y +$$
$$AS(4)*X*X + AS(5)Y*Y + AS(6)*X*R + AS(7)*Y*R +$$
$$AS(8)*X*R*R + AS(9)*Y*R*R$$
$$Yfilm = BS(0) + BS(1)*X + BS(2)*Y + BS(3)*X*Y +$$
$$BS(4)*X*X + BS(5)*Y*Y + BS(6)*X*R + BS(7)*X*R +$$
$$BS(8)*X*R*R + BS(9)*Y*R*R$$

Xfilm and Yfilm are film or target coordinates, and the (X,Y) are shorthand for the sensor coordinates—(Xsensor, Ysensor)—where the light spot is projected onto the feedback sensor. The AS(N) and BS(N) are the coefficients of the power series which mathematically connects the film coordinates to the sensor coordinates. There are a number of terms in the expansion. These terms must be specifically tailored to anticipate the expected aberrations which occur in the optical system and elsewhere. A number of terms depend on the radius R and the radius squared R*R, where R=square root of the quantity (X*X+Y*Y). The specific terms included in the power series will change in different embodiments of the invention.

The expansion coefficients are an encoded form of the geometric relationship between the sensor and film planes. These power series equations are used to derive the position of the light spot on the film surface (Xfilm, Yfilm) knowing the location of the spot on the sensor surface (Xsensor, Ysensor).

Since the coefficients AS(N) and BS(N) are fixed by the geometry of the film printing hardware, they are constant in time since the physical geometry of the system is fixed (short of damage). The coefficients are derived by mathematically fitting the form of the equation, using least squared methods, to known data (measured at the factory) which relates the two planes. This process is similar to the process used to evaluate the coefficients of the power series relating CRT coordinates to film coordinates.

The process begins by displaying a number of points on the CRT surface and recording the positions where the spots are projected onto both the film plane and the sensor plane. This process is performed at the factory using sensing equipment used to measure the position of the light spot on the film plane while recording the data from the feedback sensor. The result of the data gathering phase is a collection of pairs of points relating spot positions on the sensor to spot positions on the film. This data can be directly used to calculate the coefficients AS(N) using standard least-squared fitting techniques. The validity of the coefficients and the accuracy of the derived relationship will depend on the choice of terms included in the expansion series. In general, the choice of terms is made knowing the way in which the light spot is conveyed from the CRT to the two targets. The factory calibration results in an equation accurately relating sensor coordinates to film plane coordinates.

Changes in the deflection system parameters of the CRT 120 accumulate slowly with time. Consequently, these changes may be mathematically simpler to describe than the total characteristics of the deflection system. If the deflection system of CRT 120 can be recalibrated often enough, changes in the deflection parameters can be described by a power series expansion of fewer terms than are required to totally characterize the deflection. Using this fact can simplify the calibration procedure performed in "burst mode" calibration.

The simplified calibration process essentially derives at least one correction parameter used for correcting the existing deflection calibration rather than deriving the whole calibration itself. This saves time and can improve the accuracy of the calibration.

Figure 6:
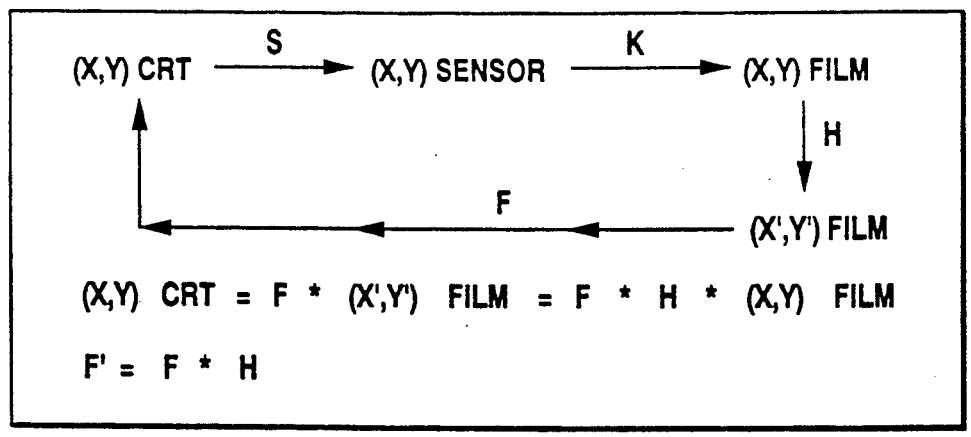
FIG. 6 illustrates a second method of calibrating the deflection system of a recording/reading system which may be used in practicing the present invention.

With reference to FIG. 6, the calibration process begins with a set of "target" film coordinates (X'film, Y'film), which represent the desired location on the film of a number of points to be "printed". Quotes appear around "printed" because these points are never "printed" on film, but are used only for calibration of the deflection system. The prime mark (') is used to distinguish these "target" film coordinates from the real "resultant" film coordinates derived later. With reference to FIG. 6, the primed film coordinates, which appear at the bottom-right corner, are converted to CRT coordinates (or commands) using the existing deflection calibration data embodied in the transfer function (F). This relation can be symbolically written as:

$$(Xcrt, Ycrt) = F * (X'film, Y'film)$$

where "F*" symbolizes the application of the transfer function (F) to whatever follows, in this case the primed film coordinates. The CRT light spot is located at the CRT coordinates, and the light spot is turned on briefly.

In this way a number of points (about 20) are displayed on the CRT 120. The feedback sensor coordinates (Xsensor, Ysensor) are read and stored for each point. The sensor coordinates are converted to equivalent film coordinates (Xfilm, Yfilm) using the aforefixed factory calibration of the feedback sensor relating these two planes, and symbolized by the transform labeled K in FIG. 6. These film coordinates are unprimed, and differ from the intended (primed) target film locations (X'film, Y'film) which were used to originally calculate the necessary CRT coordinates. The difference between the expected and actual film coordinates can arise if the deflection transfer function (F) is no longer accurate due to electronic drift of the deflection system parameter. Still, the unprimed film coordinates represent where the light spot would actually hit the film were the shutters open. This is true because the transfer function (K) relating sensor coordinates to film coordinates, which was used to calculate these values from the sensor coordinates, always maintains its accuracy since no deflection parameters are involved.

Next a correction transfer function (H) is derived by fitting the primed film coordinates to the unprimed film coordinates.

$$(X'film, Y'film) = H * (Xfilm, Yfilm) \quad (1)$$

Note that the CRT coordinates were derived using $$(Xcrt, Ycrt) = F * (X'film, Y'film) \quad (2)$$

Applying the function (F) to each side of equation (1), and then substituting equation (2) the result is:

$$F * (X'film, Y'film) = F * H * (Xfilm, Yfilm) \quad (3)$$

$$(Xcrt, Ycrt) = F * H * (Xfilm, Yfilm) \quad (4)$$

Equation (4) relates the CRT coordinates (Xcrt, Ycrt) of a printed point to the actual resulting film coordinates (Xfilm, Yfilm) of that point. This data typifies the relationship needed to calculate CRT coordinates from film coordinates in order to correctly locate the CRT light spot.

Consequently, the new and correct relation between the film coordinates and CRT coordinates is the product of the old transfer (F) and the function (H) which we just derived:

$$F' = F * H \quad (5)$$

The indicated product can be formed either by multiplication of the matrices which hold the coefficients of the F and H power series transforms (see below), or by sequential application of both the H and F individual transforms. In practice, sometimes the same F is used, and H is rederived when recalibration is necessary. Alternately, F can be replaced with F', which means the coefficients of the F calculational algorithm (normally a power series expansion) are updated.

This method establishes an accurate working relation between the CRT coordinates and the film coordinates. The advantage here is that the function H, which is simply a correction to the existing transfer function F, is simpler and consequently easier to evaluate than the total transfer function F. Essentially it is necessary to evaluate only the changes to the deflection command system and not the whole system itself, and use this information H to update the existing calibration F.

In all embodiments, the transfer function (F) could not be accurately derived if it were limited to inspecting points on the periphery of the image. In the case where the transfer function F is embodied as a power series, in order to accurately locate the CRT light spot, many power series terms are necessary in the equation which relates film plane locations to CRT locations. In order to derive the coefficients of these terms, it is necessary to collect calibration data from a number of points distributed over the active area of light source CRT 120.

The transfer function H can be expressed as a power series. In this case, H is derived by mathematically fitting the calibration data to a particular set of power series terms. The calibration data determines the coefficients of the power series. With known coefficients, the power series can be used to correct the CRT coordinates derived using the standard transfer function F. In this way, we formulate an accurate algorithm for predicting the CRT coordinates needed to locate the light spot at a certain film location.

In one embodiment the power series represented symbolically by H has the form:

$$X' = A(1)*X + A(2)*Y + A(3) \quad (6)$$

$$Y' = B(1)*X + B(2)*Y + B(3) \quad (7)$$

Figure 7:
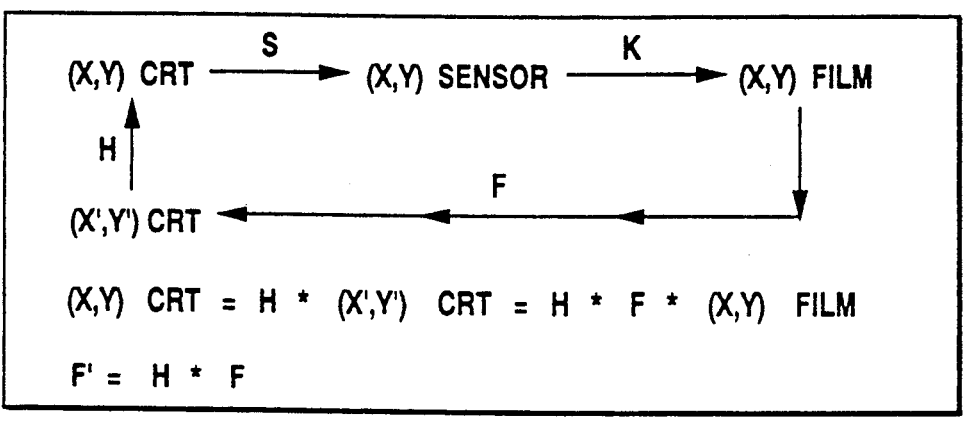
FIG. 7 illustrates a third method of calibrating the deflection system of a recording/reading system which may be used in practicing the present invention.

The method of FIG. 7 is almost identical to the method of FIG. 6 described above. The difference is that this correction transform H is derived by fitting desired CRT coordinates to calculated CRT coordinates, rather than fitting desired film coordinates to actual film coordinates. The H function is not the same in both cases, but can still be used to determine an accurate F' function. In the method of FIG. 7, the new function F' is found by:

$$F' = H * F. \quad (8)$$

Figure 8:
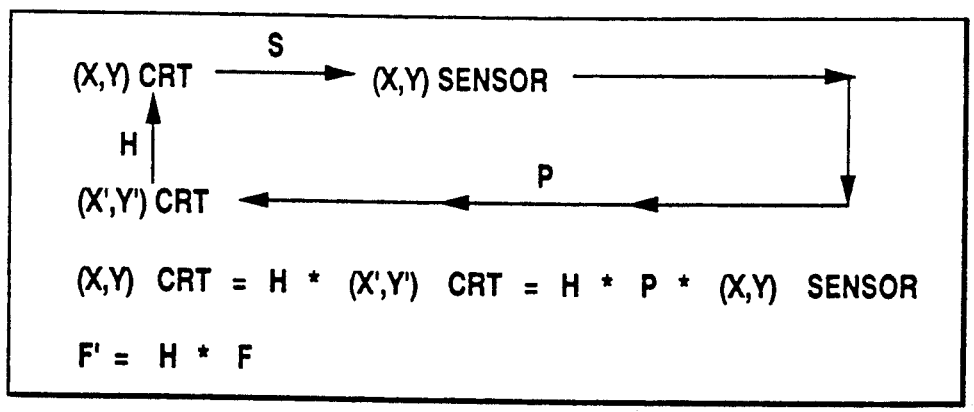
FIG. 8 illustrates a fourth method of calibrating the deflection system of a recording/reading system which may be used in providing the present invention.

It should be noted that the order in which the transforms are applied has been reversed The method of FIG. 8 is almost identical to the methods of FIGS. 6 and 7, but by-passes the use of film coordinates during feedback calibration In the method of FIG. 8, another factory calibrated transform P is used to relate feedback sensor positions to CRT positions. This calibration is separate from (but related to) the mapping which relates film coordinates to sensor coordinates. Essentially, the P transform represents a standard "reference" relation between the sensor coordinates and CRT coordinates, and is nominally equal to the product of transforms K & F in the method of FIG. 5.

The calibration of the deflection system using optical feedback follows the same steps as before to determine a correction transform H. This transform is used to modify/correct the film-to-CRT mapping by:

$$F' = H * F \quad (9)$$

where F' is the new, corrected map.

Figure 9:
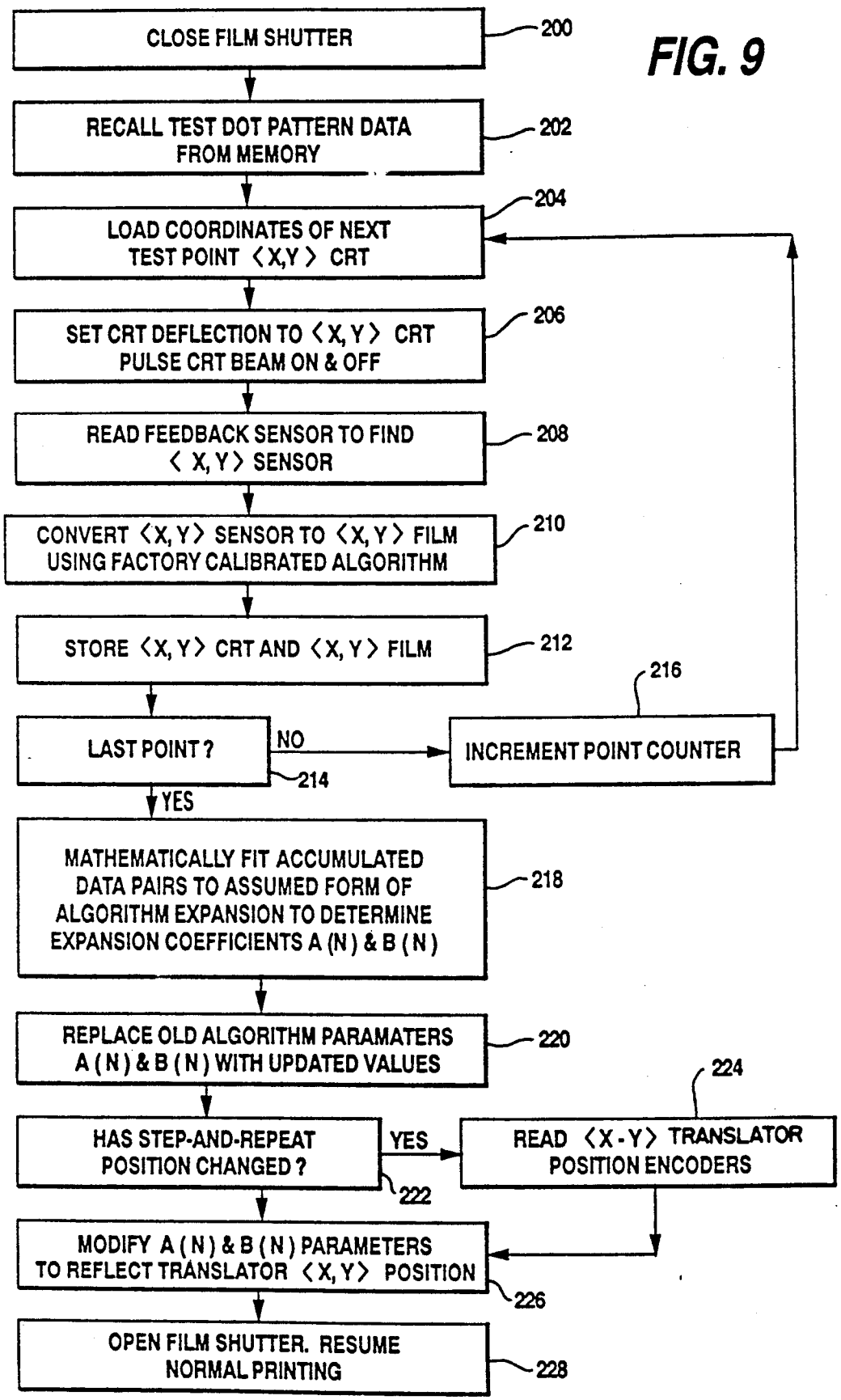
FIG. 9 illustrates a detailed flow chart of the calibration of the deflection system.

FIG. 9 illustrates a flow chart detailing the sequence of steps required to calibrate the deflection system of a recording/reading system which may be used in practicing of the invention.

The following numbered paragraphs refer to corresponding numbered steps of the flow chart in FIG. 9.

200. Close the film shutter so that light from CRT 120 can not improperly expose the recording medium during the calibration procedure.

202. Recall a predetermined set of test points as referred to above from memory associated with controller 13. This set consists of a number (about 20) of points defined by their (X,Y) position on the CRT.

204. This is the beginning step of a loop. Recall the <X,Y> coordinates of the next test point.

206. Deflection of the CRT beam and "print" occurs at this point. Since the film is shuttered off, no "printing" occurs. The feedback sensor 14, is imaged with light from CRT 120 which is unaffected by the film shutter.

208. After exposure, the sensor 14 is interrogated to find where the light spot from the CRT 120 intersects the sensor surface. This position is represented by (X,Y) sensor coordinates.

210. Using the factory-provided sensor calibration data, the (X,Y) sensor coordinates are converted to (X,Y) film coordinates. The film coordinates identify where the light spot would have intersected the film had the film shutter been opened. The actual calculation of the film coordinates from the sensor 14 coordinates uses a calculational algorithm like the power series in FIG. 4. In multiple-lens type systems, as in FIG. 1 in accordance with the invention, there is one factory calibration for each lens, and the correct sensor-calibration data set must be used. In step-and-repeat systems of FIGS. 17, 19–22 described below, there is only one lens, and consequently only one factory calibration.

212. The CRT coordinates and the film coordinates are stored in local computer memory.

214 and 216. If there are more test points to "print" the point counter is incremented and operation loops around to step 204.

218. The test printing is all done. Here the data is interpreted to yield a calculational algorithm for correcting the deflection system. A number of data pairs (CRT & film) which describe the mapping or relationship between CRT coordinates and film coordinates in the sense that a point of light emitted at point (X,Y)crt will result in an exposed spot on the film at point (X,Y) film are used. The data is fitted to a power series expansion, as in FIG. 4 The raw data is used to determine the coefficients A(N) & B(N) of the series expansion. These coefficients then represent an encoded description of the relationship between CRT and film coordinates. The power series representation is readily used in practice. Knowing the A(N) & B(N) coefficients and the desired film location to be exposed, the required CRT deflection or coordinates can be predicted. The mathematical fitting procedure which determines the coefficients of the power series is a least-squared fit. Note that other data encoding schemes could have been used. The success of the method does not rely on any particular representation.

220. The old A(N) & B(N) coefficients in memory are replaced with the new values.

222 and 224. These steps would not appear in systems which utilize multiple lens printing of FIG. 1, and are unique to step-and-repeat systems of FIGS. 17 and 19–22.

In step-and-repeat systems, the calculational algorithm relating CRT coordinates to film coordinates depends on the position of the translator described below with reference to FIGS. 17 and 19–22 relative to the CRT. In order to predict where the CRT light will hit the recording medium, it must be known where the film is. This position is provided most simply by high resolution encoders associated with the motors which are part of the translator as described below in conjunction with FIG. 17. In other implementations, the film location information may be provided with low resolution encoders associated with the motors of the translator supplemented by optical feedback of a reference grid, or mask as described below with reference to FIGS. 19–22 to provide high resolution determination.

The power series coefficients A(N) & B(N) can be modified to reflect the relative position of the film and CRT.

228. The film shutter is opened and normal printing is resumed, with the knowledge that each and every image point will fall at the properly allocated film position.

Figure 10:
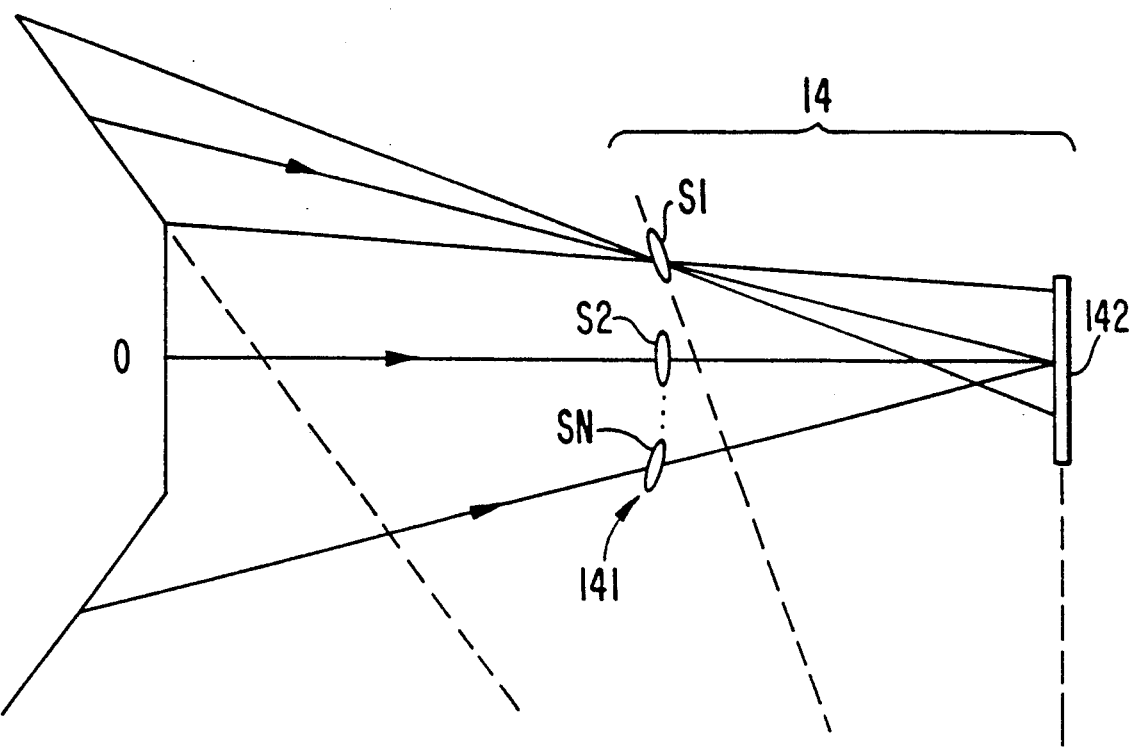
FIG. 10 illustrates an alternative embodiment of the feedback sensor used in a recording/reading system which may be used in practicing the present invention, which accounts for non-flat light emitters.

Although the feedback sensor will work with a single lens in place of sensor lens array 141 and a single photosensor as element 142, there are advantages, e.g., cost benefits, in artificially enhancing the effective area of the photo-sensitive element by using a lens array. More specifically, as shown in FIG. 10, the net effect of sensor array 141 is to extend the effective area of coverage of the sensor, thereby enhancing the resolution of the sensor. The use of a lens array also permits a flexibility not found in prior systems. In particular, the individual spacings of the sensor lens array elements S1-SN may be arranged so as to provide coverage at specific critical regions of the image source (shown in FIG. 10 as object O), including an overlap of coverage. Additional parameters of sensor lens elements S1-SN, such as focal lengths or object distances, may be individually varied to accommodate unusual, e.g., curved, surfaces or regions on object O upon which a light emitting mark is found.

The case where a lens array couples light from the image source to the optical feedback sensor requires a two level calibration. Referring to the numerals in FIG. 1, light emitted from a point on image source 121 is directed by beam splitter 148 to the optical feedback sensor 14. Lens array 141 focuses light from image source 121 onto photosensor array 142. Lens array 141 is constructed, and in particular the spacing of the individual elements of the lens array is designed, so that different areas of the image source are focused onto the photosensor array by each lens element. These different areas of the image source may overlap to some extent, or they may be fully separated. The photosensor array 142 can be interrogated by controller 13 to which is to say that the controller can determine the (Xs, Ys) coordinates of the light spot. Absent any other information it would be impossible to determine the location of the light spot on the image source from (Xs, Ys) since there is a natural ambiguity introduced by the plurality of lens elements 141. This is to say, image spots produced at a number of different image source locations can result in a spot at the same location of photosensor 142 by propagating through different lens elements. This ambiguity in the sensor response is resolved by the uncalibrated image source light positioning system. In the case where the image source is a CRT, there exists an approximate deflection system calibration formed by the basic circuit elements of the deflection electronics, even in the absence of feedback calibration. In most instances, this inherent or residual calibration is accurate to a few percent. For example, commercial television systems, which nominally lack any optical feedback means, use this residual calibration to reliably locate the television image near the center of the television screen. This residual calibration determines the approximate position of the light spot. Knowing the approximate position of the light spot on the image source identifies the element of lens array 141 used to transmit light onto sensor 142. The identity of the lens element in turn determines which set of calibration parameters should be used to derive image coordinates or recording medium coordinates from the sensed data (Xs, Ys). These calibration parameters are provided by factory calibration as previously described, and may mathematically assume the form of a power series, look up table, or some other calculational form. In this way, a dual level calibration scheme is used to provide high precision spot location coordinates. These data can be used directly for light spot control, or can be integrated to form correction parameters used to position the light spot position during burst mode printing. Note that the spacing and location of the lens elements of array 141 must be specifically designed so that the dual level calibration process will operate properly.

Figure 11:
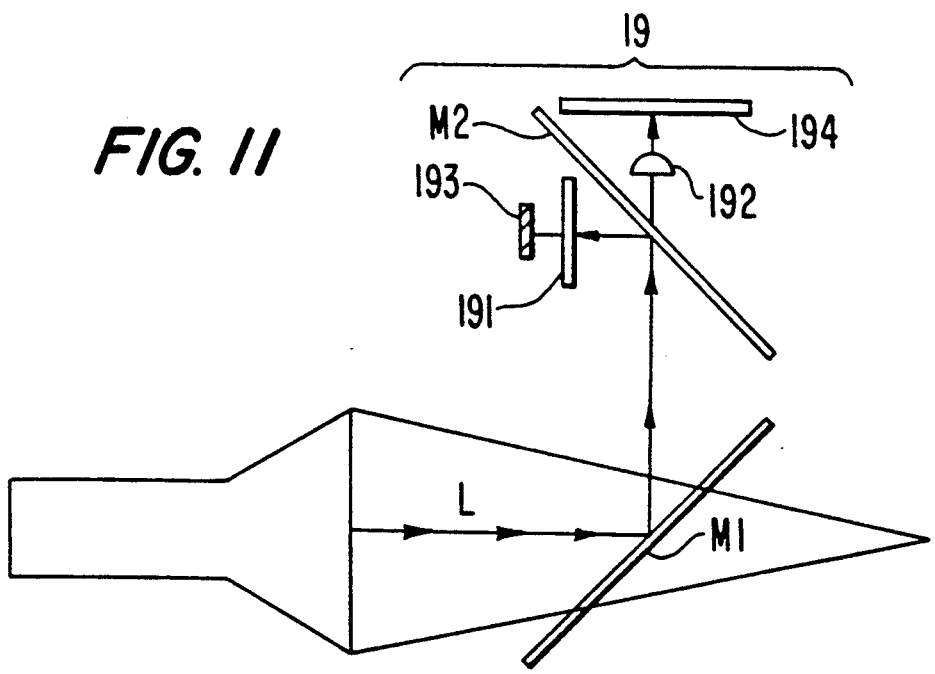
FIG. 11 illustrates an alternative embodiment of the feedback sensor used in a recording/reading system which may be used in practicing the present invention which utilizes charge coupling devices as photosensitive elements.

An alternative embodiment and arrangement of the feedback sensor is shown in FIG. 11. In this embodiment, feedback sensor 19 includes cylindrical lenses 191 and 192. Two linear charge coupled devices 193 and 194 are placed at right angles with respect to each other, and serve to locate the CRT light beam L in both X and Y directions. Sensor devices 193 and 194 may consist of linear arrays of, e.g., approximately 2000 by 1 elements. To accommodate both sensor devices 193 and 194, light beam L must be split twice—which is accomplished by directing the light beam through beam splitting partially reflecting mirrors M1 and M2.

The use of the feedback sensor within the present system provides for the accurate reproduction of an image by accurately joining adjacent image sections. The success of the image joining procedure is based primarily on the high positional accuracy of the photographic system provided by optical feedback which is used to calibrate the light source positioning system. To reduce the visual effect of systematic or residual errors in image point placement in the overlap region, the additional technique of "feathering" the edges of adjacent image sections can be used.

Figure 12:
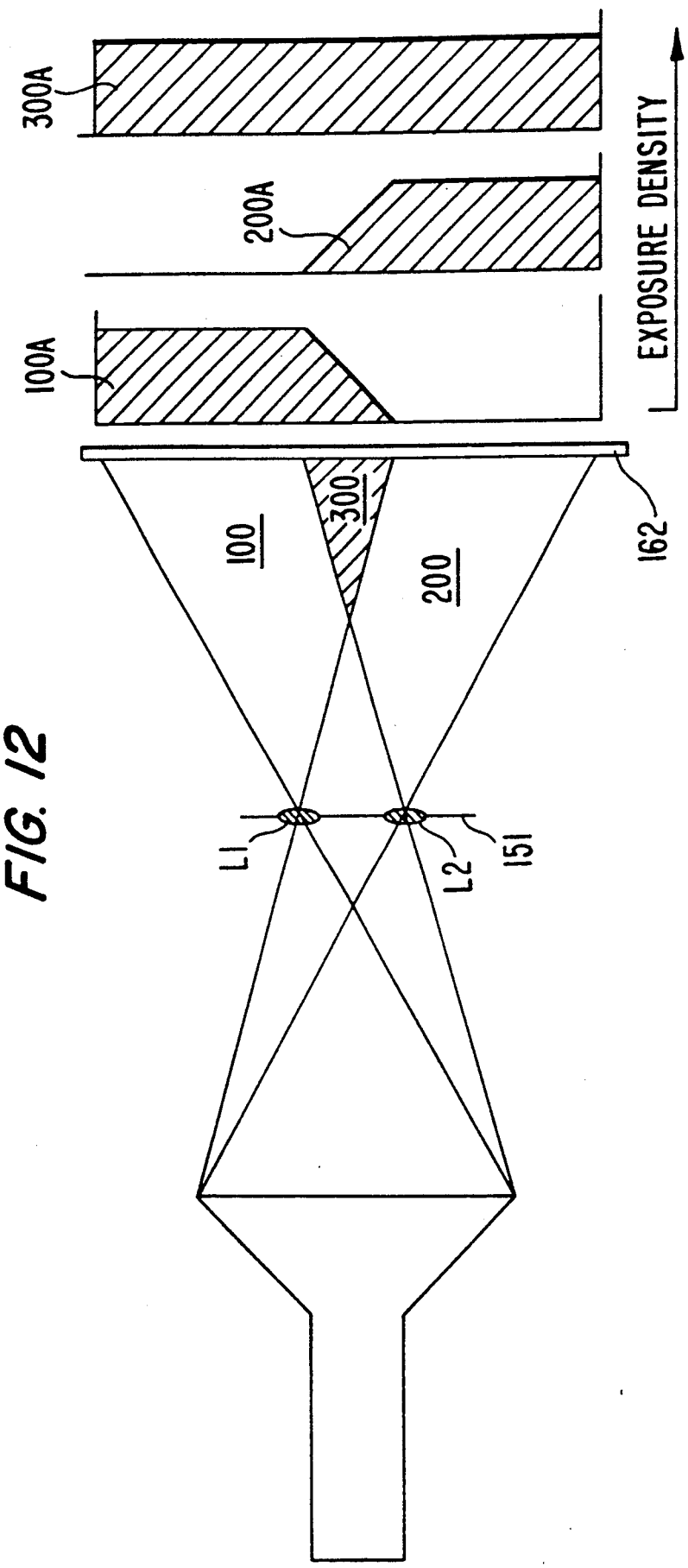
FIG. 12 illustrates a feathering process of joining image sections according to the present invention.

This feathering of edges is shown in more detail in FIG. 12 with it being understood that other techniques may be used alternatively in practicing the invention as described below with reference to FIGS. 26-36. In this instance, the lens elements L1-LN of printing lens array 151 are positioned so that there is an overlap of coverage on the film plane 162. As shown in FIG. 12, region 300 is the overlap in print coverage of lens elements L1 and L2. Thus, the areas where image sections are to be joined will be accessible by at least two lens elements, and further accessible by up to four lens elements at the corners.

Each edge is printed with decreasing intensity as a border is approached and crossed. The graph of exposure density shows the result of this feathering process. More specifically, full film exposure is achieved by feathered contributions from two or more lens elements. Region 100A shows the print intensity through lens element L1; region 200A shows the print intensity through lens element L2; and region 300A shows the sum of exposure from both lenses L1 and L2. This technique serves to reduce the visual effect of any small errors in joining adjacent image sections, and results in an enhanced image reproduction.

Figure 13:
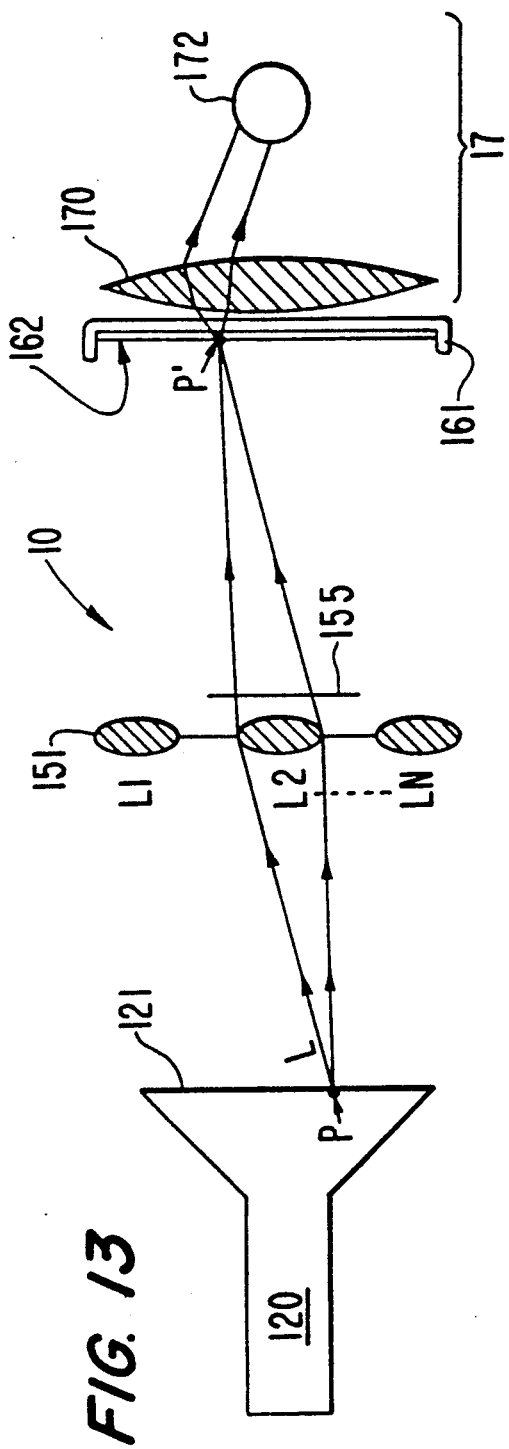
FIG. 13 is a block diagram of a film reading process utilized by a recording/reading system which may be used in practicing the present invention.

The photographic system of the present invention can also be adapted to add a film reading capability. Film reading is the digitization of the density of a piece of either positive or negative film. Color film is read by digitizing the density of the film with respect to the three primary colors at each point within the film image. The process of digitization usually involves casting a spot of light on a known point of the film and measuring the transmittance of light through the film at that point by placing a light sensor such as a photo-diode or photo-tube, behind the film plane. The transmittance is defined as the intensity of the transmitted light L divided by the initial light intensity Z. As shown in FIG. 13, reading sensor 17 is positioned behind film place 162 within the photographic system 10. For this reading process, film holder 161 is transparent. Reading sensor 17 includes collection lens 170 and digitizing photo-sensor 172.

In reading the density of a color print, the CRT beam is located at a known point P on the CRT faceplate 121 corresponding to a desired point P' on the film plane 162. The beam position (X, Y) is accurately determined by the same feedback loop used in the printing process described above. Color filter wheel 155, corresponding to the color being digitized, is placed in the light path before the light reaches either film plane 162 or sensor 172. Next, the beam L is either pulsed or turned on continuously. In either case, a measurement of the initial and transmitted beam intensity Z is made. These measurements are digitized and interpreted to yield a film density. This data is then transferred to a host system or otherwise appropriately stored. The CRT beam L is moved to the next point to be digitized, and the process is repeated, including the insertion of the appropriate color filter in the sequence.

Prior art systems digitized film on a hypothetically orthogonal grid. Due to beam positioning errors, these grids were not in fact orthogonal, but somewhat deformed. Repeated digitization and reconstruction only served to increase the extent of distortion. The recording/reading system which may be used in practicing of the present invention is not limited by such constraints. By using the enhanced feedback loop, film can be digitized repeatedly on an exact cartesian coordinate grid.

The ability to read or digitize film has an important impact on the film printer/reader feedback calibration process. Normally, the geometric relationships among the CRT face, the film plane, and he feedback sensor are predetermined and calibrated at the factory. Such calibration information accompanies a film printer system as coefficients stored in permanent memory such as ROM. However, with the present system, the ability to accurately read film also allows user or post-production calibration. In place of film, a specially drawn photomask is put into the position of film plane 162 and held in place by holder 161. This photo-mask is essentially a calibration image. The film printer system 10 can then self-calibrate by reading the specially drawn photomask, and comparing the results to an accompanying data set of "expected" results from the calibration mode. This comparison then results in a revised calibration mapping algorithm Thus the system is able to read, modify, and reprint a modified image.

In an alternative embodiment of the film reading mode, the film to be read is independent of the film holder. In this case, a beam splitter would be used to split the light on the film side of the printing lens assembly.

Figure 14A:
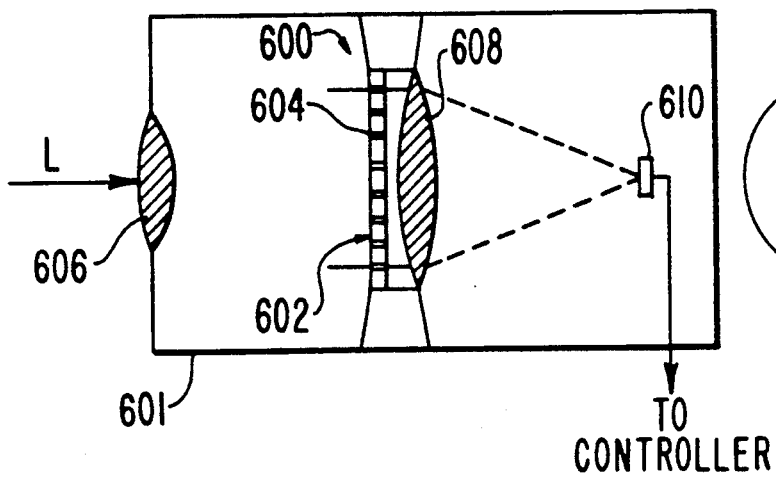
FIGS. 14A and B illustrate an embodiment of a position sensor which may be used by a recording/reading system which: may be used in practicing the present invention.

FIGS. 14A and B illustrate an alternative embodiment of a feedback sensor 600 which may be used in place of the feedback sensor of FIG. 1. The feedback sensor 600 has the advantage of being less expensive than the feedback sensor of FIG. 1 which utilizes a wide area array of photosensor detectors 141 such as charge couple devices, a photo-diode array, a charge injection device, etc. A light shield 601 encloses the sensor. In place of the wide area array, a mask 602 having a plurality of apertures 604, which are spaced about the mask, is a light target for the feedback sensor of the embodiments of the present invention. A suitable lens 606 may be used to focus the light from the CRT 120 onto the mask 602. Lens 608 focuses light emitted from the individual aperture 604 onto a photosensitive element 610 which may be a photodiode or other photosensor. The overall cost of the photosensitive element 610 is less than the aforementioned wide area elements. The spacing between individual apertures 604 is chosen to be larger than the ability of the CRT 120 to position the light beam at a particular location on its light emitting surface.

The mask sensor 600 is used to calibrate the CRT deflection system and therefore replaces the wide area sensors identified above. This calibration is performed by moving the CRT beam to a location such that an image of the light spot falls on an aperture 604 of the mask 602. Finding this location may involve moving the CRT beam in a "search pattern" but the success of the search is detected by a response from the photosensitive element 610. There is no mechanism to tell from the photosensor 610 which aperture 604 the light is coming through so there is a certain amount of ambiguity in the calibration. This ambiguity is removed by the uncalibrated or "residual" response of the CRT deflection system which is normally sufficient to locate the CRT spot with an error of less than a few percent. The spacing of the mask apertures 604 is specifically designed so that this inherent CRT deflection calibration is able to resolve the ambiguity in aperture identity. In some embodiments, this information is supplemental by the "rough" measurement of the translator position described below in conjunction with FIGS. 17 and 19-22 provided by the encoders attached to the translator or translator motors. Disregarding the position of the translator, it is always possible to deflect the CRT beam to an approximate point on the CRT without activating any feedback loops or by using an approximate calibration evaluated at the factory. Calibration proceeds from the standard "residual" deflection calibration to moving the CRT beam to a point where the odds are good that an image of the beam will be projected onto a particular aperture 604 in the sensor 600. A determination is made if the aperture 604 was intersected by the light beam by the controller 13 monitoring the photosensor 610 output. If no output is produced, the aperture 604 has been missed and a search pattern must be undertaken. The CRT beam is moved in small increments in a predetermined pattern such as rectangles of increasing periphery until a response is produced by the photosensor 610. Once a response is produced by the photosensor 610, the controller 13 knows exactly where the beam is with respect to the recording medium plane since the exact location of the light beam with respect to the fixed coordinate system of the sensor is known provided the exact location of each aperture 604 is factory calibrated. This data can be converted to equivalent recording medium coordinates using a sensor to recording medium calibration as discussed above. Performing this "search and remember" process for a number of aperture 604 provides sufficient data to calibrate the deflection system in terms of recording medium plane coordinates. For the embodiments of FIGS. 17 and 19-22 which have a movable translator on which at least the recording medium is supported, additional calibration is needed which is described below.

Figure 14B:
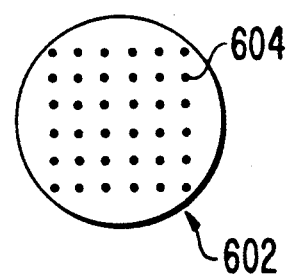
Figure 15:
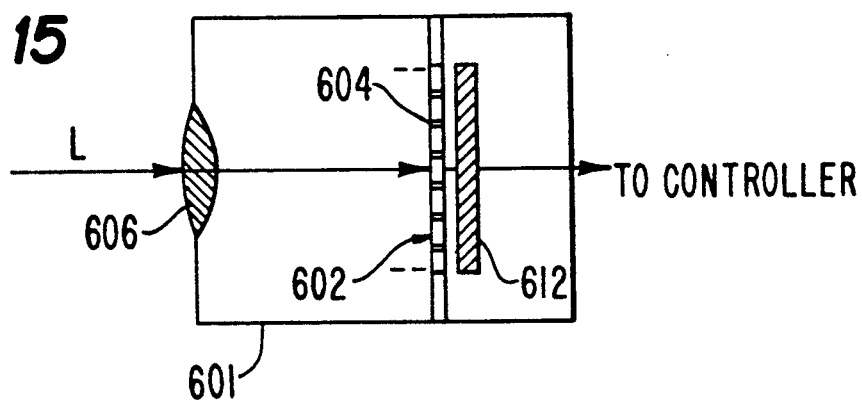
FIGS. 15 illustrates another embodiment of a position sensor which may be used by a recording/reading system which may be used in practicing the present invention.

FIG. 15 illustrates an alternative embodiment of a position sensor utilizing mask 602. Like reference numerals identify like parts in FIGS. 14 and 15. The embodiment of FIG. 15 differs in that a wide area photosensor 612 is spaced apart from a back surface of the mask 602. The disadvantage of the embodiment of FIG. 15 is that the photosensor 612 has a larger active surface area which adds additional cost to the feedback sensor. In both FIGS. 14A-B and 15, the light shield 601, shown as an encompassing box, serves to protect the photosensor from stray light which has not passed through aperture 602.

Figure 16:
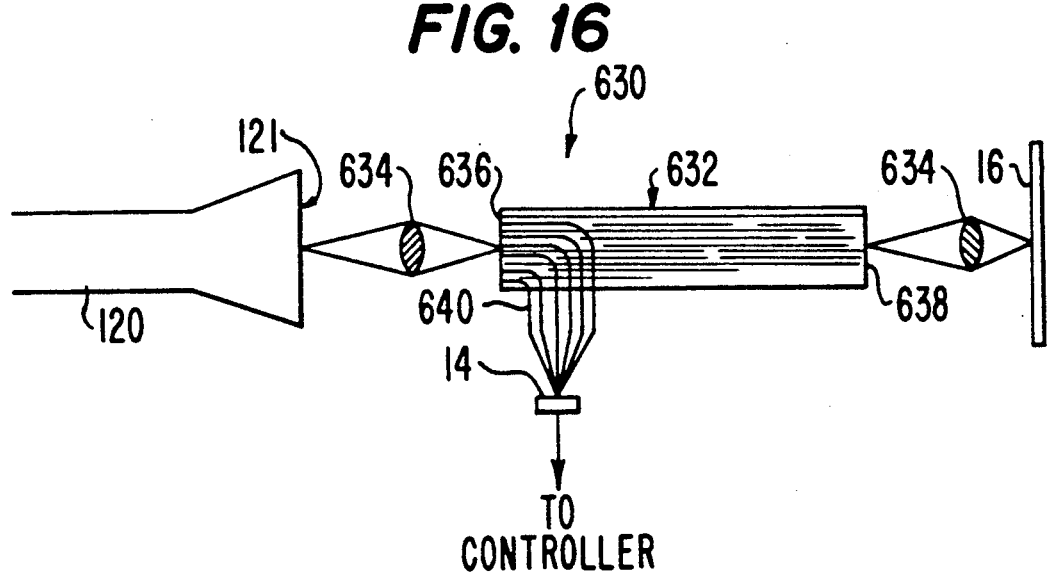
FIG. 16 illustrates an embodiment of a light transmitting device for coupling light from a light source to the recording medium and the position sensor in a recording/reading system which may be used in practicing the present invention.

FIG. 16 illustrates an embodiment of an optical coupling mechanism 630 for coupling light from the CRT 120 to the film plane assembly 16. A fiber optical bundle 632 which is comprised of a plurality of individual fiber optic elements of conventional design conducts light between the CRT faceplate 121 and the film plane. As shown, the bundle 632 has a rectangular cross-sectional area facing the CRT faceplate 121. One or more lenses 634 may be disposed between the faceplate 121 and an entry face 636 having a rectangular surface area and between a discharge face 638 and the film plane assembly 16. Individual fiber optic elements 640, which are located at a plurality of positions within the surface area that correspond to the positions discussed above used for calibrating the deflection assembly of the CRT 120, are optically coupled to the feedback sensor 14. The feedback sensor 14 is coupled to the controller in the manner described above in conjunction with FIG. 1. The position of the individual fiber optic elements 640 is chosen to provide the best location of the multiple points discussed above for calibrating the deflection assembly of the CRT 120.

Figure 17:
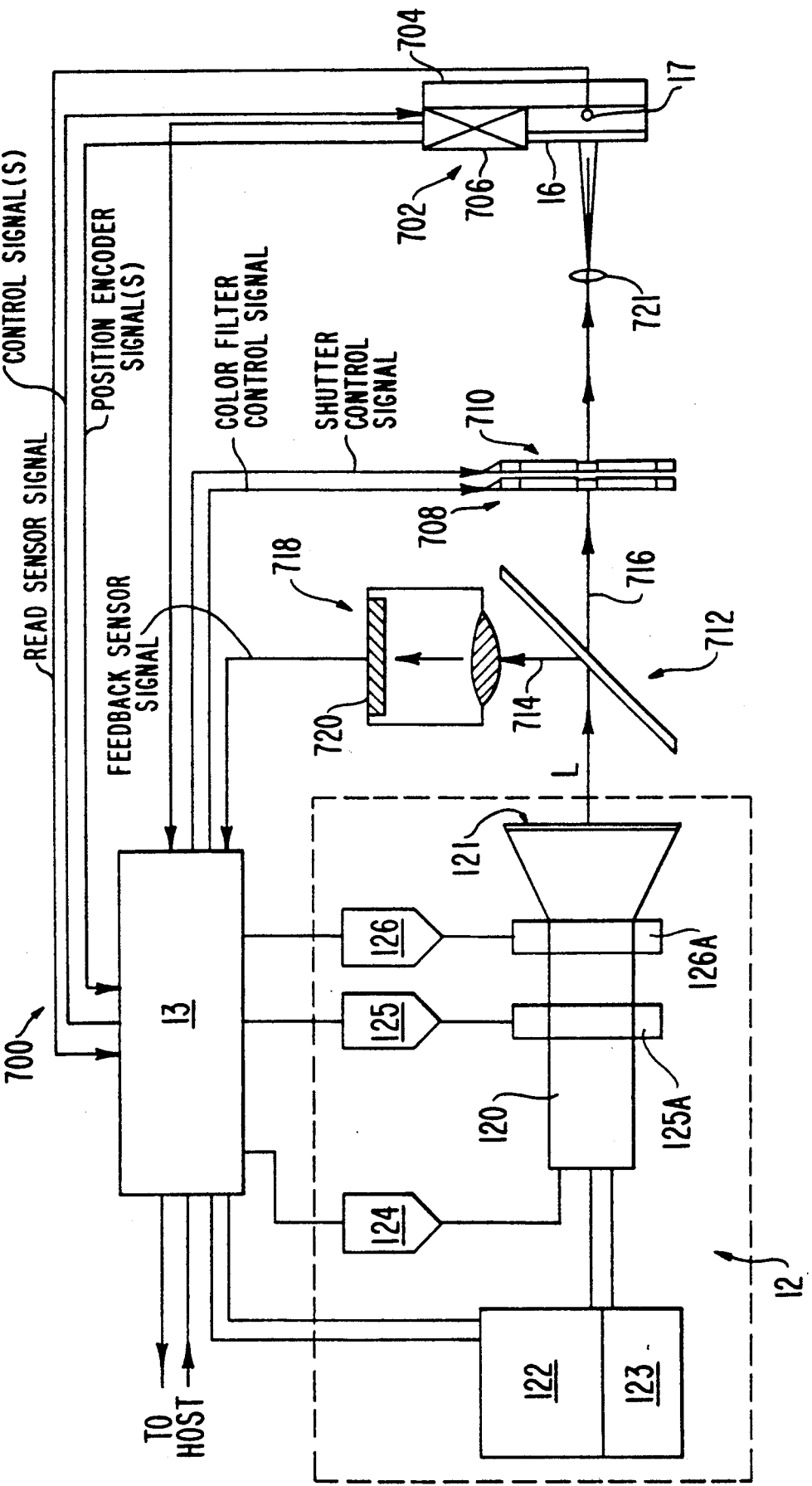
FIG. 17 illustrates a second embodiment of a recording/reading system which may be used in practicing the present invention.

FIG. 17 illustrates a recording/reading system 700 which may be used in practicing the present invention which differs from the system of FIG. 1 in that a translator 702 is provided having a plurality of controllable positions locatable in a coordinate system for moving the recording medium relative to the CRT 120 during the recording of a plurality of sections which comprises the image. In implementing the recording/reading system used for practicing the present invention different designs of a translator may be used as long as they permit the controllable positioning of the recording medium, light source for recording different sections or both of the recording medium and light source to produce relative motion. The image which is recorded by the system 700 is identical to the image recorded by the system of FIG. 1. Instead of utilizing a plurality of lenses L1-LN for recording the different sections which comprise the image, the translator 702 functions to sequentially position the film plane assembly 16 to record a plurality of sections which constitute the image by sequentially moving the recording medium held by the film plane assembly 16 to a different position each time a different section is to be recorded. If the translator 702 was used for positioning the light source for recording each section, it would be attached to the light source instead of the film plane assembly as illustrated. Like reference numerals identify like parts in FIGS. 1 and 17. The translator 702 includes a movable platform 704 which contains a pair of motors 706 which are movable in accordance with X,Y program coordinates which are supplied from the controller 13 in the form of the TRANSLATOR MOTOR CONTROL SIGNAL(S). The motors may be stepping motors. Alternatively, motion of the translator under position commands from the controller 13 in other coordinate systems is within the scope of the invention. As illustrated the translator 702 provides high resolution position coordinates in the form of the POSITION ENCODER SIGNAL(S) from a position sensor associated with the translator 704 or motors 706 to provide the controller 13 with coordinates of sufficient accuracy to permit high accuracy calibration of the deflection system using the optical feedback system. The controller 13 would not function properly to calibrate the deflection system without high resolution position information of the movable platform 704 as a consequence of the calibration of the deflection system involving mapping of the light emitted from the CRT onto the coordinates of the film plane assembly 16 which necessarily requires an accurate location of the film plane assembly to be sensed. Each time the recording medium is to be moved to record a new section, a new set of coordinates are outputted by the controller 13 to the motors 706 of the movable platform 704 to command it to move to a new position. The movable platform 704 may be moved under control of a pair of motors 706 which respectively move the platform in orthogonal directions in an X,Y coordinate system. A high resolution position encoder associated with the motors 706 provides the controller with the aforementioned precise location coordinates of the movable platform 704 so as to permit the controller 13 to command the precise position to which the platform should be moved to print the next section. A color filter wheel 708 contains a plurality of filters which transmit light of different colors, such as the primary colors red, blue and green, selectively to the film plane assembly 16. The controller 13 commands the color filter wheel 708 with the COLOR FILTER CONTROL SIGNAL to position the appropriate color filter in the path of the light to expose the recording medium on the film plane assembly 16 to a particular color. Shutter 710 selectively opens under the control of the SHUTTER CONTROL SIGNAL outputted by controller 13 in the same manner as the shutter of FIG. 1. Beam splitter 712 splits light emitted from the CRT 120 into two optical paths 714 and 716 which respectively image light on feedback sensor 718 which provides the FEEDBACK SENSOR SIGNAL to the controller 13 indicative of the position of the light striking a photosensitive medium 720 which is in the optical path 714. The feedback sensor 718 is used in the same manner as the feedback sensor 14 of FIG. 1 The multiple lenses of the feedback sensor of FIG. 1 may be eliminated The second path 716 passes through the color filter wheel 708 and shutter 710 and is focused by a lens 721 onto the film plane assembly 16 which contains the recording medium. An optional reading sensor 17 is provided on the far side of the recording medium to permit the selective readout of previously exposed film at precise film readout coordinates as indicated by the READ SENSOR SIGNAL. The system of FIG. 17 operates in the same manner as the system of FIG. 1 in that it may be used to individually calibrate the position of each pel (picture element) which is exposed on the recording medium prior to imaging each pel with light emitted from the CRT 120. Alternatively, the system of FIG. 17 may be used to print in the "burst" mode as described above. Typically, the calibration of the deflection system by the feedback sensor 718 would only be performed during the printing of areas of the recording medium contained on the film plane assembly 16 which may be either smaller than or larger than the sections which are printed by each addressable position of the table 704. As illustrated movement of the translator 702 is up and down and in and out with respect to the plane of FIG. 17.

Figure 18:
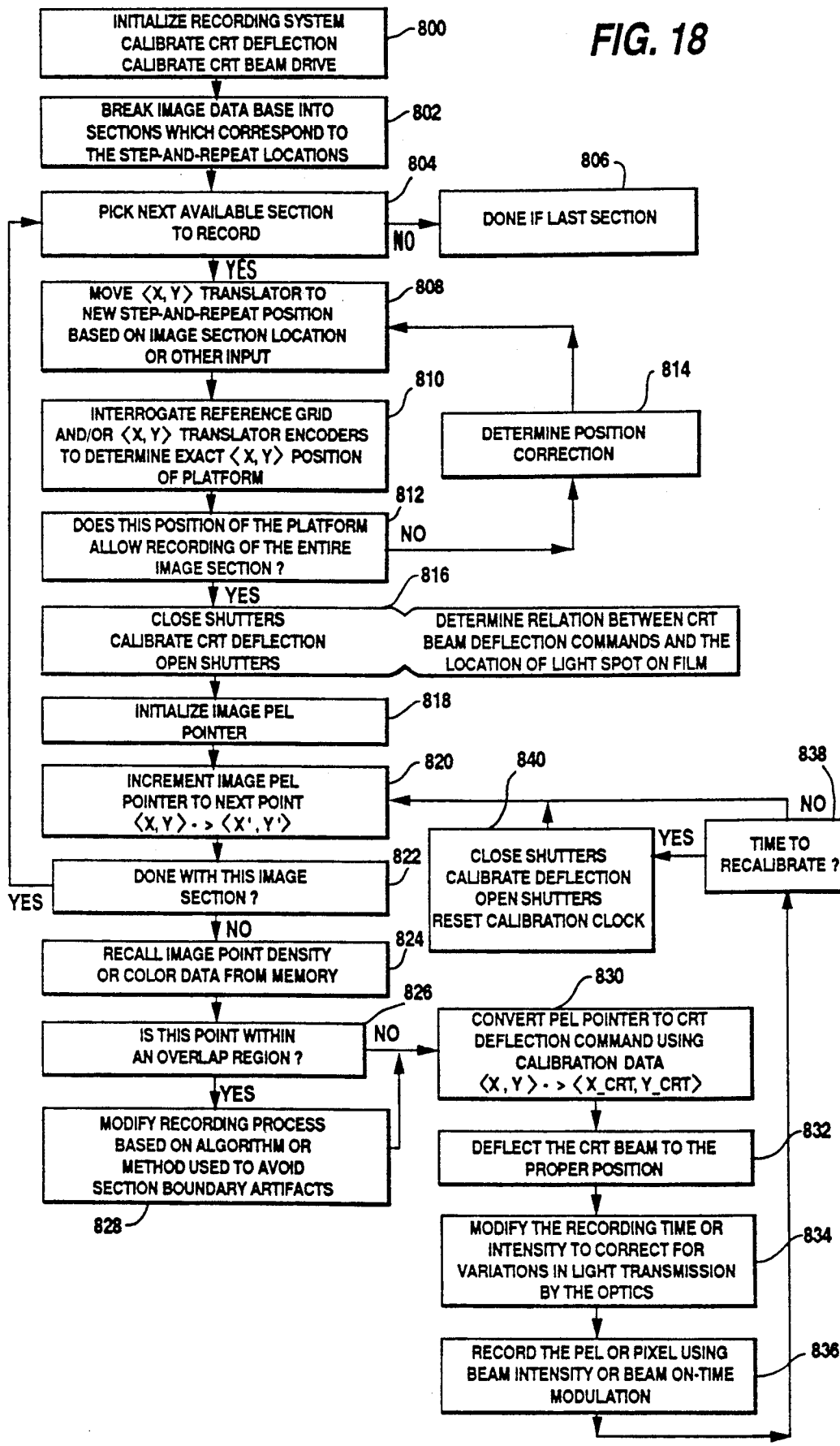
FIG. 18 is a flow chart of the operation of the system of FIG. 17.

FIG. 18 illustrates a flow chart of the operation of the system of FIG. 17 with it being understood that the flow chart is also applicable to the operation of FIGS. 19-22. Operation commences at point 800 where the system is initialized including calibration of the CRT deflection system and calibration of the CRT beam drive electronics. Operation proceeds to point 802 where the stored image to be recorded is broken into a plurality of sections which correspond to the individual positions which the translator platform 704 is to take sequentially under the control of the TRANSLATOR MOTOR CONTROL SIGNAL(S) outputted to the X,Y axis motors 706 by the controller 13. The operation proceeds to point 804 where the next section to be recorded is identified. If the last section had been recorded, the operation would proceed to point 806 where printing would be complete. Operation proceeds to point 808 where the translator platform 704 is moved to X,Y coordinates commanded by the controller 13 to move the position where the next section is to be recorded. Operation proceeds to point 810 where the position of the translator platform position encoders is interrogated. With respect to the recording/reading systems which may be used in practicing the invention illustrated in FIGS. 19-22 described below, the calibration of the translator platform 704 utilizes a low resolution position encoder and a subsequent optical sensing of position to provide high resolution coordinates of the translator platform 704. With respect to FIG. 17, the high precision encoder would provide the exact location of the translator platform 704. With respect to the recording/reading systems of FIGS. 19-22, the high resolution position of the translator platform 704 is sensed by either usage of a reference pattern described below which is projected onto a photosensor which may be the feedback sensor 718 or usage of a mask sensor as in FIGS. 14A-B and 15 described above. Operation proceeds to point 812 where the position of the translator platform 704 is interrogated to determine if its current position permits the recording of the next section to be recorded. If the answer is "no", operation proceeds to point 814 where the actual position of the translator platform 704 is determined and an appropriate position correction is determined. Operation proceeds from point 814 back to point 808 where the position of the translator platform 704 is corrected pursuant to the position correction which was determined at point 814. If the answer is "yes" at point 812, operation proceeds to point 816 where the shutter 710 is closed in response to the SHUTTER CONTROL SIGNAL and the CRT deflection is calibrated to determine the relative relation between the CRT beam deflection commands and the location of the light spot emitted by the CRT 120 on the film plane assembly 16. The aforementioned calibration would be used for recording each of the pels which comprise the individual section. Operation proceeds to point 818 where the controller 13 initializes pointing to the first pel to be printed. Operation proceeds to point 820 where the image pel pointer is incremented to identify the next PEL to be recorded. Operation proceeds to point 822 where a determination is made if the recording of the next pel will finish recording of that section. If the answer is "no" at point 822, operation proceeds to point 824 where the image point density, if the image is to be printed in black and white, or color data is recalled from memory if the point is to be printed in color. At point 824 the controller 13 determines the position of the correct color filter 708 to be placed in the optical path 716. Operation proceeds to point 826 where a determination is made if the pel is in an overlapped region as illustrated in FIG. 12. If the answer is "yes" at point 826, operation proceeds to point 828 where the PEL is modified in accordance with an algorithm to correct for section boundary artifacts. The algorithm may be in accordance with that discussed above or in accordance with other algorithms. If the answer is "no" at point 826 or alternatively processing in accordance with point 828 is completed, operation proceeds to point 830 where the pel pointer is converted to CRT deflection commands using at least one correction parameter discussed above. Operation proceeds to point 832 where the controller 13 commands the CRT 120 to deflect to the corrected deflection coordinates which cause the exposure of the recording medium to light from the CRT 120 at the desired recording position coordinates. Operation proceeds to point 834 where the controller controls the intensity of the light emitted from the CRT 120 to correct for variations in the light transmission by the optical transmission system. Operation proceeds to point 836 where the pel is exposed on the recording medium in accordance with the corrected intensity at point 834. Operation proceeds to point 838 where a determination is made if it is time to recalibrate the deflection system. If the answer is "no" at point 838, operation proceeds back to point 820 as previously described If the answer is "yes" at point 838, operation proceeds to point 840 where the shutter 710 is closed to recalibrate the deflection system. It should be noted that in the aforementioned loop, the calibration of the deflection system may be accomplished for areas that are smaller or larger than a section which is printed at each precise location of the translator table or on an individual PEL basis.

It should be noted that the translator platform position for the printing of each section is determined so that the image source can record in areas which exceed that necessary to record the current image section. By this it is meant that the translator platform 704 is positioned so that there is overlap in coverage between adjacent image sections. This overlap is beneficial in at least two ways. First, it eliminates the need to position the translator platform 704 precisely. Although the position of the translator platform 704 during recording must be measured precisely, small errors in the exact position of the translator platform relative to the desired position can be corrected by moving the image on the image source. This relaxation in the accuracy required in the actual locating of the translator platform 704 can significantly reduce the cost of the translator mechanism. Second, the overlap region allows for the provision of measures to reduce the visual effect of residual errors in image placement which might appear at the joint between sections and detract from the image quality.

Figure 19:
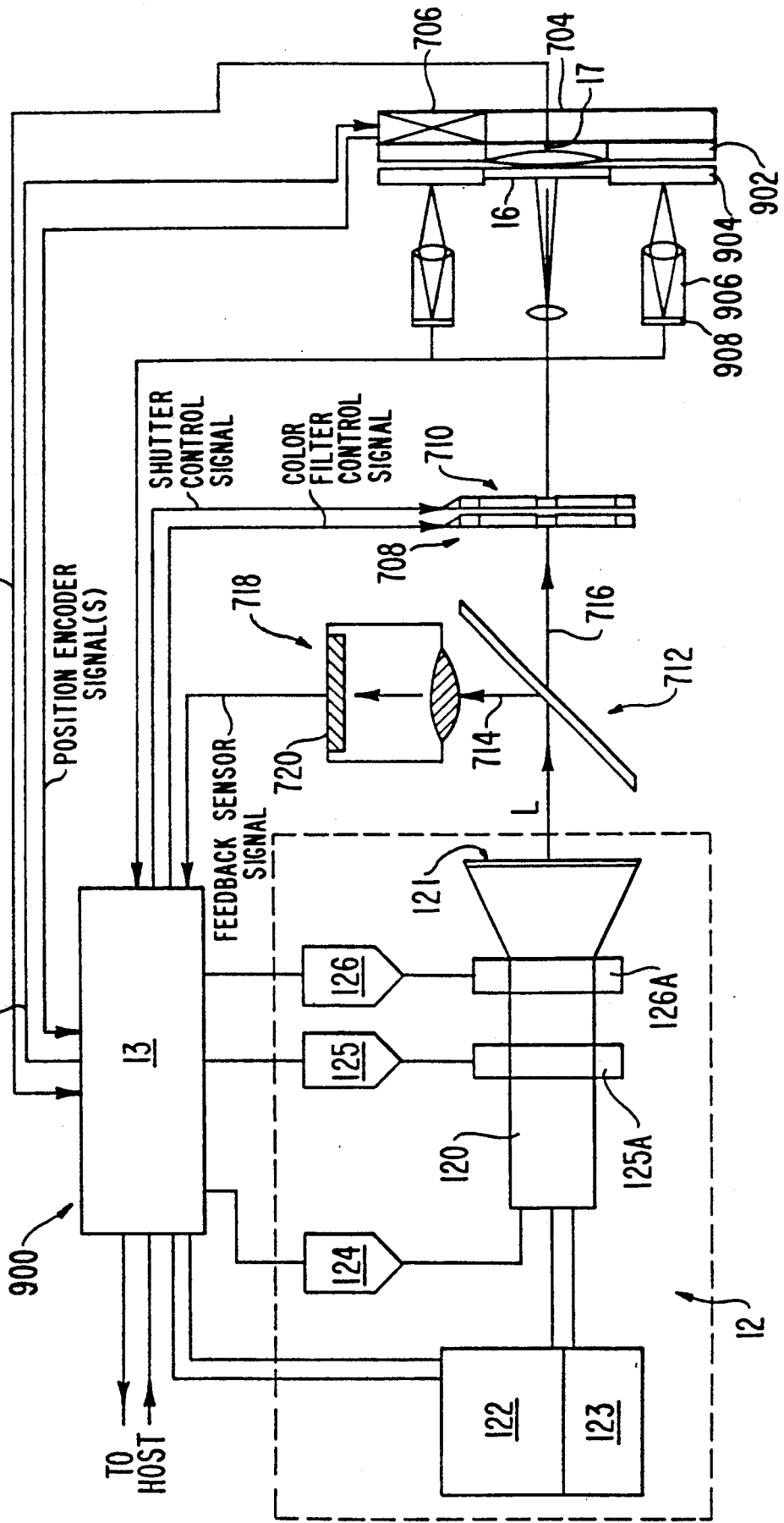
FIG. 19 illustrates a third embodiment of a recording/reading system which may be used in practicing the present invention.

FIG. 19 illustrates a recording/reading system 900 which may be used in practicing the present invention. Like reference numerals identify like parts. The overall operation of the system 900 of FIG. 19 is identical to that of FIG. 17 with the exception that the detection of the position of the translator platform 704 has been modified to reduce the cost by eliminating high accuracy position encoders associated with the motors 706. A pair of back light sources 902 illuminate a pair of reference grids 904 which contain a reference grid which may be formed by a plurality of straight lines which intersect orthogonally to form a cartesian coordinate type pattern. The reference grid pattern is projected by a projection system 906 on a pair of photosensor arrays 908, which each photosensitive location being coupled to the controller 13. The overall assembly of lights 902, grids 904, film plane assembly 16 and read sensor 17 is mounted on the translator platform 704. The reference grid constitutes an image of a Cartesian coordinate graph. The projection of the Cartesian coordinate graph on the sensors 908 permits the controller to precisely locate the position of the translator platform 704 by use of suitable routine which does not form part of the present invention.

The grid image can be interpreted to yield the position of the grid relative to the grid sensor. This data can be further interpreted to provide the location of the recording medium relative to the image source, which is one objective of the calibration procedure. This is possible because the recording medium bears a fixed position relative to the reference grid, while the image source bears a fixed position relative to the reference grid sensor. Data describing these relative positions are calibrated at the factory and are available to controller 13.

The grid is located by identifying and measuring the position of the grid lines in the grid image relative to elements of the grid sensor. This is accomplished using a standard pattern recognition technique wherein the grid image is mathematically convolved with a known template image. In one embodiment the template is the image of perpendicular intersecting lines, equivalent to the origin of a Cartesian coordinate graph. Mathematically, peaks in the convolution data identify regions of the image which graphically resemble the template. Consequently, the position of regions of the grid image which resemble the origin of a Cartesian coordinate graph would be identified by controller 13 as peaks in the convolution data. In this way the position of the origin of the grid image could be automatically measured.

The image sensor may comprise a small charge coupled device (CCD) or a photodiode array. Since the reference grids 904 are attached to the translator platform 704, the controller 13 may process the images from the individual grids by viewing only a small part of the reference grid at a particular point in time such as a single grid intersection which appears like a cross. The controller 13 processes the aforementioned information to determine the precise location of the translator platform 704 within the low resolution parameters provided by low resolution position detector associated with the translator platform. The use of two reference grids 904 and associated reference grid sensors 908 permits the angle of the translator platform 704 with respect to a coordinate system to be discriminated. The use of the reference grid and optical grid sensor provides another means of optical feedback. Here, it is the position of the translator platform 704 rather than the position of the CRT light spot which is measured. As illustrated, movement of the translator 702 is up and down and in and out with respect to the plane of FIG. 19.

Figure 20:
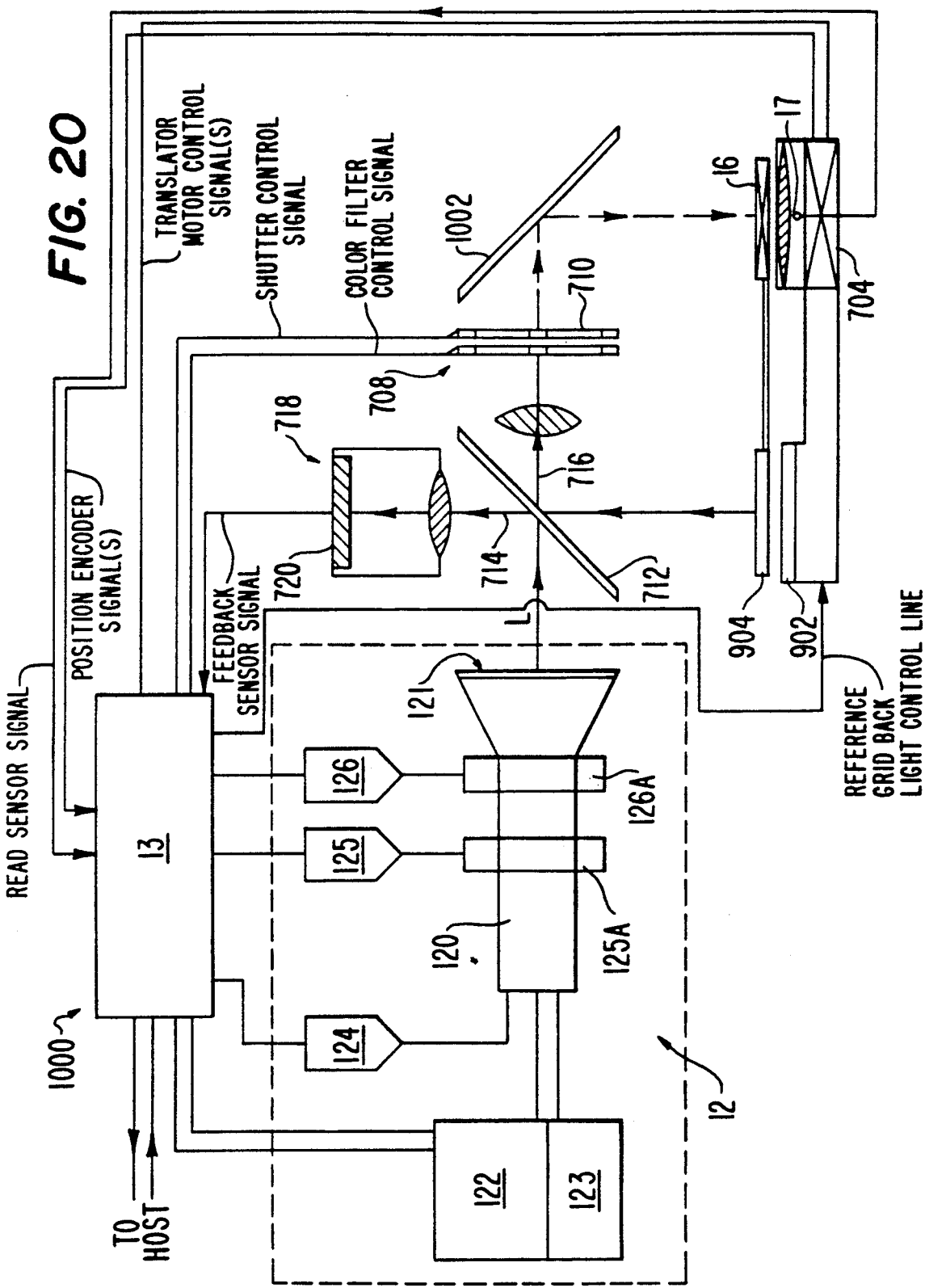
FIG. 20 illustrates a fourth embodiment of a recording/reading system which may be used in practicing the present invention.

FIG. 20 illustrates a recording/reading system 1000 which may be used in producing the present invention. Like reference numerals identify like parts. The embodiment of FIG. 20 differs from FIG. 19 in that the feedback sensor 718 functions both in the calibration of the deflection system of the CRT 120 and further in the high resolution calibration of the position of the translator platform 704. The position of the reference grid 904 is sensed and interpreted by controller 13 during the high resolution calibration of the position of the translator platform 704 after the low resolution position has been read by the controller 13 by the lower resolution encoder associated with the translator motors 706. Light 902 provides illumination of the reference grid upon demand under control of the REFERENCE GRID BACKLIGHT, CONTROL LINE. As illustrated, the beam 716, which passes through the color filter and shutters 708 and 718 respectively, is reflected to the film plane assembly 16 by mirror 1002. The dual usage of the feedback sensor 718 for purposes of calibrating the position of the deflection system and the translator platform 704 further reduces the overall cost of the system of FIG. 20 in comparison to the earlier systems in which separate photosensitive sensors are used for sensing the position of the translator platform 700 and the deflection system. The calibration of the deflection system with the feedback sensor is identical to the system of FIGS. 7, 17, and 19. As illustrated movement of the translator 702 is in and out and right and left with respect to the plane of FIG. 20.

Figure 21:
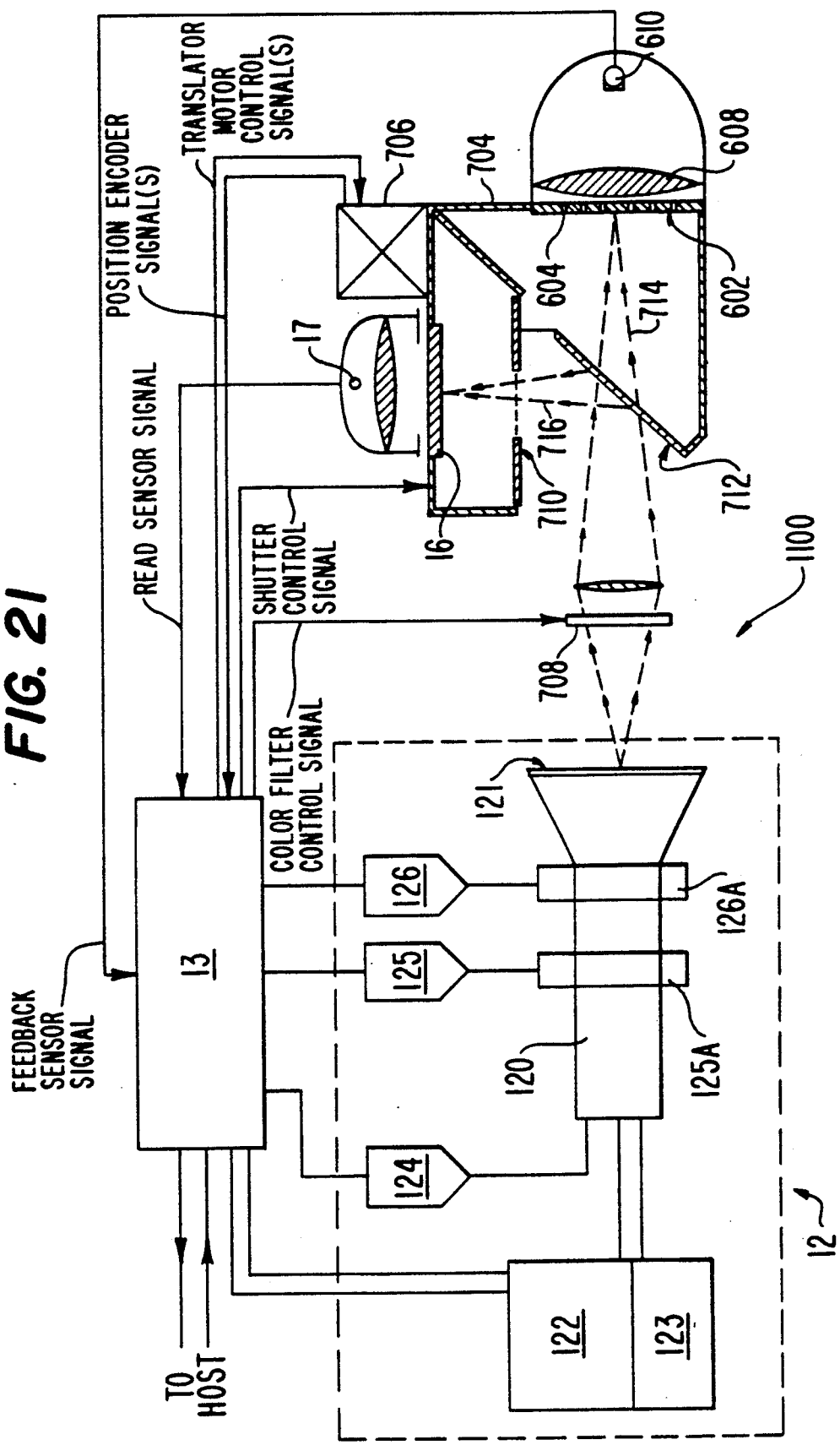
FIG. 21 illustrates a fifth embodiment of a recording/reading system which may be used in practicing the present invention.

FIG. 21 illustrates a recording/reading system 1100 which may be used in practicing the present invention. Like reference numerals identify like parts. The fourth embodiment 1100 has the film plane assembly 16 and translator platform 704 position sensor 602 contained in planes which are orthogonal to each other. A rigid mounting platform 704 maintains the film plane assembly 16 and the position sensor 602 at a predetermined relationship which may be accurately mapped at the factory for calibration purposes. The position sensor is identical to that illustrated in FIGS. 13A and B. The position sensor 602 utilizes the mask 604 to generate output signal from the photosensitive element 610 to provide the controller 13 with an accurate position signal after a position encoder associated with the translator motors 706, which produces low resolution position coordinates, has been read by the controller 13. The position of the light emitted from the CRT faceplate 121 is varied through the search pattern described above with reference to FIGS. 14A and B in order to image the light through on of the apertures 604 to permit accurate positioning. It should be noted that the filter 708 and shutter 710 have been illustrated only schematically with it being understood that they may be identical to the structures illustrated previously in FIGS. 17, 19, and 20. One advantage of this system is that the feedback sensor system 602, and especially the feedback sensor mask 604, are located in an equivalent optical plane to the recording medium. This optical equivalence is provided by beam splitter 712, and by the location of both the recording medium plane and sensor plane at the focal plane of the projection lens. In this configuration, calibration data provided by the optical feedback system does not have to be transformed to recording medium coordinates, as in previous systems. Note that in this system beam splitter 712 is fixed to the translating platform 704 and moves with the recording medium and feedback sensor system. As illustrated movement of the translation 702 is up and down and in and out with respect to the plane of FIG. 21.

Figure 22:
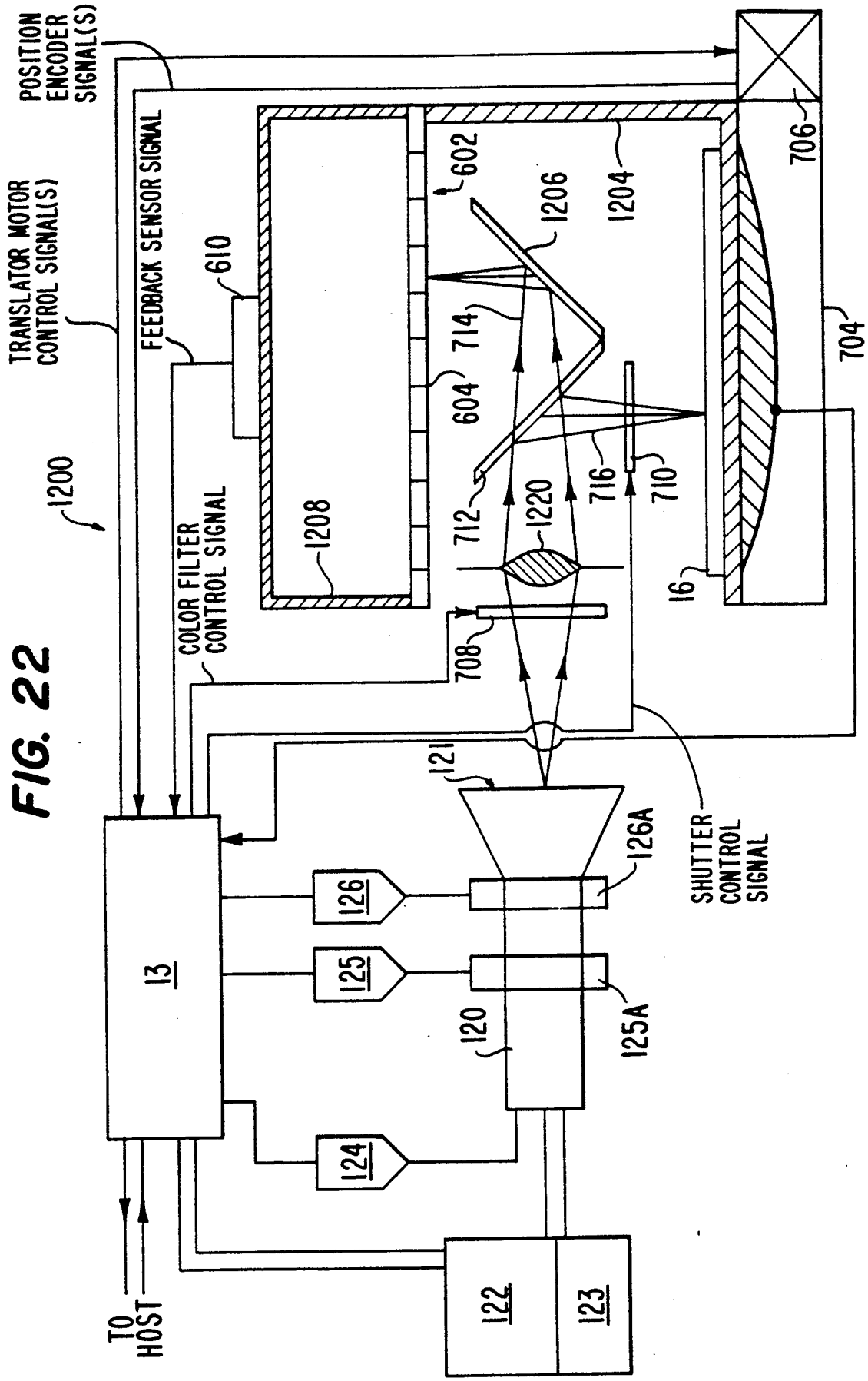
FIG. 22 illustrates a sixth embodiment of a recording/reading system which may be used in practicing the present invention.

FIG. 22 illustrates a recording/reading system 1200 which may be used in practicing the present invention. The system 1200 differs from the system 1100 of FIG.

21 in that the film plane and the plane of the mask 602 are held parallel to each other by a rigid mounting structure 1204. Like reference numerals identify like parts. The spatial relationship of the mask 602, and particularly the mask apertures 604, and the film plane assembly 16 are precisely mapped at the factory. A first beam splitter 712 splits the light beam into beam 714 which is redirected by mirror 1206 onto the surface of the mask 602 and beam 716 which is directed to the film plane assembly 16. The mask 602 performs the dual function of calibration of the deflection system as described above and further the high resolution calibration of the position translator platform 704 after the low resolution position encoders associated with the platform 704 or translator motors 706 have been read by the controller 13 as described above at different times One advantage of this system is that beam splitter 712 is smaller than in previous systems, and does not grow in scale as recording medium size is increased. The effect is provided by the mounting of beam splitter 712 and mirror 1206 on the same fixture as image source 121 and the projection lens 122. As illustrated movement of the translator 702 is in and out and right and left with respect to the plane of FIG. 22.

A two level calibration is also used in the system illustrated in FIG. 22. In FIG. 22 three sources of information exist to provide for accurate positioning of the light spot on the recording medium. These are the translator platform position encoders, the residual calibration of the CRT deflection system, and the response of the optical feedback system. These sources of information are used, during a calibration procedure, to collect data which is used to evaluate correction parameters for correctly locating the light spot on the recording medium. As described above, these correction parameters can be determined by controller 13 if the controller is provided with a number representative data pairs relating positions on the light source to positions on the recording medium. As described above, the collection of these data pairs begins as a light spot on image source 120 is moved to a position where an image of the spot falls onto aperture 604 of the mask sensor 602. The position of each aperture 604 relative to the recording medium coordinate system is calibrated at the factory, and the calibration data is available to controller 13. Absent any further information, it is impossible to determine from the photosensor 610 response the identify of the aperture 604 through which light passed, and therefore controller 13 can not determine which set of aperture calibration data to recall. This ambiguity in aperture identity is resolved by information supplied by the translator position encoders and by the residual calibration of the CRT deflection system, in much the same way as described above with reference to FIG. 1. By design, apertures 604 are purposely spaced and located so that the low precision information provided by the CRT deflection and translator encoders (in this embodiment) is sufficient to resolve the aperture identity. In the simplest case, the aperture 604 is identified as that particular aperture which lies closest to the estimated position of the light spot on mask sensor 602. This estimated position is determined using the approximate translator encoder coordinates and CRT deflection coordinates, and by general calibration information, known to controller 13, describing the design of the printing system, such as the nominal position of the CRT image source relative to the origin of the translator system, the orientation of the translator axes, etc. Supplied with the aperture identity, controller 13 can recall the appropriate calibration data describing the position of the aperture, which in this embodiment are stored directly as recording medium coordinates. These recording medium coordinates and the CRT beam position coordinates are paired, stored and later interpreted by controller 13 to yield a deflection system calibration, as described previously.

FIG. 25 illustrates a film image 1300 composed of four step-and-repeat image sections A, B, C and D, and the overlap region 1301 between them. The overlap region 1301 between two adjacent sections, such as sections A and B is defined as that area of the recording medium which can be recorded while the CRT image source is recording either section A or section B. In a corner region of the four sections, in the central area of the film image 1300, the overlap region can be printed from any of four sections.

Figure 23A:
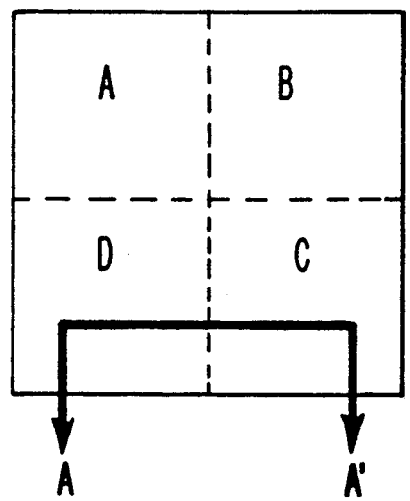
FIG. 23A is a diagram of a film image constructed from four step-and-repeat sections, labeled A, B, C and D, the image representing a photograph of a "white wall", or some other uniformly illuminated surface with the four sections being identified by dotted lines which are not an actual part of a picture.
Figure 23B:
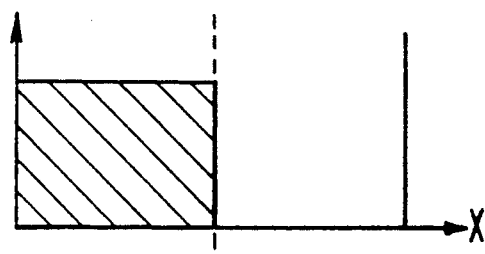
FIG. 23B is the density of a film image, i.e., the lightness or darkness of a film print, of section D taken along the line A—A' of FIG. 23A.
Figure 23C:
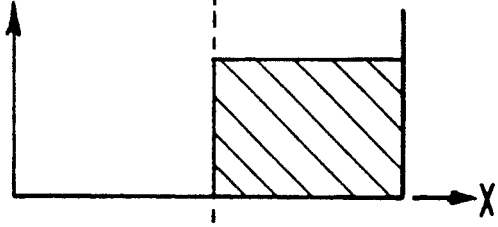
FIG. 23C is the density of a film image of section C taken along the line A—A' of FIG. 23A.
Figure 23D:
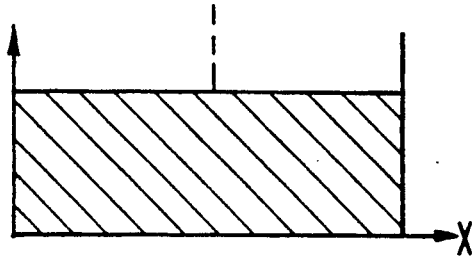
FIG. 23D is the final image density formed as a result of the addition of the contributions of FIGS. 23B and 23C.

Tiling is reduced according to the method of the invention by gently meshing or feathering the image intensity within the overlap region 1301 by using, for example, the method referred to in the description of FIG. 12. FIGS. 26A-26C are similar to the exposure density illustrated in the right portion of FIG. 12. FIG. 26A is a graph of the density of the image printed while the CRT image source was at the left-hand step-and-repeat section, section D. FIG. 26B is the contribution from the right-hand step-and-repeat location, section C shown in FIG. 25. The graphs are similar to FIGS. 23B-C, but do not show the sharp cutoff of print density of the latter because the image intensity is linearly decreased or feathered as the point of interest moves across the overlap region 1301. FIG. 26C shows that the sum of the two contributions adds up to the proper density, in this case a uniform print density. Illustratively, the actual feathering or reduction in the image density across the overlap region 1301 can be accomplished by adjusting the CRT beam intensity, the beam on time, or both. The advantageous result of feathering according to the invention is to reduce the visual impact of system placement errors which cause tiling by spreading the effect over a large area, e.g., the overlap region.

As an example of this, in the graph of FIG. 26D the image density for the left section D shown in FIG. 25 has been shifted slightly to the right as compared with the desired position as illustrated in FIG. 26A, in order to illustrate the effect on recording medium density while recording according to the present invention. The density of the right section C shown in FIG. 26E is the same as that shown in FIG. 26B. The left and right contributions to the final print density are graphed in FIG. 26F. As shown therein, there is a change in the image density due to tiling at the border. However, when comparing this to FIG. 24C, it can be seen that the visual effect, as measured by the change in recording density, is wider but not as high when the image sections are feathered or reduced in intensity at their boundaries. Tiling is less noticeable because the effect is spread out over the overlap region by the linear taper of the image density. In this way, the visual effect of tiling is reduced without costly increases in electronic accuracy.

The tiling effect can be further reduced by using a second order (parabolic) feathering function, rather than a linear taper. FIGS. 27A through 27F, like FIGS. 26A through 26F, show the effect of systematic error in beam placement at the boundary region, but the feathering is parabolic. In short, this has the effect of doubling the maximum density error at the border, but of reducing the rate of change of the density to a low value. Since the human eye is sensitive to edges, and since the edge is defined as a fast change in image density, the second order decay (taper) function is effective at reducing the visual effect of tiling because it reduces the rate of change of the density error, see particularly FIG. 27F in this regard.

The feathering method reduces tiling by applying a specific feathering function, linear or second order, for example, to the print density within the overlap region. Algorithms which tailor the feathering function to the specific image density or density terrain within the overlap region could also be employed. For example, in printing an image of a checkerboard, tiling could be eliminated by placing the section boundaries exactly upon the checkerboard lines. In this way, tiling can be reduced by taking advantage of the local terrain of the image density.

Two problems diminish the simplicity of the aforementioned intensity feathering methods of the invention. First, standard photographic films do not respond linearly, to input light energy. The intensity (feathering) function could be adjusted for this fact, but not all films respond in the same way, and the actual response depends on temperature, film age, film manufacturer, film batch number, etc. Thus, these variables make it difficult to implement a reliable feathering algorithm.

Second, the film sensitivity may change after exposure to light. In this case, the response of the film to the first recording in the overlap region, from the left section, for example, would be different than its response to the second recording, from the right section. The first pass effectively "sensitizes" the film. It is difficult to practically account for this effect. The sensitization effect is well known in the photographic art.

Consequently, although the above-described methods of intensity variation of the invention have been used successfully for reducing the effect of tiling due to recording errors, the methods are not a simple solution. In order to avoid at least some of these difficulties, according to another embodiment of the method of the invention the character of the image sections which is varied at least at the boundaries thereof is the content of the image section itself. One manner of applying geometric feathering according to the invention is the random end-of-line method described below.

The human eye is very adept at locating edges, boundaries and lines. Although the actual change in image density which occurs in tiling may be small, the fact that the change occurs along a straight edge, the boundary between sections, makes it very noticeable. This effect is reduced or eliminated according to a first form of geometric feathering according to the invention by varying the point of transition between image lines of image sections. This is accomplished by varying in a random manner, within the overlap region and for each image line, the point at which one sections stops printing a line and a line of another section begins. The adjacent image lines of image sections need not be overlapped with one another in the overlap region. FIG. 28A shows a film image composed of two adjacent image sections A and B, and the overlap region between them, outlined in solid lines, which is that area of film which can be printed while the CRT image source is printing either of two or more adjacent sections. In this case with reference to FIG. 28B, the image sections A and B are each formed by a plurality of individual image lines 1400. The ends of the individual image lines 1400 each form a joint (transition) with a corresponding end of an adjacent image line of the adjacent image section. These joints are located within the overlap region 1401. Since the joints within the overlap region 1401 vary in their position, there is no fixed edge to catch the eye. In this way, tiling is reduced or eliminated.

The variation in transition between a line in an overlap region of two adjacent sections may be implemented by varying at least one address of a pair of end points of where continuous recording of pels is disposed along an axis addressed relative to an origin within a current section. Note that each image point within the overlap region 1401 is preferably printed only once. Consequently, problems associated with nonlinear film response and the time penalty introduced by double printing with reduced densities are avoided with this method of the invention.

Figure 29A:
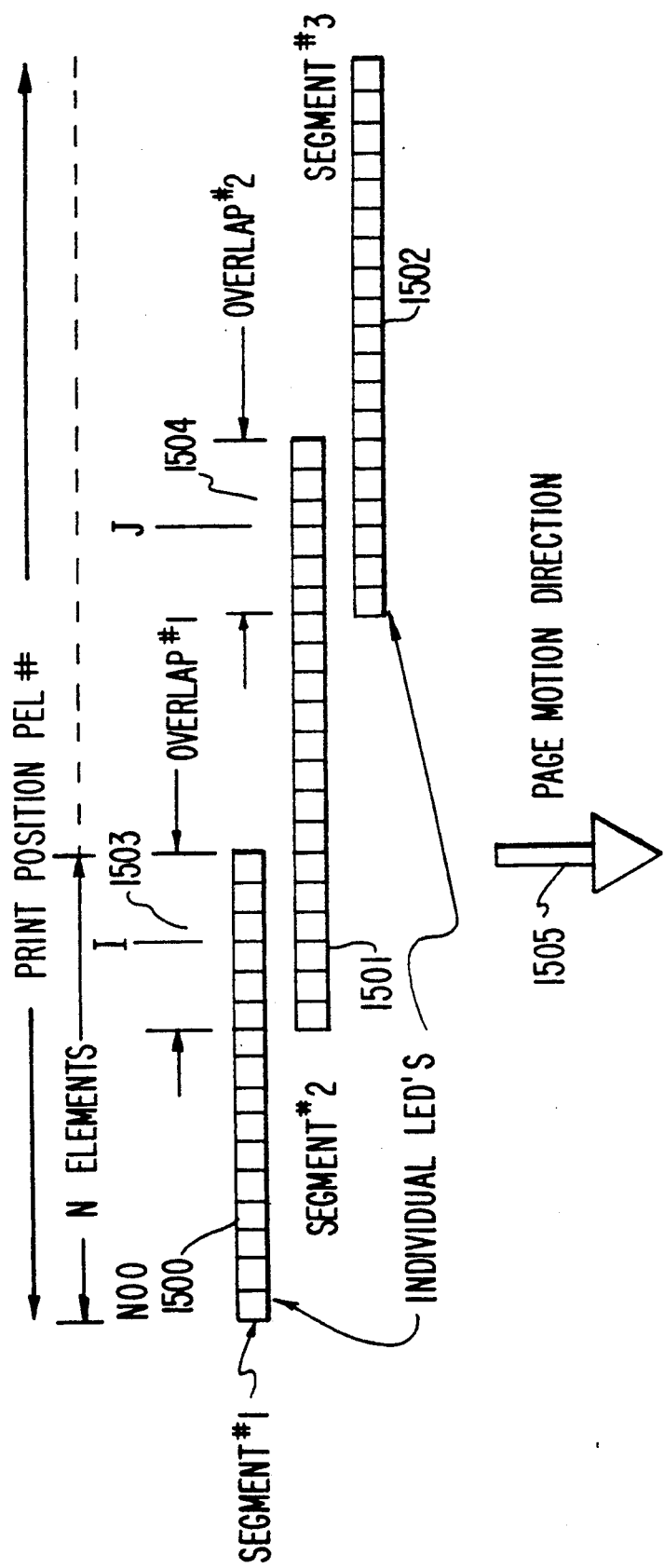
FIG. 29A is a schematic illustration of a plurality of linear arrays of light emitting devices which are overlapped for varying the point of transition in lines within overlap regions between adjacent sections according to the method of the present invention.
Figure 29B:
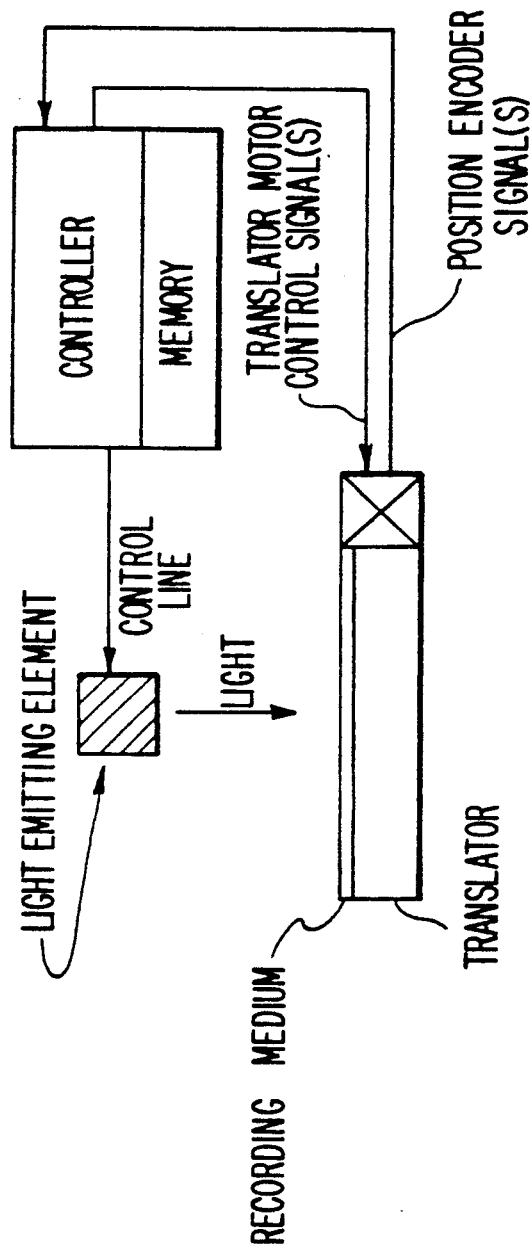
FIG. 29B illustrates the relationship of a controller, a single light emitting element and the recording medium which is positioned by a translator.

This method of the invention has utility for a number of printer technologies, in addition to the aforementioned use of a CRT for printing. One apparatus of the invention for printing according to the random end-of-line method of the invention is schematically illustrated in FIG. 29A. The apparatus comprises a plurality of linear arrays 1500, 1501, 1502 of light emitting elements such as light emitting diodes Each of the light emitting elements is capable of emitting light for printing upon a recording medium such as film. These elements are shown schematically in the form of a square block. The three linear arrays overlap in overlap regions 1503 and 1504. The point at which array 1500 stops printing and array 1501 begins printing in the overlap region 1503 is varied in a random fashion for each printed line according to the random in-of-line method of the invention. In this way, tiling can be reduced or eliminated. Instead of film, the recording medium used with the arrays of light emitting diodes in the apparatus of FIGS. 29A and B could be a photo-sensitive drum, for example, which is physically moved or scanned past the light emitting arrays in the direction of arrow 1505 in FIG. 29 to print successive image lines according to the random end-of-line method of the invention. This apparatus can also be used to perform the random dot pattern method of the invention as discussed hereinafter. To record in a step-and-repeat method a translator similar
to the translators of FIGS. 17 and 19–22 is used to cause relative motion between the array and the recording medium. Either or both the array and recording medium may be moved by the translator to a plurality of addressable locations under the position control of the controller to form the plural sections. It should be noted that each of the light emitting elements is connected to a controller by a control line. The information to be recorded by the light emitting elements is stored in a memory associated with or available to the controller in a binary or multiple level code to record black and white or multiple color information. An operating program in the controller supervises the recording process by applying the stored information to the light emitting elements. If used for recording color information, the array of light emitting devices is used sequentially for forming multiple color images which comprise the final color image. FIG. 29B illustrates the relationship of the controller, a single light emitting element and the recording medium, with it being understood that this relationship represents the relationship of the controller and recording medium for the remaining light emitting elements of FIG. 29A.

As shown in FIG. 29A, the LED segments are offset vertically by about one LED thickness in order to accommodate the required overlap without physical interference between the segments. In some embodiments, optics, used to project the LED light onto the recording medium, would also cancel the effect of the vertical offset by projecting the various LED segments onto a single line of the recording medium. Alternate embodiments which retain the vertical offset are possible. These would utilize the vertical offset to record sections of a number of recording medium lines for each position of the LED array. Each offset LED segment would print a segment of each recorded line. The recording of a whole line on the recording medium would be completed as the LED source moved through a number of sequential line locations.

The position of the transition within the overlap region from one line or section to another can also be varied in a manner which considers a characteristic of the recording in that region. Specifically, the transition or "joint" could be preferentially located at points in the recording where the local greyscale or image density could serve to diminish or obscure the tiling effect. For example, the transition could be located within an area on the recording where the recording level is naturally low. Thus, the transition point is chosen as a function of the information being recorded.

This method of the invention could also be applied to line scan recording technologies When applied to recording systems used to record multi-color recordings, the transition within each line could vary also as a function of color, so as to further reduce the tiling effect.

Figure 30:
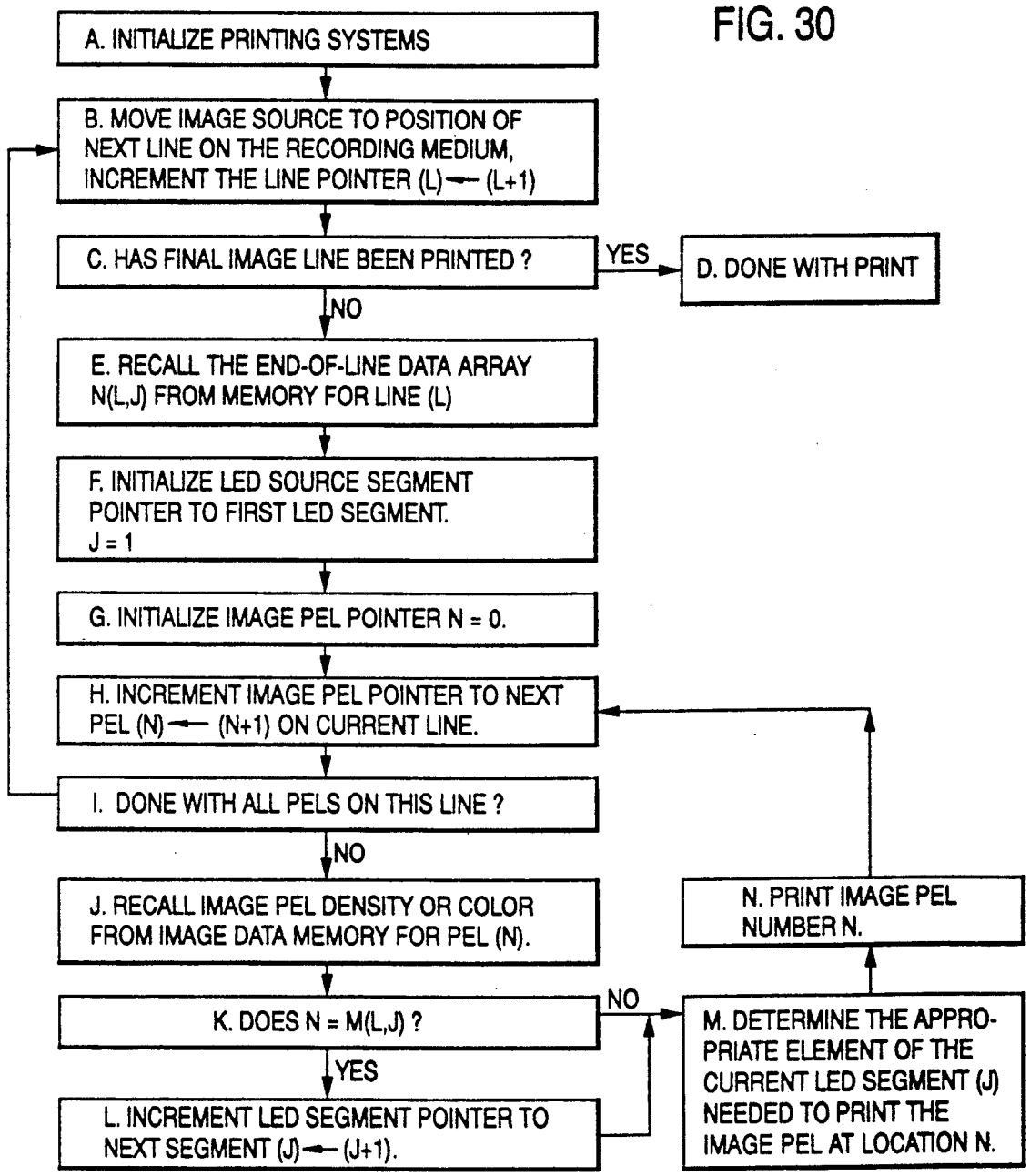
FIG. 30 is a flowchart of the process of random end-of-line recording as applied to multi-segment line printers.

A flow chart which describes the sequence of steps used to record an image using such a system is shown in FIG. 30. The following paragraphs, which detail each step, are indexed to reference letters on FIG. 30.

A. General initialization of the recording hardware, similar to the start-up procedure on a personal computer, performed only once per image. Self-testing of the recording hardware would occur at this time, as well as any calibration procedures needed for proper operation. This step can also include organizing the image data as lines which can be printed by a line source.

B. Move the LED image source mechanism relative to the recording medium until it is positioned over the next line to be printed. Increment the line counter (L). This index is used to identify the appropriate image data, as well as the proper end-of-line data.

C. If the last line of the image has already been printed the process is complete. If not, proceed to step (E).

D. All lines have been printed, and the image is complete.

E. Recall the end-of-line data from memory. It is assumed that in this embodiment data describing the position within each overlap where one LED segment ceases to record and another begins has been predetermined and stored in controller memory in a matrix or array M(L,J). These data could alternately be determined in real time. The M(L,J) values are identified as a function of the line number (L) and the LED segment number (J). For example, if the printing system is recording line (U), and LED segment (V) is presently in use, the switch to LED segment (V+1) is mandated at pel number N M(U,V). Note that the controller which coordinates and directs the printing activity must know the length of each LED segment, and the extent of overlap between each adjacent segment in order to perform this task. This data would be determined by design, or would be measured at the time of manufacture.

F. Initialize the LED source segment to the first segment (J=1). This occurs at the beginning of each line, and simply reflects the assumption that each line begins, in this embodiment, at a fixed position.

G. Initialize the image pel pointer (N=0).

H. Increment the image pel pointer (N) to the next value. This pointer determines which pel on the line will be recorded next.

I. If the pel pointer (N) is greater than the maximum line length this line is done. In this case return to step (B). Otherwise proceed to step (J).

J. Recall the image data for line (L) pel number (N) from image data memory. This data describes the density, color or some other attribute which will be recorded onto the recording medium.

K. Compare the present pel number (N) to the M(L,J) value. If these values are not equal, then continue using the present LED segment for recording and go to step (M). If the values are equal, N=M(L,J), then go to step (L).

L. Increment the LED segment number (J). This pointer determines which LED segment is presently being used for recording. Changes in the LED segment number can occur only in overlap regions, and the M(L,J) data are so constructed.

M. Determine the identity of the element of the current LED segment (J) which should be used to print pel number (N). If the LED line source were constructed as a single array, the LED element number would equal the pel number (N). In this multi-segment recorder, it is necessary to know the length and overlap of each LED segment in order to determine which element of LED segment (J) should be used to print line pel number (N). This calculation is performed by the controller.

N. Print image pel (N) by activating the appropriate LED element for the proper length of time.

With CRT step-and-repeat recorders according to the invention, one detriment in applying the random end-of-line feathering method is that it is not easy to apply in both x and y directions in the plane or surface of the recording medium. To avoid this difficulty, according to another embodiment of the invention geometric feathering at the boundaries of the image sections is achieved by a so-called random dot pattern method to reduce or eliminate tiling effects.

Although the terms "random", or "in a random fashion" are used in the following paragraphs to characterize aspects of a distribution of pels along an axis or direction, it is not meant that the distribution necessarily be random mathematically. It is meant that the distribution of pels varies in an arbitrary or complex manner, which may have the appearance of being random without necessarily being random mathematically.

The random dot pattern method eliminates any distinction between the x and y directions and therefore works equally well at vertical or horizontal boundaries between adjacent sections, and at corners where four sections meet. Again, the method works by spreading the tiling effect over a broad region. The method involves assigning the task of printing each image point in an overlap region to one of the adjacent sections in a random fashion. The "random" distribution is determined so that image points on the left-hand edge of the overlap are predominantly printed from the left-hand section. The distribution factor decreases as the point moves further into the overlap. At the right-hand edge of the overlap the situation is reversed, i.e., very few points are printed from the left-hand section, and almost all are printed from the right. By "printing from the right" it is meant that a particular image point is printed while the CRT image source is located at the right step-and-repeat location of left and right step-and-repeat locations located adjacent one another.

The application of this method to a small part of the overlap region is shown in FIGS. 31A–31G. The second order (parabolic) "weight" function (probability distribution) used to determine the recording pattern is graphed in FIGS. 31E and 31F towards the left and right sections, respectively. The assigned distribution of the recording process among the adjacent image sections can be thought of as a two-dimensional bit pattern or mask which "covers" the overlap region. A bit pattern value of one indicates that the image point represented by that bit should be printed from the current section. A bit pattern value of zero indicates that the point should not be printed from the current section. The pattern is constructed so that the pattern of pels printed from the left is the inverse of that pattern of pels printed from the right which is the recording objective of this embodiment of the invention. This is necessary to insure that all pels within the overlap are printed once and only once, sooner or later. With reference to FIGS. 31B and C, the patterns must mesh in the cumulative effect as illustrated in FIG. 31D.

The actual pattern is normally determined only once, and stored as a bit pattern in memory. The bit pattern is a two-dimensional pattern which covers the whole overlap region. A number of symmetries in the pattern are used to insure complete filling of the image, and to reduce storage space. Both a linear and a second order pattern, such as parabolic pattern distribution, have proven effective and other distributions could be employed.

Figure 32A:
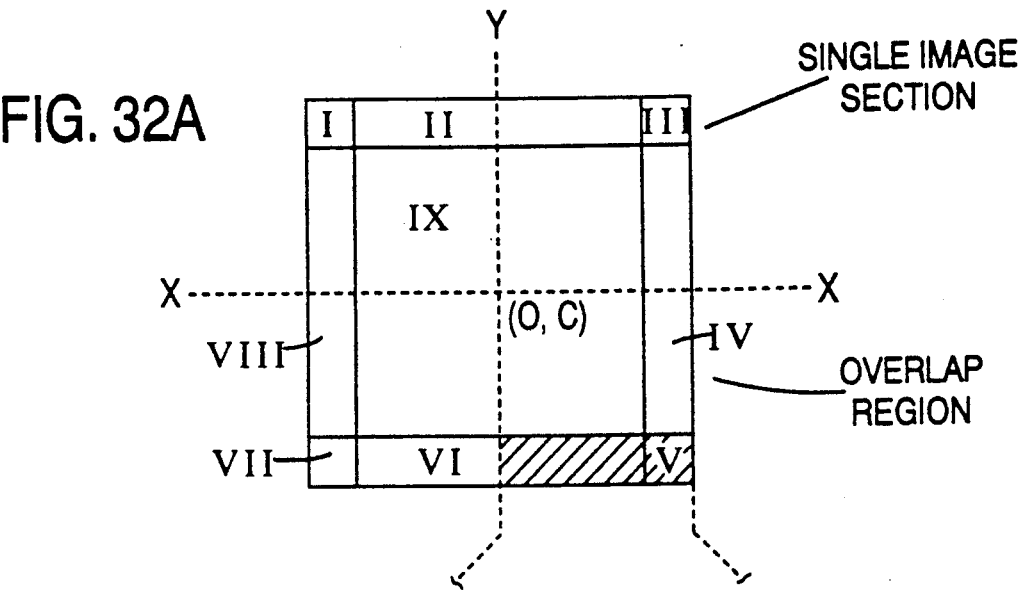
FIG. 32A is an image of a single step-and-repeat image section having a central region recorded fully and an overlap region which is recorded only partially according to the pel pattern method of the invention.
Figure 32B:
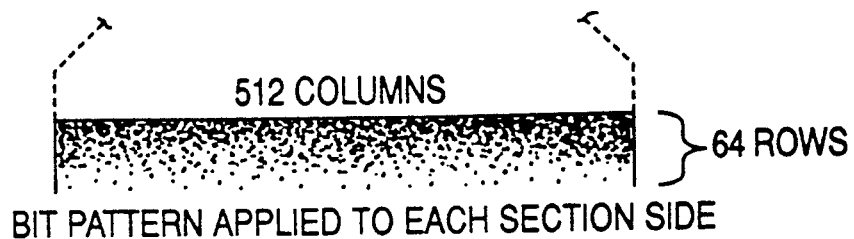
FIG. 32B is an enlarged view of an overlap region of the image of FIG. 31A illustrating a bit pattern "mask" applied to the overlap region of the section.

A detailed view of a recording section of a recording, such as section A in FIG. 31A, is illustrated in FIGS. 32A and 32B. In this embodiment of the invention, each image section that is printed according to the random pel pattern method of the invention has the same structure and is printed in the same way. In other embodiments described later, the size, shape and orientation of the recorded sections can vary. In those cases, the bit map array would be modified. A typical section is shown in FIG. 32A. The interior or central region of this section is labeled IX and is printed entirely from the step-and-repeat location for the illustrated section. The overlap regions, labeled I–VIII, are printed from this and from adjoining step-and-repeat locations which surround this section. The overlap region, which constitutes about 10% of the section, has been enlarged for clarity in the drawing The overlap region can be further divided into areas which are printed from each of two adjacent regions, areas II, IV, VI and VIII, and corner regions which are adjacent to four sections, I, III, V and VII.

Figure 32C:
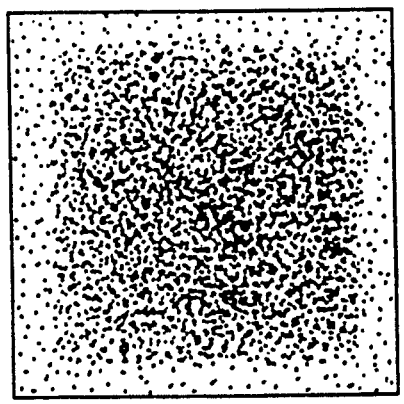
FIG. 32C shows a film image for a single step-and-repeat image section wherein the central region is fully recorded from the step-and repeat location of the image section while in the overlap region the black areas are printed from the current section and the white areas from adjacent sections.

A pattern can be constructed from a single "master" pattern, which is shown in FIGS. 32A and 32B. As seen therein, a small pattern which exhibits the required properties is applied along each edge. Where the pattern overlaps, the bit pattern is logically "AND'ED" to produce the working bit pattern. The "AND" function insures that corner regions work properly. The overall effect of the logical processing is illustrated in FIG. 32C.

The bits of the pattern can be chosen to match a desired distribution. This means that the average number of "on" bits follows a particular distribution, such as either linear or second order (e.g. parabolic), across the overlap. Since individual bits of the pattern must be either on (record) or off (do not record), they can only approximate on average the desired distribution. This does not detract from the effectiveness of the method. The distribution functions used can be the same as those used for the intensity of density feathering method, e.g., linear, parabolic or other function which spreads the tiling effect so that it is reduced or eliminated. Here, however, the functions describe the probability of printing the image point, and not the "fraction" of the point to print from a particular side. It is also possible to use different bit mapped mask arrays for each color of a color recording. As noted above, the bit mapped mask arrays are used to determine whether a particular pel is printed from the current position, as used for example in the random dot method. The use of a different mask for each color would reduce the effect of small pel position errors, that is tilting, on the integrity of the recorded image. Different end-of-line positions could also be used for each color of a recorded image in the random end-of-line method.

As discussed above, in step-and-repeat printing according to the invention an image is printed onto the recording medium in sections which can take the form of adjacent, square regions which together cover the area of the recording medium, much as the squares of a checker board cover the board surface. As the image source moves over the recording medium it stops at least once for each section, at a location from which all points within the section boundary and points within an overlap region can be addressed or printed. This is known as the "step and repeat location" for that image section. The physical size of each section and the associated overlap region is determined by the size of the image source, the coverage of the projection lens, the anticipated error in translator positioning, as well as other factors.

Image pels which lie within the border or overlap region between adjacent sections can normally be printed from a number of image source locations. The printing source location for these pels is assigned to one or another of the possible source locations in a "random" fashion. Consequently, there is no fixed or continuous boundary line on the recording medium between pels printed from different source locations. The identity of the source location may vary a number of times across the overlap region. Consequently, the transition from one image source to another is spread through the overlap region. In this way tiling problems are reduced.

In many respects this method is similar to the "intensity feathering" procedure described above. In that method, the various contributions of light to each pel location were summed by the recording medium response to create the full, proper recording medium density or color. In this "random source" method, each pel is printed only once, at the requisite intensity. The "feathering" effect is achieved by varying the source section identity through the overlap region. Each pel is fully printed from one or another of the available source locations, and there is no feathering of the pel intensity.

Since the source assignment can not be "feathered" or distributed except on a pel by pel basis, it is the average source distribution which is "feathered" across the overlap. As noted, the distribution can be determined before printing begins, and stored in a bit mapped array. This array, which can have one element for each overlap pel location, assumes the values zero or one (0/1) depending on whether the pel under consideration is "not printed" or is "printed" from the current section. In this way the distribution, as represented by the bit mapped array, forms a "mask" or "template" used to determine the print source location, much in the same way that a "mask" is used to spray-paint signs.

In most cases pels within an overlap region but near a central region of a section are printed from that section. By "from that section" is meant that while the image source is in the location used to print that section. Pels located farther from the central region have an increasing chance of being printed from an adjacent section. The actual distribution in source identity can take many forms although it is preferred that each pel be printed from some section.

Figure 33:
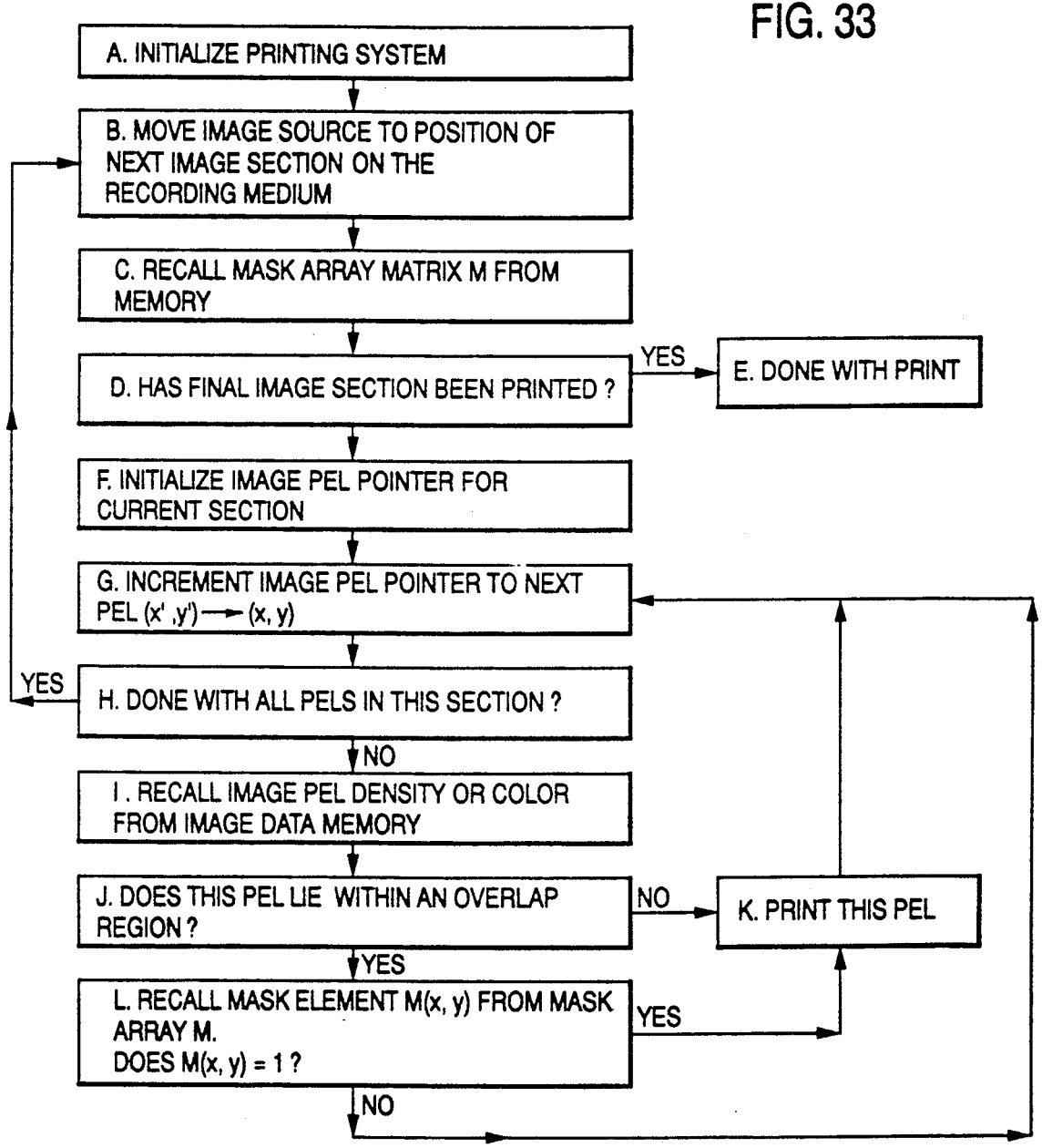
FIG. 33 is a flow chart of the process of random pel printing according to the invention.

A flow chart for random dot printing according to the method of the invention is shown in FIG. 33. The flow chart and the following description thereof assume the existence of a recording instrument in accordance with but not limited to the systems described above in FIGS. 1, 17 and 19-22. The paragraphs describing steps A-L of the flow chart are correspondingly identified below.

A. General initialization of the film recorder hardware, similar to the start-up procedure on a personal computer. This procedure can include hardware self-testing, initialization of data arrays, as well as any required calibration procedures. This step can also include organizing the image data so that it can be printed in sections.

B. Move image source to the position of the next image section on the recording medium. In this step a translator is instructed to position the image source at a location where the next image section can be recorded.

C. Recall mask array $M(x,y)$ from memory. This mask array determines which pels within the overlap are printed from the current position of the image source. The mask can appear as a bit mapped array, with one array element for each image pel within the overlap region. Other encoding procedures are possible. For convenience, the elements of the array can be addressed by the same indices, $(x,y)$, which are used to identify the position of image pels within the current section. The elements of the bit map array can assume the values zero or one (0/1). A bit map value of zero (0) at position $(x,y)$ indicates that position $(x,y)$ will be (or has been) recorded from a different section. By "recorded from a different section" is meant that the identified pel will be (or has been) recorded while the image source is (or was) at a location used to print a different image section. If the bit map array element $(x,y)$ has a value of one (1), then image at location $(x,y)$ is recorded from the current section. The bit map array is so constructed, or a number of different bit map arrays are so constructed, such that after all sections of the image have been printed, all pels within all overlap regions will have been recorded once and only once.

D. If the final section of the image has been printed, go to step E. Otherwise proceed to step F.

E. All image sections have been recorded, and the image is complete. The recording process is terminated.

F. Initialize the pel pointer for the current section. Normally, each section of an image consists of a number of image points or pels. These pels are recorded sequentially in an ordered fashion. The pel pointer is used by the computer controller, which organizes and directs the recording process, as an index to identify the coordinates and other attributes of the pels which are printed from the current section. For convenience, the pel pointer can consist of a pair of coordinates $(x,y)$, which can be used to identify the intended location of the pel on the recording medium as well as the position of the pel data within the image data base. Initializing this pointer starts the recording process at the beginning of each image section.

G. Increment the pel pointer to the next pel $(x',y') \rightarrow (x,y)$. This step updates the pel pointer for the next pel to be recorded.

H. If there are no more pels to record in the current section the current section is done. In this case return to step (B) to consider recording a next section to be recorded. If pels within the current section remain to be recorded, proceed to step (I).

I. Recall the image pel density or color from the image data. The image data instructs the controller on exactly how to print the current pel. This data can describe the color or density of the current pel, or some other attribute which is to be recorded on the recording medium.

J. If the pel at current position $(x,y)$ does not lie within and overlap region, proceed to step (K). The controller has previously been informed as to the position and coordinates of the overlap region for each image section. By comparing the coordinates of the current pel to the coordinates that define the boundaries of the overlap region, the controller can determine whether the pel does or does not lie within an overlap region. If the pel lies within an overlap region the controller branches to step (L).

K. Record the current pel onto the recording medium. The actual recording process will depend on the details of the image source and the recording medium. For cathode ray tube (CRT) film recorders this step involves projecting a light spot onto the recording medium with an intensity and for a time necessary to induce the proper exposure of the recording medium. A number of corrections, which take into account the parameters of the optical system, or details of the image source, can be applied at this time to insure correct exposure of the recording medium.

L. The image pel lies in an overlap region, and the controller must evaluate element $M(x,y)$ of the bit map array in order to determine whether to record the current pel while recording the current section. If $M(x,y)=0$, do not print from the current section, and the controller goes to step (G) without recording the current pel. If $M(x,y)=1$, the current pel is recorded onto the recording medium from the current section. In this case the controller proceeds to step (K).

A representative image section (A) has been isolated and drawn in FIG. 34-A. Section (A) has been partitioned into 9 segments. Segments 1 through 8 constitute the overlap region, while segment 9 is the central region. In the geometric feathering method, each image pel within segment (9) is printed while the image source is at the step-and-repeat location which corresponds to image section (A), while only some of the pels within regions (1)-(8) are printed at this step and repeat location. The remaining pels in segments (1)-(8) are printed while the image source is positioned at a different step and repeat location, which is to say from an adjacent section. Pels contained in segments 2, 4, 6 and 8 can be printed from one of two possible step and repeat locations, while the pels in segments 1, 3, 5 and 7 can be printed from one of four possible step and repeat locations. These conditions change if the section lies at a true edge of the whole image.

The way in which the printing of each pel within the overlap region is assigned to one or another of the available step and repeat printing locations is used to reduce the "tiling" effect normally expected with step and repeat printing. The general intent of the method is to mimic the effect of "intensity feathering" by varying the source of each pel in the overlap region among adjacent sections.

In practice, the printing function for each overlap pel can be assigned to one or another of the appropriate adjacent image source locations in advance of the actual printing process. The assignment can be determined at the factory, and stored as a bit mapped "template", or "mask" array which is applied equally to each image section by the controller. Other embodiments are possible.

The "template" or mask" array can be plotted for illustration. Such a plot is shown in FIG. 32-C. In FIG. 32C, a blackened space denotes a pel which is printed with the current section (A), and a white space or hole denotes an image pel which will be (or was) printed from a different section, which is to say while the image source as at a different location. Note that the core region is black since all pels within this area are printed from the current section. During printing, the controller must recall the appropriate density or color from the image data source in order to print each pel. The mask/template only assigns the printing activity, and does not effect the way each pel is ultimately printed.

For convenience, the method is sometimes practiced by using one "mask" array repeatedly without change to determine the printing assignment for the pels of all sections. In this particular case, the requirement that each pel be printed once and only once determines that the mask have certain properties, which are described below.

Figure 35:
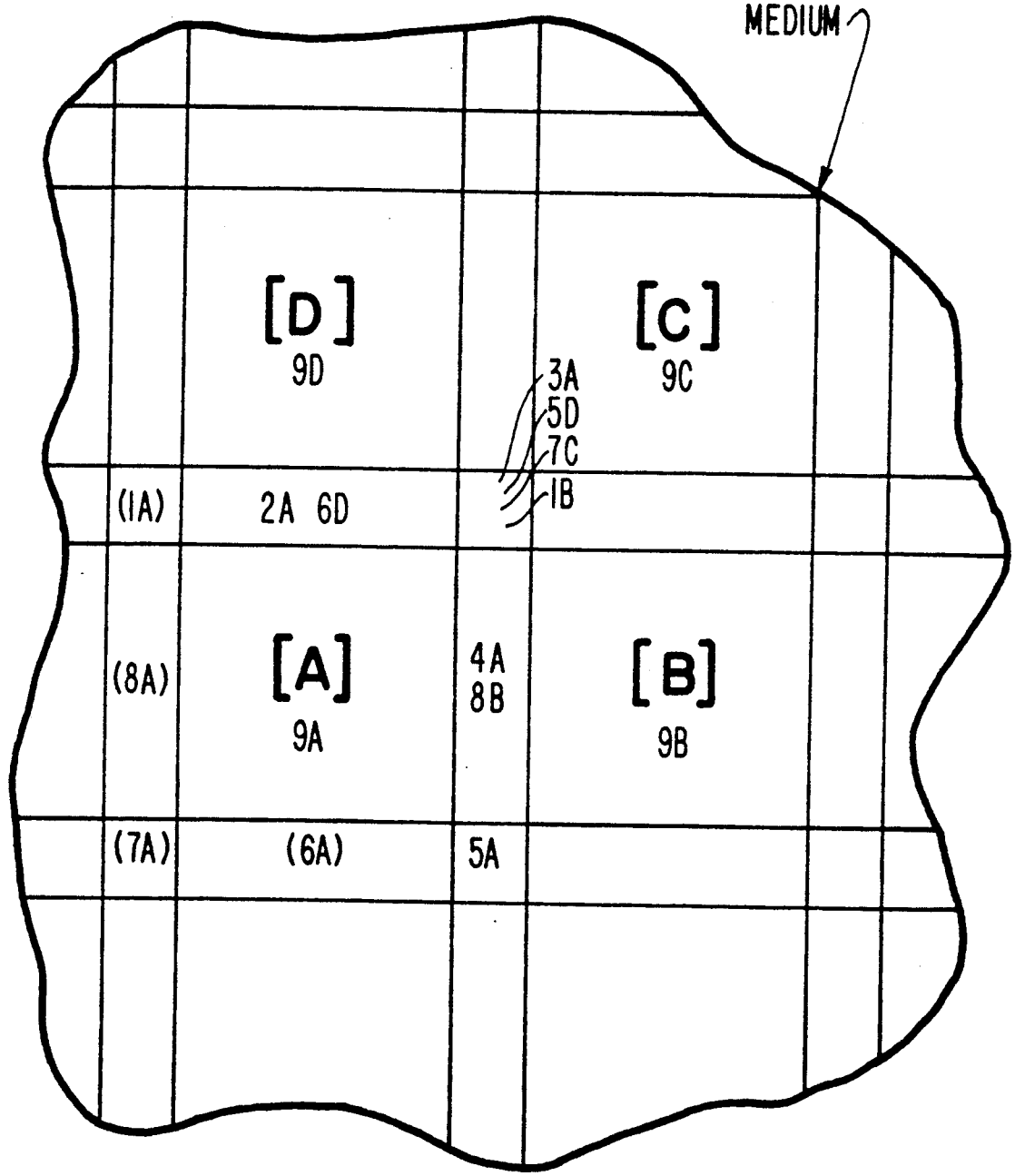
FIG. 35 illustrates the position and particularly the overlap of image sections on the recording medium.

For example, the mask in overlap segment (8) must be the opposite of that in segment (4). This is required since pels not printed in segment (4) from section (A) must be printed from step-and-repeat location (B), which is the only other source location which can print in this overlap area. FIG. 35 illustrates the relative placement of a number of image sections (A–D) on the recording medium, and identifies a number of overlap segments. The physical region of the recording medium known to section (A) as segment (4) actually has two identities: as segment (4) of segment (A), and as segment (8) of section (B). If the bit map mask array in section (8) and (4) are opposites, each pel within this region of the recording medium will ultimately be printed once and only once. By "opposite" is meant that the mask in segment (4) must mandate printing for those pels which the mask in segment (8) does not print. The same remarks apply to segments (2) and (6). One way to insure the proper symmetry (meaning "opposites") while reducing the memory space needed to store the mask is to use identical mask patterns in regions 2 & 6, and 4 & 8. By "identical" it allows the patterns to be changed to reflect the change in coordinate system involved in moving to the opposing side. This step requires that the mask pattern be anti-symmetric (opposite) about the mid-line of the segment. The segment and midline are identified in FIG. 34A.

In the corner areas, (1, 3, 5 and 7), it is possible to construct an appropriate mask pattern array using the side segment mask arrays described above. A sample corner area is shown in FIG. 34-B along with a set of coordinate axes (x,y), and the coordinates of the symmetry lines for segments 2, 4, 6 and 8, which occur at $x=+/-xo$, $y=1/-yo$ or shown in FIG. 34-B. In order to construct an appropriate mask for the corner areas, it is convenient to extend the mask arrays used in the side segments into the corner areas. The mask array in each corner area can then be constructed as the product, or logical "AND", of these extensions.

For example, if the mask array in adjacent regions, such as regions (4) and (2), are represented by the functions $F(x,y)$ and $G(x,y)$, then the corner mask is constructed according to the product $F(x,y)*G(x,y)$. Note that functions F and G are functions of both spatial variables (x,y). This allows the change in the mask pattern required by symmetry, as well as changes in the pattern from "line to line" along a second axis. Since the functions F and G normally only assume the values zero or one (0,1), the indicated product is equivalent to a logical "AND".

It should be noted that the mask in each side segment is anti-symmetric or "opposite" about the center axis which occurs at $(+/-xo)$, and $(+/-yo)$ in this embodiment Using the notation of FIG. 34-B, this can be represented mathematically, for a point in the overlap region, as:

$$F(xo+Dx,y)=(1-F(xo-Dx,y)) \tag{1}$$

$$G(x,yo+Dy)=(1-G(x,yo-Dy)) \tag{2}$$

Also, since the same anti-symmetric mask is used in oppositely placed segments (2-6) and (4-8), we can write:

$$F(x,y)=F(-x,y) \tag{3}$$

$$G(x,y)=G(x,-y) \tag{4}$$

Each region on the recording medium corresponding to a corner area is normally printed from each of four adjacent sections, except as noted above. The effective "mask" in each such region is then the sum of the four masks used by the four adjacent sections to print in this location. Referring to FIG. 35, the masks used to print in the upper right corner of section (4) will be (3-A), (1-B), (7-C), and (5-D), where the number indicates the segment and the letter the source section. In this embodiment the same mask is applied to all sections. Consequently, by summing these four masks while duly noting the appropriate changes in the coordinate axes for each corner, the extent of print coverage in the corner regions can be predicted. Performing the sum into variable S:

$$\begin{aligned} S = \; & F(xo + Dx, yo + Dy)*G(xo + Dx, yo + Dy) + \\ & F(-xo + Dx, yo + Dy)*G(-xo + Dx, yo + Dy) + \\ & F(-xo + Dx, -yo + Dy)*G(-xo + Dx, -yo + Dy) + \\ & F(xo + Dx, -yo + Dy)*G(xo + Dx, -yo + Dy) \end{aligned} \tag{5}$$

Substituting equations (1), (2), (3) and (4) into equation (5) is found that:

$$S = 1 + P1 * P2 \quad (6)$$

where $$P1 = [F(xo + Dx, yo + Dy) - F(xo + Dx, -yo + Dy)] \quad (7)$$

$$P2 = [G(xo + Dx, yo + Dy) - G(-xo + Dx, yo + Dy)] \quad (8)$$

The contributions of the four masks to the corner region represented by sum (S) should equal one, which corresponds to each pel being printed once and only once i this region. This result can be achieved if the functions F and G are determined such that either or both of P1 and P2 are zero. This can be satisfied by either:

$$F(x, yo + Dy) = F(x, -yo + Dy) \quad (9)$$

$$G(xo + Dx, y) = G(-xo + Dx, y) \quad (10)$$

The required symmetry admits a large variety of bit map patterns or arrays for consideration. Since our object is to reduce tiling, the general behavior of the mask array should be similar to the "intensity feathering" method described previously. To this end, recording "intensity" is associated with recording "probability", and the elements of the mask array are determined so that picture elements in the overlap region but near central region (9) are predominantly printed with the central region. In areas of the overlap farther from the central region, the frequency of pels printed from this location decreases. One frequency distribution which displays this behavior is a linear decrease. Other mathematical forms can be used. Other masks may be used in practicing the invention.

This method can be used to assign a specified mathematical form to the functions F(x) and G(y) described above. Since image recording is usually performed on a pel basis, the bit map mask can take only the values zero or one (0/1), which correspond to "no print" or "print". Consequently, it is the distribution of bits within the mask which is determined by the desired mathematical form.

Three alternate terms have been used to represent the mask pattern used to assign the printing function of each pel within the overlap region. The term "bit map" is used because the pattern is presently stored as a bit map in the film printing system memory. The term "template" is used because it is frequently associated with a fixed geometric pattern, such as the "bit map" pattern. The term "mask" is really an allusion to sign painting, where an image is painted through a mask which defines the image boundaries. In this case, the "mask" similarly determines which image pels will be printed from a given section.

In most embodiments of sectional recording as described above, the recorded sections are of roughly uniform size and generally square in shape. The uniform size and square shape result primarily from the desire to maximally utilize the resolution of the image source and to have sections which automatically fit together geometrically on the recording medium.

One method disclosed above reduces tiling by spreading the effect of recording errors over an overlap region between adjacent sections on the recording. Another method disclosed above reduces tiling by moving the boundary line between sections within the overlap region in order to follow features of the recording which might help reduce or mask the tiling effect. In a specific example, this method would preferentially locate the boundary between section areas where the recording density or exposure is zero. Clearly there would be no tiling effect in areas where there was effectively no recording.

It is possible to increase the effectiveness of the previous two methods by changing or modifying the position or shape of the image sections which are recorded such that the overlap regions or boundary lines are preferentially located in areas of the recording which can be utilized to reduce the tiling effect in the way indicated above. The ability to change the shape and position of the recording sections offers increased latitude in locating the boundary lines and overlap areas in a way that will reduce the effect of recording errors on the recording. The size and shape of each recorded section would be determined according to this criteria while the image data was organized or prepared for recording. This data preparation is included in the first step of the flow chart illustrated in FIG. 33. This method would likely result in non-square, non-uniform section size and shape, or result in non-linear section boundaries. This method could have a subsidiary effect of increasing the number of sections required to record a recording, which would in turn increase the recording time.

The specific location of the overlap regions and boundary lines which separate the recorded sections would depend on the type of recording medium, the type of image source, and on the specific details of the information to be recorded. At present, this aspect of the invention is practiced by locating section boundaries in regions where the recording intensity is zero, or in regions of the recording which are complex. Regions of the recording considered complex are identified by rapidly and continually varying image density, or by rapidly and continually varying color content. In such regions, recording errors produced by pel location errors or by recording level errors are less noticeable than in broad areas which feature uniform density or color levels (zero level or full recording intensity level being two exceptions to this rule). Recording errors along section boundaries are noticeable where the boundary crosses between broad areas which represent different color or different recording density. In practice the method seeks to avoid locating section boundaries in such areas.

The method of allowing for variable section shape and locating section boundary lines according to the stated criteria can be combined with previously disclosed methods, which is to say with random pel method, variable end-of-line method or intensity variation method, to reduce the effect of pel placement errors or pel recording errors on the recording.

Figure 36C:
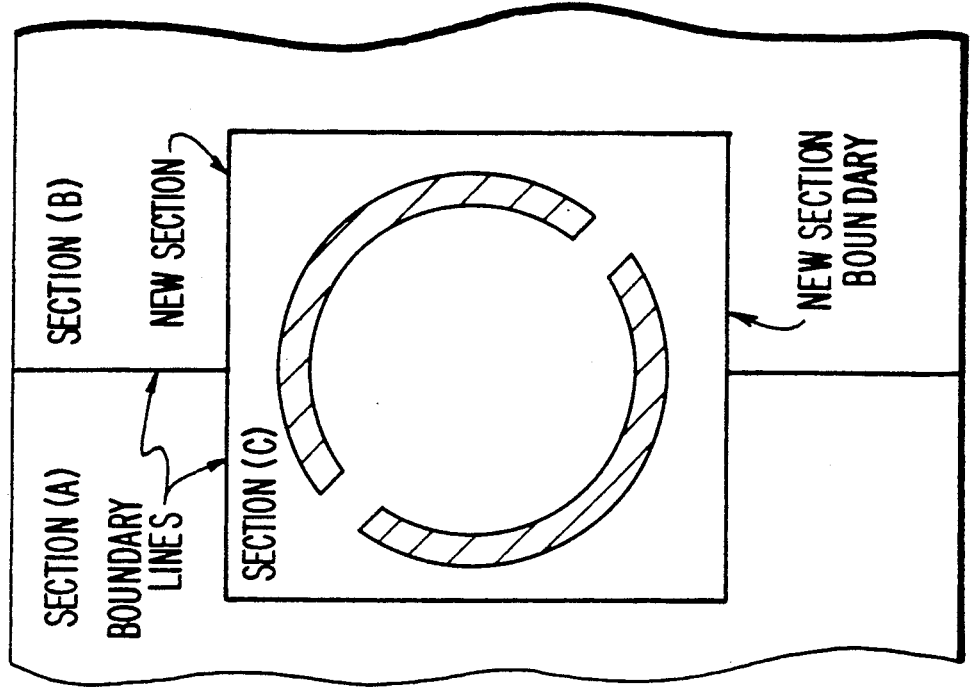
FIG. 36C illustrates a new recording section which has been created to reduce the tiling effect.
Figure 36B:
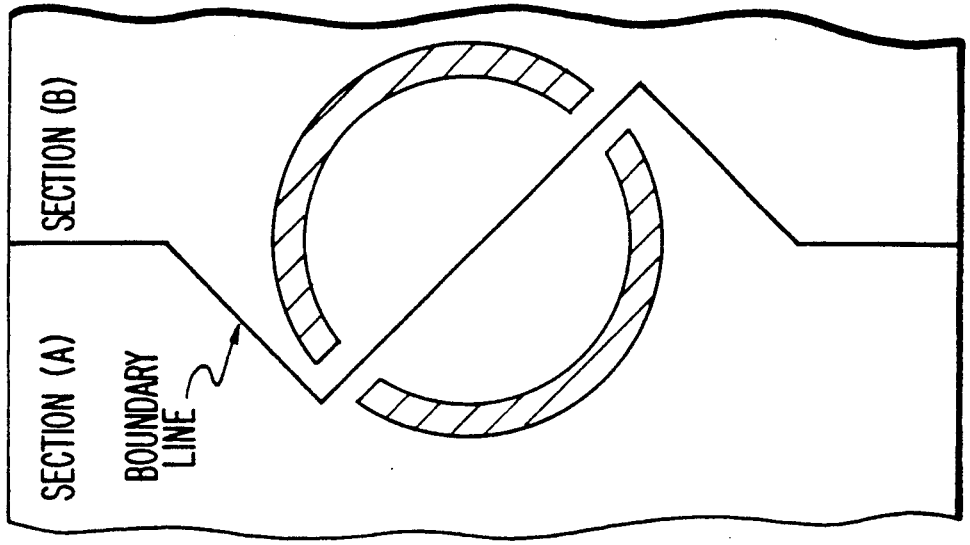
FIG. 36B illustrates the boundary line of FIG. 36A which has been relocated to avoid crossing the recording feature.
Figure 36A:
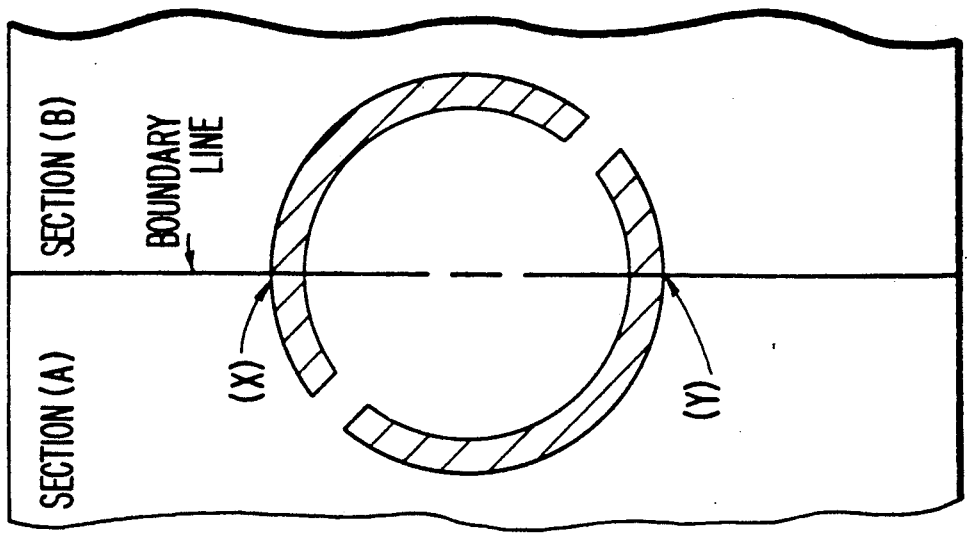
FIG. 36A illustrates the boundary between two recording sections where the boundary line crosses a recording feature.

A specific example where the sections are organized in a non-square pattern is illustrated in FIGS. 36A-E. FIGS. 36A-D illustrate a region of a recording which occurs at a boundary between sections. The recording features a geometric pattern of two semi-circles which constitute the recorded image. The waved lines at the right and left edge of each figure indicate that illustrated region may constitute only a part of the recorded image. In FIG. 36A the section boundary between sections (A) and (B) was located without regard for the content of the recording. In this case the section boundary crosses the semi-circular figures at locations labeled (x) and (y).

These locations represent points where the sectional boundary line crosses between areas of the recording which are broad and of different densities. Sectional boundaries at such locations are sensitive to the recording errors which produce the tiling effect, since a pel position error between sections can produce a discontinuity in the otherwise smooth edge of the semi-circles. In FIG. 36B, the section boundary has been reorganized so as to utilize the specific content of the recorded image to reduce tiling. In this case, the section boundary was moved so as to lie in a region of zero recording intensity which is between the two semicircles. In this way the sectional boundary no longer crosses the semi-circular features, and there is no opportunity for pel placement of recording errors to distort the shape of those features.

In some instances, due to a fixed maximum section size determined by the recording system hardware, it may be impossible to extend the boundary as shown in FIG. 36B. Normally it is possible to avoid such problems by creating a new section, identified as section (C) in FIG. 36C. In FIG. 36C sections (A) and (B) are reduced in size to accommodate the new section (C). New section (C) is located in the manner described above, specifically so that the boundary lines will fall on areas of the recording which are resistant to tiling. In FIG. 36C, the blank area surrounding the semi-circular features provides such an area. Section (C) does not have the same size as surrounding sections.

If one or another of the previously described methods used to reduce tiling were applied in conjunction with the present method to the recording of FIG. 36C, overlap regions which surround the boundary lines could be defined as illustrated in FIG. 36D. The overlap regions are illustrated as areas which surround the section boundary lines, and are themselves outlined by dotted lines.

In some cases it can be advantageous, in accordance with the present method, to break the recording into recording sections which have non-linear boundaries. FIG. 36E illustrates the application of non-linear section boundaries to the recording of the present fig. In this figure a new section labeled (C), with non-linear boundaries, has been created. The advantage of non-linear section boundaries is increased flexibility in locating boundary lines in regions of the recording which are less sensitive to the tiling effect. The overlap regions have not been illustrated in FIG. 36E.

Although the present invention has been described with reference to preferred embodiments, it should be understood that numerous modifications may be made to the invention without departing from the scope of the invention. It is therefore intended that the invention not be limited to the particular embodiments as disclosed herein for practicing the invention and includes all embodiments covered within the scope of the claims.

I claim:

1. A method for forming a recording on a recording medium for reducing recording error occurring between adjacent sections of a recording medium on which information is recorded in pels with each section being comprised of a matrix of individually addressable pels comprising:
    providing a recording medium;
    dividing information to be recorded into a plurality of sections with at least one section being comprised of a matrix of addressable pels having a non-overlap region and at least one overlap region which is common to another section with each overlap region of a section forming a boundary with another section; and
    recording a plurality of individual sections of a recording on the recording medium joined in the overlap regions by recording pels to form the recording while varying a characteristic of pels in at least one of the recorded sections in the overlap region to reduce the effect of recording errors on the recording and recording pels in the non-overlap region of the at least one section without varying the characteristic of the pels.

2. The method according to claim 1, wherein:
    the individual recorded sections of the recording are recorded sequentially on the recording medium.

3. The method according to claim 1, wherein:
    said recording medium is photosensitive and said recorded sections are recorded by exposing the film to light from a light source.

4. The method according to claim 3, wherein:
    said light source is a cathode ray tube.

5. A method of recording in accordance with claim 3 wherein:
    the recorded sections are sequentially recorded on respective predetermined locations of the recording medium.

6. The method according to claim 1, wherein:
    the individual recorded sections are recorded with a boundary between adjacent recorded sections being varied as a function of the information being recorded to reduce the effect of recording errors on the recording.

7. A method in accordance with claim 6 wherein:
    the boundary is varied as a function of information being recorded.

8. The method according to claim 6, wherein:
    the boundary is varied randomly within an overlap region of adjacent recorded sections.

9. The method according to claim 8, wherein:
    the width of the overlap region of recorded sections is about ten percent of the width of the recorded sections.

10. The method according to claim 9, wherein:
    the recorded sections are recorded in the form of recording lines by exposing the recording medium to light from a plurality of arrays of light emitting elements, said arrays overlapping one another to permit said variation in the point of transition.

11. The method according to claim 10, wherein:
    the light emitting elements are diodes.

12. The method according to claim 1, wherein:
    a characteristic of the at least one recorded section is varied by recording only selected pels during recording within the boundary region of the recorded sections.

13. The method according to claim 12, wherein:
    the selected pels within the boundary region of two adjacent recorded sections are selected such that all pels in the overlap regions between the two sections are recorded after recording of the recorded sections is completed.

14. The method according to claim 12, wherein:
    the distribution of the selected pels in the overlap region of the recorded sections is a second order function.

15. The method according to claim 12, wherein:
    the distribution of the selected pels in the overlap region of the recorded sections is a linear function.

16. The method according to claim 1, wherein:
the characteristic of the at least one recorded section which is varied is the intensity of the recording in the overlap region of the at least one recorded section.

17. The method according to claim 16, wherein:
the recording intensity is reduced linearly in the overlap region of the at least one recorded section.

18. The method according to claim 16, wherein:
the recording intensity is reduced as a second order function in the overlap region of the recorded section.

19. The method according to claim 16, wherein:
the recording medium is photosensitive and said individual recording sections are recorded by exposing the film to light from a light source.

20. The method according to claim 19, wherein:
the intensity of light from the light source is reduced when recording the overlap region of the at least one recorded section to provide the at least one recorded section with reduced intensity in the overlap region thereof.

21. The method according to claim 19, wherein:
the time of exposure of the film to light from the light source is reduced when recording the overlap region of the at least one recorded section to provide the at least one recorded section with reduced intensity in the overlap region thereof.

22. A method of reducing an effect of pel recording error occurring between adjacent sections of a recording medium on which information is recorded in pels comprising:
dividing information to be recorded into a plurality of sections with a section being comprised of a plurality of pels in an addressable matrix having a non-overlap region and at least one overlap region which is common to another section with each overlap region of a section forming a boundary with another section;
recording all pels of one section by recording pels within at least one overlap region of the one section by recording at least one pel along a first axis and recording pels in the non-overlap region of the one section; and
recording a remainder of pels within the at least one overlap region along the first axis which were not recorded during recording of the at least one pel during recording of another section.

23. A method in accordance with claim 22 wherein:
the at least one pel is determined as a function of the information being recorded.

24. A method in accordance with claim 22 wherein:
a geometric shape, size and orientation of the sections is varied as a function of the information being recorded.

25. A method of recording in accordance with claim 22 further comprising:
recording pels within the at least one overlap region of the one section by recording at least one pel along a second axis intersecting the first axis; and
recording a remainder of the pels within the at least one overlap region along the second axis during recording of another section.

26. A method in accordance with claim 25 wherein:
the at least one pel along the second axis is determined as a function of the information being recorded.

27. A method in accordance with claim 25 wherein:
the pels recorded along the first axis during recording of the one and the another section are distributed as a function of address of the pels along the first axis in the at least one overlap region.

28. A method in accordance with claim 27 wherein:
a number of pels recorded per unit length decreases as a function of address along the first axis in the at least one overlap region during recording of the one and the another sections.

29. A method in accordance with claim 27 wherein:
the pels recorded along the second axis during the recording of the one and the another section are distributed as a function of address of the pels along the second axis in the at least one overlap region.

30. A method of recording in accordance with claim 29 wherein:
a number of pels recorded per unit length decreases as a function of address along the second axis in the at least one overlap region.

31. A method in accordance with claim 28 wherein:
the decrease is linear as a function of address of the pels along the first axis.

32. A method in accordance with claim 28 wherein:
the decrease is a second order function of address of the pels along the first axis.

33. A method in accordance with claim 30 wherein:
the decrease is linear as a function of address of pels along the second axis.

34. A method in accordance with claim 30 wherein:
the decrease is a second order function of address of pels along the second axis.

35. A method in accordance with claim 25 wherein:
a distribution of the pels recorded during the recording of the one section along the first and second axes in the at least one overlap region is determined by a first addressable overlap matrix;
a distribution of pels recorded during the recording of the another section along the first and second axis in the at least one overlap region is determined by a second addressable overlap matrix;
recording of pels within the at least one overlap region along the first and second axes in the one section is controlled by logically gating each pel with a value stored at a corresponding address of the first addressable overlap matrix to pass the pel when the value has a predetermined level; and
recording of pels within the at least one overlap region along the first and second axes in the another region is controlled by logically gating each pel with a value stored at a corresponding address of the second addressable overlap matrix to pass the pel when the value has a predetermined level.

36. A method in accordance with claim 22 wherein:
a distribution of pels recorded during the recording of the one section along the first axis in the at least one overlap region is determined by a first addressable overlap matrix; and
recording of pels within the at least one overlap region along the first axis in the one section is controlled by logically gating each pel with a value stored at a corresponding address of the first addressable matrix to pass the pel when the value has a predetermined level.

37. A method in accordance with claim 36 wherein:
a distribution of pels recorded during the recording of the another section along the first axis in the at least one overlap region is determined by a second addressable overlap matrix; and recording of the pels within the at least one overlap region along the first axis during recording of the another section is controlled by logically gating each pel with a value stored at a corresponding address of the second addressable overlap matrix to pass the pel when the value has a predetermined level.

38. A method in accordance with claim 28 wherein: each pel is stored as color data having multiple bits.

39. A method in accordance with claim 28 wherein: each pel is stored as intensity data having at least one bit.

40. A method of reducing an effect of recording error occurring at boundaries between adjacent sections of a recording medium on which information is recorded as pels comprising:

dividing information to be recorded into a plurality of sections, each section being stored as a plurality of addressable pels disposed in an addressable matrix having at least one of the sections divided into a non-overlap region and at least one overlap region which is common to another section with each overlap region forming a boundary with another section;

recording all pels of one section by recording pels within at least one overlap region of the one section by varying at least one address of a pair of end points of where a continuous recording of pels is disposed along a first axis and recording pels in the non-overlap region of the one section; and recording a remainder of pels within the at least one overlap region along the first axis during recording of another section.

41. A method of recording in accordance with claim 40 wherein:

the at least one address varies between groups of at least one line.

42. A method of recording in accordance with claim 40 wherein:

the at least one address of the lines is an arbitrary distribution.

43. A method in accordance with claim 40 wherein:

the at least one address is varied as a function of the information being recorded.

* * * * *